United States Patent
Yamaguchi et al.

(10) Patent No.: US 9,719,520 B2
(45) Date of Patent: Aug. 1, 2017

(54) INFORMATION PROCESSING APPARATUS AND AIR VOLUME CALCULATION METHOD

(71) Applicant: FUJITSU LIMITED, Kawasaki-shi, Kanagawa (JP)

(72) Inventors: Atsushi Yamaguchi, Kawasaki (JP); Akihiro Otsuka, Yokohama (JP); Tadashi Katsui, Kawasaki (JP); Akira Ueda, Yokohama (JP); Hiroyuki Furuya, Kawasaki (JP); Kazuhiro Nitta, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 291 days.

(21) Appl. No.: 14/576,269

(22) Filed: Dec. 19, 2014

(65) Prior Publication Data
US 2015/0192139 A1    Jul. 9, 2015

(30) Foreign Application Priority Data

Jan. 7, 2014   (JP) ................................. 2014-000910

(51) Int. Cl.
    *F04D 27/00*    (2006.01)
    *F04D 25/16*    (2006.01)
(52) U.S. Cl.
    CPC .......... *F04D 27/00* (2013.01); *F04D 25/166* (2013.01); *F04D 27/004* (2013.01)
(58) Field of Classification Search
    None
    See application file for complete search history.

(56) References Cited

U.S. PATENT DOCUMENTS

| | | | | |
|---|---|---|---|---|
| 4,460,035 A * | 7/1984 | Mizote | ............... | B60H 1/00864 165/202 |
| 6,470,289 B1 * | 10/2002 | Peters | ...................... | G01K 7/42 374/10 |
| 8,718,834 B2 * | 5/2014 | Lu | .......................... | G06F 1/206 361/679.48 |
| 2005/0259405 A1 * | 11/2005 | He | ...................... | H01L 23/4006 361/729 |
| 2007/0297893 A1 * | 12/2007 | Alon | ...................... | F04D 25/166 415/47 |

(Continued)

FOREIGN PATENT DOCUMENTS

| | | |
|---|---|---|
| JP | 2007-115070 | 5/2007 |
| JP | 2008-235696 | 10/2008 |
| JP | 2010-71609 | 4/2010 |

OTHER PUBLICATIONS

Japanese Office Action mailed Jun. 6, 2017 for corresponding Japanese Patent Application No. 2014-000910, with Partial English Translation, 6 pages.

*Primary Examiner* — Jason Lin
(74) *Attorney, Agent, or Firm* — Fujitsu Patent Center

(57) ABSTRACT

An operation unit calculates, for each object, a ratio of an amount of temperature rise against a tolerance for temperature rise by using an amount of temperature rise from a predetermined temperature of each object when each fan is operated with a first air volume of each fan and a tolerance for temperature rise from the predetermined temperature of each object. The operation unit calculates a second air volume of each fan, based on the ratio calculated for each object and cooling contribution information of each fan to the object.

12 Claims, 54 Drawing Sheets

(56) References Cited

U.S. PATENT DOCUMENTS

| | | | |
|---|---|---|---|
| 2008/0174954 A1* | 7/2008 | VanGilder | H05K 7/20836 361/679.54 |
| 2008/0232974 A1 | 9/2008 | Tsuchiya | |
| 2009/0304199 A1* | 12/2009 | DeMoss | G06F 1/20 381/71.1 |
| 2010/0131109 A1* | 5/2010 | Rasmussen | G06F 1/206 700/277 |
| 2014/0092549 A1* | 4/2014 | Kodama | H05K 7/20745 361/679.48 |

* cited by examiner

| DEFINITION INFORMATION | | | 111 |
|---|---|---|---|
| ITEM-NAME | NAME | ATTRIBUTE | |
| ENVIRONMENT TEMPERATURE | — | 30°C | |
| COMPONENT | FAN F1 | PLACEMENT: P1, AIR VOLUME: 3m³/min, ROTATION SPEED: 3000rpm | |
| COMPONENT | FAN F2 | PLACEMENT: P2, AIR VOLUME: 3m³/min, ROTATION SPEED: 3000rpm | |
| COMPONENT | HEATING ELEMENT H1 | PLACEMENT: P3, PERMISSIVE TEMPERATURE: 80°C | |
| COMPONENT | HEATING ELEMENT H2 | PLACEMENT: P4, PERMISSIVE TEMPERATURE: 80°C | |

EXEMPLARY PQ TABLE

PQ TABLE (5000rpm) 113

| AIR VOLUME | STATIC PRESSURE | NOISE |
|---|---|---|
| 0.00 | 202 | 65.5 |
| 0.54 | 170 | 64.5 |
| 1.22 | 134 | 60.0 |
| 2.19 | 95 | 57.7 |
| 2.68 | 78 | 59.0 |
| 3.37 | 69 | 60.2 |
| 4.20 | 66 | 59.7 |
| 4.78 | 59 | 60.9 |
| 5.43 | 43 | 60.3 |
| 6.00 | 20 | 59.9 |
| 6.40 | 0 | 61.4 |

PQ TABLE (4000rpm) 113a

| AIR VOLUME | STATIC PRESSURE | NOISE |
|---|---|---|
| 0.00 | 140 | 56.2 |
| 0.44 | 118 | 55.1 |
| 0.96 | 94 | 51.8 |
| 1.61 | 69 | 50.3 |
| 2.04 | 56 | 50.6 |
| 2.55 | 49 | 51.2 |
| 3.14 | 46 | 51.3 |
| 3.62 | 41 | 51.9 |
| 4.13 | 31 | 51.5 |
| 4.79 | 14 | 51.3 |
| 5.03 | 0 | 52.0 |

PQ TABLE (3500rpm) 113b

| AIR VOLUME | STATIC PRESSURE | NOISE |
|---|---|---|
| 0.00 | 109 | 52.0 |
| 0.39 | 92 | 50.4 |
| 0.83 | 74 | 47.7 |
| 1.32 | 56 | 46.6 |
| 1.72 | 45 | 46.4 |
| 2.14 | 39 | 46.7 |
| 2.61 | 36 | 47.1 |
| 3.04 | 32 | 47.4 |
| 3.48 | 25 | 47.1 |
| 3.90 | 15 | 47.0 |
| 4.38 | 0 | 47.3 |

PQ TABLE (3000rpm) 113c

| AIR VOLUME | STATIC PRESSURE | NOISE |
|---|---|---|
| 0.00 | 78 | 47.8 |
| 0.34 | 66 | 45.7 |
| 0.70 | 54 | 43.6 |
| 1.03 | 43 | 42.9 |
| 1.40 | 34 | 42.2 |
| 1.73 | 29 | 42.2 |
| 2.08 | 26 | 42.9 |
| 2.46 | 23 | 42.9 |
| 2.83 | 19 | 42.7 |
| 3.01 | 16 | 42.7 |
| 3.73 | 0 | 42.6 |

PQ TABLE (2500rpm) 113d

| AIR VOLUME | STATIC PRESSURE | NOISE |
|---|---|---|
| 0.00 | 58 | 42.6 |
| 0.34 | 46 | 40.5 |
| 0.63 | 36 | 39.0 |
| 0.92 | 29 | 37.5 |
| 1.26 | 22 | 37.0 |
| 1.56 | 20 | 36.8 |
| 1.87 | 17 | 37.0 |
| 2.19 | 15 | 37.1 |
| 2.52 | 12 | 37.0 |
| 2.82 | 8 | 36.9 |
| 3.21 | 0 | 36.8 |

FIG. 8A

AIR VOLUME RATIO TABLE (FAN F1) — 114

| | | AMOUNT OF TEMPERATURE RISE OF THE HEATING ELEMENT H2 | | | | |
|---|---|---|---|---|---|---|
| | | 10 °C | 20 °C | 30 °C | 40 °C | 50 °C | ← L2
| AMOUNT OF TEMPERATURE RISE OF THE HEATING ELEMENT H1 | 10 °C | 0.2 | 0 | 0 | 0 | 0 |
| | 20 °C | 0.571429 | 0.4 | 0.2 | 0 | 0 |
| | 30 °C | 0.857143 | 0.8 | 0.6 | 0.4 | 0.2 |
| | 40 °C | 1.142857 | 1.142857 | 1 | 0.8 | 0.6 |
| | 50 °C | 1.428571 | 1.428571 | 1.4 | 1.2 | 1 |

AIR VOLUME RATIO TABLE (FAN F2) — 114a

| | | AMOUNT OF TEMPERATURE RISE OF THE HEATING ELEMENT H2 | | | | |
|---|---|---|---|---|---|---|
| | | 10 °C | 20 °C | 30 °C | 40 °C | 50 °C |
| AMOUNT OF TEMPERATURE RISE OF THE HEATING ELEMENT H1 | 10 °C | 0.2 | 0.666667 | 1 | 1.333333 | 1.666667 |
| | 20 °C | 0 | 0.4 | 0.866667 | 1.333333 | 1.666667 |
| | 30 °C | 0 | 0.133333 | 0.6 | 1.066667 | 1.533333 |
| | 40 °C | 0 | 0 | 0.333333 | 0.8 | 1.266667 |
| | 50 °C | 0 | 0 | 0.066667 | 0.533333 | 1 |

FIG. 9A

| AIR VOLUME TABLE (FAN F1) | | | | | | |
|---|---|---|---|---|---|---|
| | | AMOUNT OF TEMPERATURE RISE OF THE HEATING ELEMENT H2 | | | | |
| | | 10 °C | 20 °C | 30 °C | 40 °C | 50 °C |
| AMOUNT OF TEMPERATURE RISE OF THE HEATING ELEMENT H1 | 10 °C | 0.6 | 0 | 0 | 0 | 0 |
| | 20 °C | 1.714 | 1.2 | 0.6 | 0 | 0 |
| | 30 °C | 2.571 | 2.4 | 1.8 | 1.2 | 0.6 |
| | 40 °C | 3.428 | 3.428 | 3 | 2.4 | 1.8 |
| | 50 °C | 4.285 | 4.285 | 4.2 | 3.6 | 3 |

| AIR VOLUME TABLE (FAN F2) | | | | | | |
|---|---|---|---|---|---|---|
| | | AMOUNT OF TEMPERATURE RISE OF THE HEATING ELEMENT H2 | | | | |
| | | 10 °C | 20 °C | 30 °C | 40 °C | 50 °C |
| AMOUNT OF TEMPERATURE RISE OF THE HEATING ELEMENT H1 | 10 °C | 0.6 | 2 | 3 | 4 | 5 |
| | 20 °C | 0 | 1.2 | 2.6 | 4 | 5 |
| | 30 °C | 0 | 0.4 | 1.8 | 3.2 | 4.6 |
| | 40 °C | 0 | 0 | 1 | 2.4 | 3.8 |
| | 50 °C | 0 | 0 | 0.2 | 1.6 | 3 |

ROTATION SPEED BY TEMPERATURE TABLE (FAN F1) — 116

| | | AMOUNT OF TEMPERATURE RISE OF THE HEATING ELEMENT H2 | | | | |
|---|---|---|---|---|---|---|
| | | 10 °C | 20 °C | 30 °C | 40 °C | 50 °C ← L6 |
| AMOUNT OF TEMPERATURE RISE OF THE HEATING ELEMENT H1 | 10 °C | 600 | 0 | 0 | 0 | 0 |
| | 20 °C | 1700 | 1200 | 600 | 0 | 0 |
| | 30 °C | 2500 | 2400 | 1800 | 1200 | 600 |
| | 40 °C | 3250 | 3250 | 3000 | 2400 | 1800 |
| | 50 °C | 3850 | 3850 | 3800 | 3400 | 3000 |

ROTATION SPEED BY TEMPERATURE TABLE (FAN F2) — 116a

| | | AMOUNT OF TEMPERATURE RISE OF THE HEATING ELEMENT H2 | | | | |
|---|---|---|---|---|---|---|
| | | 10 °C | 20 °C | 30 °C | 40 °C | 50 °C |
| AMOUNT OF TEMPERATURE RISE OF THE HEATING ELEMENT H1 | 10 °C | 600 | 2000 | 3000 | 3650 | 4500 |
| | 20 °C | 0 | 1200 | 2600 | 3650 | 4500 |
| | 30 °C | 0 | 400 | 1800 | 3200 | 4200 |
| | 40 °C | 0 | 0 | 1000 | 2400 | 3500 |
| | 50 °C | 0 | 0 | 200 | 1600 | 3000 |

FIG. 29

| | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|
| 1 | 1 | 1 | 1 | \multicolumn{4}{c|}{FAN F1} | 0.9 | 0.1 | \multicolumn{4}{c|}{FAN F2} | 0 | 0 | 0 | 0 | 0 | 0 |
| 2 | 1 | 1 | 1 | 1 | 1 | 1 | 1 | 0.9 | 0.1 | 0 | 0 | 0 | 0 | 0 | 0 | 0 | 0 | 0 | 0 |
| 3 | 1 | 1 | 1 | 1 | 1 | 1 | 1 | 0.9 | 0.4 | 0 | 0 | 0 | 0 | 0 | 0 | 0 | 0 | 0 | 0 |
| 4 | 1 | 1 | 1 | 1 | 1 | 1 | 1 | 0.9 | 0.4 | 0.2 | 0 | 0 | 0 | 0 | 0 | 0 | 0 | 0 | 0 |
| 5 | 1 | 1 | 1 | 1 | 1 | 1 | 0.9 | 0.9 | 0.4 | 0.2 | 0 | 0 | 0 | 0 | 0 | 0 | 0 | 0 | 0 |
| 6 | 1 | 1 | 1 | 1 | 1 | 1 | 0.9 | | | | 0 | 0 | 0 | 0 | 0 | 0 | 0 | 0 | 0 |
| 7 | 1 | 1 | 1 | 1 | 1 | 1 | 0.9 | \multicolumn{3}{c|}{HEATING ELEMENT H1} | 0 | 0 | 0 | 0 | 0 | 0 | 0 | 0 | 0 |
| 8 | 1 | 1 | 1 | 1 | 1 | 0.9 | 0.9 | | | | 0 | 0 | 0 | 0 | 0 | 0 | 0 | 0 | 0 |
| 9 | 1 | 1 | 1 | 1 | 1 | 0.9 | 0.8 | 0.7 | 0.5 | 0.2 | 0 | 0 | 0 | 0 | 0 | 0 | 0 | 0 | 0 |
| 10 | 1 | 1 | 1 | 1 | 1 | 0.9 | 0.8 | 0.7 | 0.5 | 0.2 | 0.2 | 0 | 0 | 0 | 0 | 0 | 0 | 0 | 0 |
| 11 | 1 | 1 | 1 | 1 | 0.9 | 0.9 | 0.8 | 0.7 | 0.5 | 0.2 | 0.2 | 0 | 0 | 0 | 0 | 0 | 0 | 0 | 0 |
| 12 | 1 | 1 | 1 | 1 | 0.9 | 0.9 | 0.8 | 0.5 | 0.3 | 0.2 | 0.2 | 0 | 0 | 0 | 0 | 0 | 0 | 0 | 0 |
| 13 | 1 | 1 | 1 | 1 | 0.9 | 0.9 | 0.8 | 0.5 | 0.3 | 0.2 | 0.2 | 0.2 | 0 | 0 | 0 | 0 | 0 | 0 | 0 |
| 14 | 1 | 1 | 1 | 0.9 | 0.9 | 0.8 | 0.8 | 0.5 | 0.3 | 0.2 | 0.2 | 0.2 | 0 | 0 | 0 | 0 | 0 | 0 | 0 |
| 15 | 1 | 1 | 1 | 0.9 | 0.8 | 0.5 | 0.5 | 0.5 | 0.3 | 0.2 | 0.2 | 0.2 | 0 | 0 | 0 | 0 | 0 | 0 | 0 |
| 16 | 1 | 1 | 1 | 0.9 | 0.6 | 0.5 | 0.5 | | | | 0.1 | 0.1 | 0.1 | 0.1 | 0 | 0 | 0 | 0 | |
| 17 | 1 | 1 | 1 | 0.9 | 0.8 | 0.8 | 0.5 | \multicolumn{3}{c|}{HEATING ELEMENT H2} | 0.1 | 0.1 | 0.1 | 0.1 | 0 | 0 | 0 | 0 | FAN F3 |
| 18 | 1 | 1 | 0.9 | 0.8 | 0.8 | 0.8 | 0.5 | | | | 0.1 | 0.1 | 0.1 | 0.1 | 0 | 0 | 0 | 0 | |
| 19 | 1 | 1 | 0.9 | 0.8 | 0.8 | 0.8 | 0.5 | 0.5 | 0.2 | 0.2 | 0.1 | 0.1 | 0.1 | 0.1 | 0 | 0 | 0 | 0 | |
| 20 | 1 | 1 | 0.9 | 0.8 | 0.8 | 0.8 | 0.5 | 0.5 | 0.2 | 0.2 | 0.1 | 0.1 | 0.1 | 0.1 | 0 | 0 | 0 | 0 | 0 |
| 21 | 1 | 1 | 0.8 | 0.8 | 0.8 | 0.8 | 0.5 | 0.5 | 0.2 | 0.2 | 0.1 | 0.1 | 0.1 | 0.1 | 0 | 0 | 0 | 0 | 0 |
| 22 | 0.9 | 0.9 | 0.8 | 0.8 | 0.8 | 0.8 | 0.5 | 0.5 | 0.2 | 0.2 | 0.1 | 0.1 | 0.1 | 0.1 | 0.1 | 0 | 0 | 0 | 0 |
| 23 | 0.9 | 0.9 | 0.8 | 0.8 | 0.8 | 0.7 | 0.5 | 0.5 | 0.2 | 0.2 | 0.1 | 0.1 | 0.1 | 0.1 | 0 | 0 | 0 | 0 | 0 |
| 24 | 0.9 | 0.9 | 0.8 | 0.8 | 0.8 | 0.7 | 0.5 | 0.5 | 0.2 | 0.2 | 0.1 | 0.1 | 0.1 | 0.1 | 0 | 0 | 0 | 0 | 0 |
| 25 | 0.9 | 0.9 | 0.8 | 0.8 | 0.8 | 0.7 | 0.5 | 0.5 | 0.2 | 0.2 | 0.1 | 0.1 | 0.1 | 0.1 | 0 | 0 | 0 | 0 | 0 |
| 26 | 0.9 | 0.9 | 0.8 | 0.8 | 0.8 | 0.7 | 0.5 | 0.5 | 0.2 | 0.2 | 0.1 | 0.1 | 0.1 | 0.1 | 0 | 0 | 0 | 0 | 0 |
| 27 | \multicolumn{19}{c|}{EXIT} |

FLOW RATE RATIO 0          1

FIG. 31

| | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|
| 1 | 0 | 0 | 0 | \multicolumn{4}{|c|}{FAN F1} | 0.1 | 0.9 | \multicolumn{4}{|c|}{FAN F2} | 1 | 1 | 1 | 1 | 1 | 1 |
| 2 | 0 | 0 | 0 | 0 | 0 | 0 | 0 | 0.1 | 0.9 | 1 | 1 | 1 | 1 | 1 | 1 | 1 | 1 | 1 | 1 |
| 3 | 0 | 0 | 0 | 0 | 0 | 0 | 0 | 0.1 | 0.6 | 1 | 1 | 1 | 1 | 1 | 1 | 1 | 1 | 1 | 1 |
| 4 | 0 | 0 | 0 | 0 | 0 | 0 | 0 | 0.1 | 0.6 | 0.8 | 1 | 1 | 1 | 1 | 1 | 1 | 1 | 1 | 1 |
| 5 | 0 | 0 | 0 | 0 | 0 | 0 | 0 | 0.1 | 0.6 | 0.8 | 1 | 1 | 1 | 1 | 1 | 1 | 1 | 1 | 1 |
| 6 | 0 | 0 | 0 | 0 | 0 | 0 | 0.1 | | | | 1 | 1 | 1 | 1 | 1 | 1 | 1 | 1 | 1 |
| 7 | 0 | 0 | 0 | 0 | 0 | 0 | 0.1 | \multicolumn{3}{|c|}{HEATING ELEMENT H1} | 1 | 1 | 1 | 1 | 1 | 1 | 1 | 1 | 1 |
| 8 | 0 | 0 | 0 | 0 | 0 | 0.1 | 0.1 | | | | 1 | 1 | 1 | 1 | 1 | 1 | 1 | 1 | 1 |
| 9 | 0 | 0 | 0 | 0 | 0 | 0.1 | 0.2 | 0.3 | 0.5 | 0.8 | 1 | 1 | 1 | 1 | 1 | 1 | 1 | 1 | 1 |
| 10 | 0 | 0 | 0 | 0 | 0 | 0.1 | 0.2 | 0.3 | 0.5 | 0.8 | 0.8 | 1 | 1 | 1 | 1 | 1 | 1 | 1 | 1 |
| 11 | 0 | 0 | 0 | 0 | 0.1 | 0.1 | 0.2 | 0.3 | 0.5 | 0.8 | 0.4 | 0.6 | 0.6 | 1 | 1 | 1 | 1 | 1 | 1 |
| 12 | 0 | 0 | 0 | 0 | 0.1 | 0.1 | 0.2 | 0.1 | 0.3 | 0.4 | 0.4 | 0.6 | 0.6 | 1 | 1 | 1 | 1 | 1 | 1 |
| 13 | 0 | 0 | 0 | 0 | 0.1 | 0.1 | 0.2 | 0.1 | 0.3 | 0.4 | 0.2 | 0.2 | 0.4 | 0.8 | 0.8 | 0.8 | 0.8 | 0.8 | 0.8 |
| 14 | 0 | 0 | 0 | 0.1 | 0.1 | 0.2 | 0.2 | 0.1 | 0.3 | 0.4 | 0.2 | 0.2 | 0.3 | 0.2 | 0.2 | 0.3 | 0.2 | 0.2 | 0.8 |
| 15 | 0 | 0 | 0 | 0.1 | 0.2 | 0.1 | 0.1 | 0.1 | 0.3 | 0.2 | 0.2 | 0.2 | 0.3 | 0.2 | 0.2 | 0.1 | 0.1 | 0 | 0.3 |
| 16 | 0 | 0 | 0 | 0.1 | 0.4 | 0.5 | 0.1 | | | | 0.3 | 0.3 | 0.2 | 0.1 | 0.1 | 0.1 | 0 | 0 | |
| 17 | 0 | 0 | 0 | 0.1 | 0.2 | 0.2 | 0.1 | \multicolumn{3}{|c|}{HEATING ELEMENT H2} | 0.3 | 0.3 | 0.2 | 0.1 | 0.1 | 0 | 0 | 0 | FAN F3 |
| 18 | 0 | 0 | 0.1 | 0.1 | 0.2 | 0.2 | 0.1 | | | | 0.3 | 0.3 | 0.2 | 0.1 | 0.1 | 0 | 0 | 0 | |
| 19 | 0 | 0 | 0.1 | 0.2 | 0.2 | 0.2 | 0.1 | 0.1 | 0.2 | 0.2 | 0.3 | 0.3 | 0.2 | 0.1 | 0.1 | 0 | 0 | 0 | |
| 20 | 0 | 0 | 0.1 | 0.2 | 0.2 | 0.2 | 0.1 | 0.1 | 0.2 | 0.2 | 0.3 | 0.3 | 0.2 | 0.1 | 0.1 | 0.1 | 0 | 0 | 0 |
| 21 | 0 | 0 | 0.2 | 0.2 | 0.2 | 0.2 | 0.1 | 0.1 | 0.4 | 0.2 | 0.3 | 0.3 | 0.3 | 0.1 | 0 | 0.1 | 0 | 0 | 0 |
| 22 | 0.1 | 0.1 | 0.2 | 0.2 | 0.2 | 0.2 | 0.5 | 0.1 | 0.4 | 0.2 | 0.3 | 0.3 | 0.3 | 0.1 | 0 | 0.1 | 0 | 0 | 0 |
| 23 | 0.1 | 0.1 | 0.2 | 0.2 | 0.2 | 0.3 | 0.5 | 0.1 | 0.4 | 0.2 | 0.3 | 0.3 | 0.3 | 0.1 | 0 | 0.1 | 0 | 0 | 0 |
| 24 | 0.1 | 0.1 | 0.2 | 0.2 | 0.2 | 0.3 | 0.5 | 0.1 | 0.4 | 0.4 | 0.3 | 0.3 | 0.3 | 0.1 | 0 | 0.1 | 0 | 0 | 0 |
| 25 | 0.1 | 0.1 | 0.2 | 0.2 | 0.2 | 0.3 | 0.5 | 0.5 | 0.4 | 0.4 | 0.3 | 0.3 | 0.3 | 0.1 | 0 | 0.1 | 0 | 0 | 0 |
| 26 | 0.1 | 0.1 | 0.2 | 0.2 | 0.2 | 0.3 | 0.5 | 0.5 | 0.4 | 0.4 | 0.3 | 0.3 | 0.3 | 0.1 | 0 | 0.1 | 0 | 0 | 0 |
| 27 | \multicolumn{19}{|c|}{EXIT} |

| | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|
| 1 | 0 | 0 | 0 | FAN F1 | | | | 0 | 0 | FAN F2 | | | | 0 | 0 | 0 | 0 | 0 | 0 |
| 2 | 0 | 0 | 0 | 0 | 0 | 0 | 0 | 0 | 0 | 0 | 0 | 0 | 0 | 0 | 0 | 0 | 0 | 0 | 0 |
| 3 | 0 | 0 | 0 | 0 | 0 | 0 | 0 | 0 | 0 | 0 | 0 | 0 | 0 | 0 | 0 | 0 | 0 | 0 | 0 |
| 4 | 0 | 0 | 0 | 0 | 0 | 0 | 0 | 0 | 0 | 0 | 0 | 0 | 0 | 0 | 0 | 0 | 0 | 0 | 0 |
| 5 | 0 | 0 | 0 | 0 | 0 | 0 | 0 | 0 | 0 | 0 | 0 | 0 | 0 | 0 | 0 | 0 | 0 | 0 | 0 |
| 6 | 0 | 0 | 0 | 0 | 0 | 0 | 0 | HEATING ELEMENT H1 | | | 0 | 0 | 0 | 0 | 0 | 0 | 0 | 0 | 0 |
| 7 | 0 | 0 | 0 | 0 | 0 | 0 | 0 | | | | 0 | 0 | 0 | 0 | 0 | 0 | 0 | 0 | 0 |
| 8 | 0 | 0 | 0 | 0 | 0 | 0 | 0 | | | | 0 | 0 | 0 | 0 | 0 | 0 | 0 | 0 | 0 |
| 9 | 0 | 0 | 0 | 0 | 0 | 0 | 0 | 0 | 0 | 0 | 0 | 0 | 0 | 0 | 0 | 0 | 0 | 0 | 0 |
| 10 | 0 | 0 | 0 | 0 | 0 | 0 | 0 | 0 | 0 | 0 | 0 | 0 | 0 | 0 | 0 | 0 | 0 | 0 | 0 |
| 11 | 0 | 0 | 0 | 0 | 0 | 0 | 0 | 0 | 0 | 0 | 0.4 | 0.4 | 0.4 | 0 | 0 | 0 | 0 | 0 | 0 |
| 12 | 0 | 0 | 0 | 0 | 0 | 0 | 0 | 0.4 | 0.4 | 0.4 | 0.4 | 0.4 | 0.4 | 0 | 0 | 0 | 0 | 0 | 0 |
| 13 | 0 | 0 | 0 | 0 | 0 | 0 | 0 | 0.4 | 0.4 | 0.4 | 0.6 | 0.6 | 0.6 | 0.2 | 0.2 | 0.2 | 0.2 | 0.2 | 0.2 |
| 14 | 0 | 0 | 0 | 0 | 0 | 0 | 0 | 0.4 | 0.4 | 0.4 | 0.6 | 0.6 | 0.7 | 0.8 | 0.8 | 0.7 | 0.8 | 0.8 | 0.2 |
| 15 | 0 | 0 | 0 | 0 | 0 | 0.4 | 0.4 | 0.4 | 0.4 | 0.6 | 0.6 | 0.6 | 0.7 | 0.8 | 0.8 | 0.9 | 0.9 | 1 | 0.7 |
| 16 | 0 | 0 | 0 | 0 | 0 | 0 | 0.4 | HEATING ELEMENT H2 | | | 0.6 | 0.6 | 0.7 | 0.8 | 0.9 | 0.9 | 1 | 1 | |
| 17 | 0 | 0 | 0 | 0 | 0 | 0 | 0.4 | | | | 0.6 | 0.6 | 0.7 | 0.8 | 0.9 | 1 | 1 | 1 | FAN F3  |
| 18 | 0 | 0 | 0 | 0 | 0 | 0 | 0.4 | | | | 0.6 | 0.6 | 0.7 | 0.8 | 0.9 | 1 | 1 | 1 | |
| 19 | 0 | 0 | 0 | 0 | 0 | 0 | 0.4 | 0.4 | 0.6 | 0.6 | 0.6 | 0.6 | 0.7 | 0.8 | 0.9 | 1 | 1 | 1 | |
| 20 | 0 | 0 | 0 | 0 | 0 | 0 | 0.4 | 0.4 | 0.6 | 0.6 | 0.6 | 0.6 | 0.7 | 0.8 | 0.9 | 0.9 | 1 | 1 | 1 |
| 21 | 0 | 0 | 0 | 0 | 0 | 0 | 0.4 | 0.4 | 0.4 | 0.6 | 0.6 | 0.6 | 0.6 | 0.8 | 0.9 | 0.9 | 1 | 1 | 1 |
| 22 | 0 | 0 | 0 | 0 | 0 | 0 | 0 | 0.4 | 0.4 | 0.6 | 0.6 | 0.6 | 0.6 | 0.8 | 0.9 | 0.9 | 1 | 1 | 1 |
| 23 | 0 | 0 | 0 | 0 | 0 | 0 | 0 | 0.4 | 0.4 | 0.6 | 0.6 | 0.6 | 0.6 | 0.8 | 0.9 | 0.9 | 1 | 1 | 1 |
| 24 | 0 | 0 | 0 | 0 | 0 | 0 | 0 | 0.4 | 0.4 | 0.4 | 0.6 | 0.6 | 0.6 | 0.8 | 0.9 | 0.9 | 1 | 1 | 1 |
| 25 | 0 | 0 | 0 | 0 | 0 | 0 | 0 | 0 | 0.4 | 0.4 | 0.6 | 0.6 | 0.6 | 0.8 | 0.9 | 0.9 | 1 | 1 | 1 |
| 26 | 0 | 0 | 0 | 0 | 0 | 0 | 0 | 0 | 0.4 | 0.4 | 0.6 | 0.6 | 0.6 | 0.8 | 0.9 | 0.9 | 1 | 1 | 1 |
| 27 | EXIT | | | | | | | | | | | | | | | | | | |

| | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|
| 1 | 0 | 0 | 0 | FAN F1 | | | | 0 | 0 | FAN F2 | | | | 0 | 0 | 0 | 0 | 0 | 0 |
| 2 | 0 | 0 | 0 | 0 | 0 | 0 | 0 | 0 | 0 | 0 | 0 | 0 | 0 | 0 | 0 | 0 | 0 | 0 | 0 |
| 3 | 0 | 0 | 0 | 0 | 0 | 0 | 0 | 0 | 0 | 0 | 0 | 0 | 0 | 0 | 0 | 0 | 0 | 0 | 0 |
| 4 | 0 | 0 | 0 | 0 | 0 | 0 | 0 | 0 | 0 | 0 | 0 | 0 | 0 | 0 | 0 | 0 | 0 | 0 | 0 |
| 5 | 0 | 0 | 0 | 0 | 0 | 5 | 10 | 30 | 30 | 30 | 10 | 3 | 0 | 0 | 0 | 0 | 0 | 0 | 0 |
| 6 | 0 | 0 | 0 | 0 | 10 | 0 | 10 | HEATING ELEMENT H1 | | | 9 | 5 | 5 | 0 | 0 | 0 | 0 | 0 | 0 |
| 7 | 0 | 0 | 0 | 8 | -5 | -5 | 7 | | | | 0 | 3 | 3 | 4 | 0 | 0 | 0 | 0 | 0 |
| 8 | 0 | 0 | 3 | -4 | 4 | 4 | 4 | | | | 5 | 0 | 3 | -1 | 2 | 0 | 0 | 0 | 0 |
| 9 | 0 | 0 | 3 | 0 | 3 | -2 | 0 | 2 | 3 | 2 | 0 | -3 | 5 | 0 | 6 | 0 | 0 | 0 | 0 |
| 10 | 0 | 0 | 3 | 1 | -1 | -6 | 0 | -3 | -3 | -3 | -3 | -7 | 7 | -3 | -4 | 3 | 0 | 0 | 0 |
| 11 | 0 | 0 | 3 | -1 | 5 | 4 | -7 | -3 | -6 | -4 | -5 | 5 | -6 | 1 | 1 | 6 | 0 | 0 | 0 |
| 12 | 0 | 0 | 6 | -1 | 3 | -6 | -5 | 3 | 2 | 1 | -1 | -2 | 7 | 0 | -4 | -2 | 6 | 0 | 0 |
| 13 | 0 | 3 | -6 | 4 | -1 | 7 | -7 | 8 | 5 | 6 | -1 | -4 | 3 | 0 | 0 | -6 | -4 | 3 | 0 |
| 14 | 0 | 3 | -1 | -4 | 1 | 0 | -6 | 5 | -3 | 3 | 0 | -2 | -1 | -2 | -5 | 2 | -6 | 3 | 0 |
| 15 | 0 | 6 | -1 | -2 | 0 | 2 | 8 | 25 | 26 | 25 | -3 | 4 | 0 | -2 | 1 | 1 | 4 | 0 | 0 |
| 16 | 3 | -6 | 4 | -2 | 4 | 6 | 16 | HEATING ELEMENT H2 | | | 28 | 0 | 1 | 4 | 2 | 1 | 0 | 0 | |
| 17 | 3 | -1 | -4 | 6 | -2 | 0 | 7 | | | | 26 | 3 | 2 | 0 | 0 | 0 | 0 | 0 | FAN F3 |
| 18 | 3 | -1 | 3 | -2 | 0 | 9 | 8 | | | | 24 | 0 | 2 | 0 | 0 | 0 | 0 | 0 | |
| 19 | 6 | 1 | -3 | -4 | -6 | -5 | -8 | 8 | 3 | 10 | 10 | 0 | 6 | 3 | 3 | 3 | 0 | 0 | |
| 20 | -4 | 6 | -3 | 5 | 6 | 0 | -5 | 0 | -4 | -5 | 3 | -1 | 1 | -1 | -1 | -6 | 6 | 0 | 0 |
| 21 | -7 | 0 | 1 | -5 | 5 | -4 | -8 | 6 | 2 | -3 | -3 | 5 | -2 | -2 | -4 | 4 | -6 | 3 | 0 |
| 22 | -5 | 2 | 1 | -3 | 3 | -2 | -4 | -5 | -7 | -3 | -2 | 8 | 0 | 0 | 0 | -4 | -1 | 3 | 0 |
| 23 | -5 | 2 | 1 | -3 | 0 | 3 | 5 | 5 | 5 | 3 | -2 | -2 | 3 | 0 | 0 | -2 | -1 | 3 | 0 |
| 24 | -5 | 2 | 1 | -3 | 0 | 0 | 0 | 0 | 0 | 0 | 0 | -7 | 5 | 0 | 0 | -2 | -1 | 3 | 0 |
| 25 | -5 | 2 | 1 | -3 | 0 | 0 | 0 | 0 | 0 | 0 | 0 | -5 | 5 | 0 | 0 | -2 | -1 | 3 | 0 |
| 26 | -5 | 2 | 1 | -3 | 0 | 0 | 0 | 0 | 0 | 0 | 0 | -5 | 5 | 0 | 0 | -2 | -1 | 3 | 0 |
| 27 | EXIT | | | | | | | | | | | | | | | | | | |

TRANSFERRED QUANTITY OF HEAT

SMALL　　　　　　　　LARGE

FIG. 35

| | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|
| 1 | 0 | 0 | 0 | FAN F1 | | | | 0 | 0 | FAN F2 | | | | 0 | 0 | 0 | 0 | 0 | 0 |
| 2 | 0 | 0 | 0 | 0 | 0 | 0 | 0 | 0 | 0 | 0 | 0 | 0 | 0 | 0 | 0 | 0 | 0 | 0 | 0 |
| 3 | 0 | 0 | 0 | 0 | 0 | 0 | 0 | 0 | 0 | 0 | 0 | 0 | 0 | 0 | 0 | 0 | 0 | 0 | 0 |
| 4 | 0 | 0 | 0 | 0 | 0 | 0 | 0 | 0 | 0 | 0 | 0 | 0 | 0 | 0 | 0 | 0 | 0 | 0 | 0 |
| 5 | 0 | 0 | 0 | 0 | 0 | 5 | 9 | 27 | 12 | 6 | 0 | 0 | 0 | 0 | 0 | 0 | 0 | 0 | 0 |
| 6 | 0 | 0 | 0 | 0 | 10 | 0 | 9 | HEATING ELEMENT H1 | | | 0 | 0 | 0 | 0 | 0 | 0 | 0 | 0 | 0 |
| 7 | 0 | 0 | 0 | 8 | -5 | -5 | 6.3 | | | | 0 | 0 | 0 | 0 | 0 | 0 | 0 | 0 | 0 |
| 8 | 0 | 0 | 3 | -4 | 4 | 3.6 | 3.6 | | | | 0 | 0 | 0 | 0 | 0 | 0 | 0 | 0 | 0 |
| 9 | 0 | 0 | 3 | 0 | 3 | -1.8 | 0 | 1.4 | 1.5 | 0.4 | 0 | 0 | 0 | 0 | 0 | 0 | 0 | 0 | 0 |
| 10 | 0 | 0 | 3 | 1 | -1 | -5.4 | -1.6 | -2.1 | -1.5 | -0.6 | -0.6 | 0 | 0 | 0 | 0 | 0 | 0 | 0 | 0 |
| 11 | 0 | 0 | 3 | -1 | 4.5 | 3.6 | -5.6 | -2.1 | -3 | -0.8 | -1 | 0 | 0 | 0 | 0 | 0 | 0 | 0 | 0 |
| 12 | 0 | 0 | 6 | -1 | 2.7 | -5.4 | -4 | 1.5 | 0.6 | 0.2 | -0.2 | 0 | 0 | 0 | 0 | 0 | 0 | 0 | 0 |
| 13 | 0 | 3 | -6 | 4 | -0.9 | 6.3 | -5.6 | 4 | 1.5 | 1.2 | -0.2 | -0.8 | 0 | 0 | 0 | 0 | 0 | 0 | 0 |
| 14 | 0 | 3 | -1 | -3.6 | 0.9 | 0 | -4.8 | 2.5 | -0.9 | 0.6 | 0 | -0.4 | 0 | 0 | 0 | 0 | 0 | 0 | 0 |
| 15 | 0 | 6 | -1 | -1.8 | 0 | 1 | 4 | 12.5 | 7.8 | 5 | -0.6 | 0.8 | 0 | 0 | 0 | 0 | 0 | 0 | 0 |
| 16 | 3 | -6 | 4 | -1.8 | 2.4 | 3 | 8 | HEATING ELEMENT H2 | | | 2.8 | 0 | 0.1 | 0.4 | 0 | 0 | 0 | 0 | |
| 17 | 3 | -1 | -4 | 5.4 | -1.6 | 0 | 3.5 | | | | 2.6 | 0.3 | 0.2 | 0 | 0 | 0 | 0 | 0 | FAN F3 |
| 18 | 3 | -1 | 2.7 | -1.8 | 0 | 7.2 | 4 | | | | 2.4 | 0 | 0.2 | 0 | 0 | 0 | 0 | 0 | |
| 19 | 6 | 1 | -2.7 | -3.2 | -4.8 | -4 | -4 | 4 | 0.6 | 2 | 1 | 0 | 0.6 | 0.3 | 0 | 0 | 0 | 0 | |
| 20 | -4 | 6 | -2.7 | 4 | 4.8 | 0 | -2.5 | 0 | -0.8 | -1 | 0.3 | -0.1 | 0.1 | -0.1 | 0 | 0 | 0 | 0 | 0 |
| 21 | -7 | 0 | 0.8 | -4 | 4 | -3.2 | -4 | 3 | 0.4 | -0.6 | -0.3 | 0.5 | -0.2 | -0.2 | 0 | 0 | 0 | 0 | 0 |
| 22 | -4.5 | 1.8 | 0.8 | -2.4 | 2.4 | -1.6 | -2 | -2.5 | -1.4 | -0.6 | -0.2 | 0.8 | 0 | 0 | 0 | 0 | 0 | 0 | 0 |
| 23 | -4.5 | 1.8 | 0.8 | -2.4 | 0 | 2.1 | 2.5 | 2.5 | 1 | 0.6 | -0.2 | -0.2 | 0.3 | 0 | 0 | 0 | 0 | 0 | 0 |
| 24 | -4.5 | 1.8 | 0.8 | -2.4 | 0 | 0 | 0 | 0 | 0 | 0 | 0 | -0.7 | 0.5 | 0 | 0 | 0 | 0 | 0 | 0 |
| 25 | -4.5 | 1.8 | 0.8 | -2.4 | 0 | 0 | 0 | 0 | 0 | 0 | 0 | -0.5 | 0.5 | 0 | 0 | 0 | 0 | 0 | 0 |
| 26 | -4.5 | 1.8 | 0.8 | -2.4 | 0 | 0 | 0 | 0 | 0 | 0 | 0 | -0.5 | 0.5 | 0 | 0 | 0 | 0 | 0 | 0 |
| 27 | EXIT | | | | | | | | | | | | | | | | | | |

FIG. 36

| | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|
| 1 | 0 | 0 | 0 | FAN F1 | | | | 0 | 0 | FAN F2 | | | | 0 | 0 | 0 | 0 | 0 | 0 |
| 2 | 0 | 0 | 0 | 0 | 0 | 0 | 0 | 0 | 0 | 0 | 0 | 0 | 0 | 0 | 0 | 0 | 0 | 0 | 0 |
| 3 | 0 | 0 | 0 | 0 | 0 | 0 | 0 | 0 | 0 | 0 | 0 | 0 | 0 | 0 | 0 | 0 | 0 | 0 | 0 |
| 4 | 0 | 0 | 0 | 0 | 0 | 0 | 0 | 0 | 0 | 0 | 0 | 0 | 0 | 0 | 0 | 0 | 0 | 0 | 0 |
| 5 | 0 | 0 | 0 | 0 | 0 | 0 | 1 | 3 | 18 | 24 | 10 | 3 | 0 | 0 | 0 | 0 | 0 | 0 | 0 |
| 6 | 0 | 0 | 0 | 0 | 0 | 0 | 1 | HEATING ELEMENT H1 | | | 9 | 5 | 5 | 0 | 0 | 0 | 0 | 0 | 0 |
| 7 | 0 | 0 | 0 | 0 | 0 | 0 | 0.7 | | | | 0 | 3 | 3 | 4 | 0 | 0 | 0 | 0 | 0 |
| 8 | 0 | 0 | 0 | 0 | 0 | 0.4 | 0.4 | | | | 5 | 0 | 3 | -1 | 2 | 0 | 0 | 0 | 0 |
| 9 | 0 | 0 | 0 | 0 | 0 | -0.2 | 0 | 0.6 | 1.5 | 1.6 | 0 | -3 | 5 | 0 | 6 | 0 | 0 | 0 | 0 |
| 10 | 0 | 0 | 0 | 0 | 0 | -0.6 | -0.4 | -0.9 | -1.5 | -2.4 | -2.4 | -7 | 7 | -3 | -4 | 3 | 0 | 0 | 0 |
| 11 | 0 | 0 | 0 | 0 | 0.5 | 0.4 | -1.4 | -0.9 | -3 | -3.2 | -2 | 3 | -3.6 | 1 | 1 | 6 | 0 | 0 | 0 |
| 12 | 0 | 0 | 0 | 0 | 0.3 | -0.6 | -1 | 0.3 | 0.6 | 0.4 | -0.4 | -1.2 | 4.2 | 0 | -4 | -2 | 6 | 0 | 0 |
| 13 | 0 | 0 | 0 | 0 | -0.1 | 0.7 | -1.4 | 0.8 | 1.5 | 2.4 | -0.2 | -0.8 | 1.2 | 0 | 0 | -4.8 | -3.2 | 2.4 | 0 |
| 14 | 0 | 0 | 0 | -0.4 | 0.1 | 0 | -1.2 | 0.5 | -0.9 | 1.2 | 0 | -0.4 | -0.3 | -0.4 | -1 | 0.6 | -1.2 | 0.6 | 0 |
| 15 | 0 | 0 | 0 | -0.2 | 0 | 0.2 | 0.8 | 2.5 | 7.8 | 5 | -0.6 | 0.8 | 0 | -0.4 | 0.2 | 0.1 | 0.4 | 0 | 0 |
| 16 | 0 | 0 | 0 | -0.2 | 1.6 | 3 | 1.6 | HEATING ELEMENT H2 | | | 8.4 | 0 | 0.2 | 0.4 | 0.2 | 0.1 | 0 | 0 | |
| 17 | 0 | 0 | 0 | 0.6 | -0.4 | 0 | 0.7 | | | | 7.8 | 0.9 | 0.4 | 0 | 0 | 0 | 0 | 0 | FAN F3 |
| 18 | 0 | 0 | 0 | -0.2 | 0 | 1.8 | 0.8 | | | | 7.2 | 0 | 0.4 | 0 | 0 | 0 | 0 | 0 | |
| 19 | 0 | 0 | 0 | -0.8 | -1.2 | -1 | -0.8 | 0.8 | 0.6 | 2 | 3 | 0 | 1.2 | 0.3 | 0.3 | 0 | 0 | 0 | |
| 20 | 0 | 0 | 0 | 1 | 1.2 | 0 | -0.5 | 0 | -0.8 | -1 | 0.9 | -0.3 | 0.2 | -0.1 | -0.1 | -0.6 | 0 | 0 | 0 |
| 21 | 0 | 0 | 0.2 | -1 | 1 | -0.8 | -0.8 | 0.6 | 0.8 | -0.6 | -0.9 | 1.5 | -0.6 | -0.2 | -0.4 | 0.4 | 0 | 0 | 0 |
| 22 | -0.5 | 0.2 | 0.2 | -0.6 | 0.6 | -0.4 | -2 | -0.5 | -2.8 | -0.6 | -0.6 | 2.4 | 0 | 0 | 0 | -0.4 | 0 | 0 | 0 |
| 23 | -0.5 | 0.2 | 0.2 | -0.6 | 0 | 0.9 | 2.5 | 0.5 | 2 | 0.6 | -0.6 | -0.6 | 0.9 | 0 | 0 | -0.2 | 0 | 0 | 0 |
| 24 | -0.5 | 0.2 | 0.2 | -0.6 | 0 | 0 | 0 | 0 | 0 | 0 | 0 | -2.1 | 1.5 | 0 | 0 | -0.2 | 0 | 0 | 0 |
| 25 | -0.5 | 0.2 | 0.2 | -0.6 | 0 | 0 | 0 | 0 | 0 | 0 | 0 | -1.5 | 1.5 | 0 | 0 | -0.2 | 0 | 0 | 0 |
| 26 | -0.5 | 0.2 | 0.2 | -0.6 | 0 | 0 | 0 | 0 | 0 | 0 | 0 | -1.5 | 1.5 | 0 | 0 | -0.2 | 0 | 0 | 0 |
| 27 | EXIT | | | | | | | | | | | | | | | | | | |

FIG. 37

| | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|
| 1 | 0 | 0 | 0 | FAN F1 | | | | 0 | 0 | | FAN F2 | | | 0 | 0 | 0 | 0 | 0 | 0 |
| 2 | 0 | 0 | 0 | 0 | 0 | 0 | 0 | 0 | 0 | 0 | 0 | 0 | 0 | 0 | 0 | 0 | 0 | 0 | 0 |
| 3 | 0 | 0 | 0 | 0 | 0 | 0 | 0 | 0 | 0 | 0 | 0 | 0 | 0 | 0 | 0 | 0 | 0 | 0 | 0 |
| 4 | 0 | 0 | 0 | 0 | 0 | 0 | 0 | 0 | 0 | 0 | 0 | 0 | 0 | 0 | 0 | 0 | 0 | 0 | 0 |
| 5 | 0 | 0 | 0 | 0 | 0 | 0 | 0 | 0 | 0 | 0 | 0 | 0 | 0 | 0 | 0 | 0 | 0 | 0 | 0 |
| 6 | 0 | 0 | 0 | 0 | 0 | 0 | 0 | HEATING ELEMENT H1 | | | 0 | 0 | 0 | 0 | 0 | 0 | 0 | 0 | 0 |
| 7 | 0 | 0 | 0 | 0 | 0 | 0 | 0 | | | | 0 | 0 | 0 | 0 | 0 | 0 | 0 | 0 | 0 |
| 8 | 0 | 0 | 0 | 0 | 0 | 0 | 0 | | | | 0 | 0 | 0 | 0 | 0 | 0 | 0 | 0 | 0 |
| 9 | 0 | 0 | 0 | 0 | 0 | 0 | 0 | 0 | 0 | 0 | 0 | 0 | 0 | 0 | 0 | 0 | 0 | 0 | 0 |
| 10 | 0 | 0 | 0 | 0 | 0 | 0 | 0 | 0 | 0 | 0 | 0 | 0 | 0 | 0 | 0 | 0 | 0 | 0 | 0 |
| 11 | 0 | 0 | 0 | 0 | 0 | 0 | 0 | 0 | 0 | 0 | -2 | 2 | -2.4 | 0 | 0 | 0 | 0 | 0 | 0 |
| 12 | 0 | 0 | 0 | 0 | 0 | 0 | 0 | 1.2 | 0.8 | 0.4 | -0.4 | -0.8 | 2.8 | 0 | 0 | 0 | 0 | 0 | 0 |
| 13 | 0 | 0 | 0 | 0 | 0 | 0 | 0 | 3.2 | 2 | 2.4 | -0.6 | -2.4 | 1.8 | 0 | 0 | -1.2 | -0.8 | 0.6 | 0 |
| 14 | 0 | 0 | 0 | 0 | 0 | 0 | 0 | 2 | -1.2 | 1.2 | 0 | -1.2 | -0.7 | -1.6 | -4 | 1.4 | -4.8 | 2.4 | 0 |
| 15 | 0 | 0 | 0 | 0 | 0 | 0 | 3.2 | 10 | 10.4 | 15 | -1.8 | 2.4 | 0 | -1.6 | 0.8 | 0.9 | 3.6 | 0 | 0 |
| 16 | 0 | 0 | 0 | 0 | 0 | 0 | 6.4 | HEATING ELEMENT H2 | | | 16.8 | 0 | 0.7 | 3.2 | 1.8 | 0.9 | 0 | 0 | |
| 17 | 0 | 0 | 0 | 0 | 0 | 0 | 2.8 | | | | 15.6 | 1.8 | 1.4 | 0 | 0 | 0 | 0 | 0 | FAN F3 |
| 18 | 0 | 0 | 0 | 0 | 0 | 0 | 3.2 | | | | 14.4 | 0 | 1.4 | 0 | 0 | 0 | 0 | 0 | |
| 19 | 0 | 0 | 0 | 0 | 0 | 0 | -3.2 | 3.2 | 1.8 | 6 | 6 | 0 | 4.2 | 2.4 | 2.7 | 3 | 0 | 0 | |
| 20 | 0 | 0 | 0 | 0 | 0 | 0 | -2 | 0 | -2.4 | -3 | 1.8 | -0.6 | 0.7 | -0.8 | -0.9 | -5.4 | 6 | 0 | 0 |
| 21 | 0 | 0 | 0 | 0 | 0 | 0 | -3.2 | 2.4 | 0.8 | -1.8 | -1.8 | 3 | -1.2 | -1.6 | -3.6 | 3.6 | -6 | 3 | 0 |
| 22 | 0 | 0 | 0 | 0 | 0 | 0 | 0 | -2 | -2.8 | -1.8 | -1.2 | 4.8 | 0 | 0 | 0 | -3.6 | -1 | 3 | 0 |
| 23 | 0 | 0 | 0 | 0 | 0 | 0 | 0 | 2 | 2 | 1.8 | -1.2 | -1.2 | 1.8 | 0 | 0 | -1.8 | -1 | 3 | 0 |
| 24 | 0 | 0 | 0 | 0 | 0 | 0 | 0 | 0 | 0 | 0 | 0 | -4.2 | 3 | 0 | 0 | -1.8 | -1 | 3 | 0 |
| 25 | 0 | 0 | 0 | 0 | 0 | 0 | 0 | 0 | 0 | 0 | 0 | -3 | 3 | 0 | 0 | -1.8 | -1 | 3 | 0 |
| 26 | 0 | 0 | 0 | 0 | 0 | 0 | 0 | 0 | 0 | 0 | 0 | -3 | 3 | 0 | 0 | -1.8 | -1 | 3 | 0 |
| 27 | EXIT | | | | | | | | | | | | | | | | | | |

| | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|
| 1 | 0 | 0 | 0 | \multicolumn{4}{c|}{FAN F1} | 0 | 0 | \multicolumn{4}{c|}{FAN F2} | 0 | 0 | 0 | 0 | 0 | 0 |
| 2 | 0 | 0 | 0 | 0 | 0 | 0 | 0 | 0 | 0 | 0 | 0 | 0 | 0 | 0 | 0 | 0 | 0 | 0 | 0 |
| 3 | 0 | 0 | 0 | 0 | 0 | 0 | 0 | 0 | 0 | 0 | 0 | 0 | 0 | 0 | 0 | 0 | 0 | 0 | 0 |
| 4 | 0 | 0 | 0 | 0 | 0 | 0 | 0 | 0 | 0 | 0 | 0 | 0 | 0 | 0 | 0 | 0 | 0 | 0 | 0 |
| 5 | 0 | 0 | 0 | 0 | 2 | 7 | 15 | 27 | 20 | 15 | 8 | 0 | 0 | 0 | 0 | 0 | 0 | 0 | 0 |
| 6 | 0 | 0 | 0 | 2 | 4 | 8 | 15 | | | | 8 | 5 | 0 | 0 | 0 | 0 | 0 | 0 | 0 |
| 7 | 0 | 0 | 1 | 3 | 5 | 9 | 15 | \multicolumn{3}{c|}{HEATING ELEMENT H1} | 8 | 4 | 1 | 0 | 0 | 0 | 0 | 0 | 0 |
| 8 | 0 | 1 | 2 | 4 | 7 | 10 | 15 | | | | 8 | 3 | 1 | 0 | 0 | 0 | 0 | 0 | 0 |
| 9 | 0 | 0 | 3 | 3 | 9 | 10 | 15 | 15 | 14 | 10 | 8 | 3 | 2 | 1 | 0 | 0 | 0 | 0 | 0 |
| 10 | 0 | 1 | 3 | 6 | 10 | 12 | 14 | 14 | 14 | 9 | 5 | 3 | 2 | 1 | 0 | 0 | 0 | 0 | 0 |
| 11 | 0 | 1 | 3 | 3 | 8 | 13 | 13 | 13 | 13 | 10 | 6 | 3 | 2 | 1 | 0 | 0 | 0 | 0 | 0 |
| 12 | 0 | 0 | 6 | 3 | 8 | 9 | 10 | 11 | 10 | 9 | 5 | 2 | 1 | 0 | 0 | 0 | 0 | 0 | 0 |
| 13 | 0 | 3 | 3 | 4 | 7 | 8 | 10 | 10 | 9 | 8 | 4 | 2 | 1 | 0 | 0 | 0 | 0 | 0 | 0 |
| 14 | 0 | 3 | 2 | 5 | 7 | 8 | 9 | 9 | 8 | 7 | 4 | 1 | 0 | 0 | 0 | 0 | 0 | 0 | 0 |
| 15 | 0 | 6 | 2 | 5 | 7 | 8 | 10 | 13 | 9 | 5 | 4 | 0 | 0 | 0 | 0 | 0 | 0 | 0 | 0 |
| 16 | 3 | 1 | 2 | 4 | 5 | 6 | 12 | | | | 5 | 0 | 0.1 | 0.4 | 0 | 0 | 0 | 0 | |
| 17 | 3 | 1 | 2 | 4 | 6 | 8 | 13 | \multicolumn{3}{c|}{HEATING ELEMENT H2} | 7 | 3 | 0.2 | 0 | 0 | 0 | 0 | 0 | FAN F3 |
| 18 | 3 | 1 | 3 | 6 | 8 | 14 | 15 | | | | 9 | 3 | 1 | 0 | 0 | 0 | 0 | 0 | |
| 19 | 1 | 1 | 6 | 7 | 9 | 16 | 20 | 15 | 15 | 15 | 11 | 2 | 1 | 0 | 0 | 0 | 0 | 0 | |
| 20 | 1 | 3 | 6 | 7 | 10 | 17 | 17 | 17 | 15 | 15 | 12 | 7 | 2 | 1 | 0 | 0 | 0 | 0 | 0 |
| 21 | 1 | 3 | 7 | 8 | 13 | 18 | 16 | 18 | 15 | 14 | 13 | 10 | 3 | 1 | 0 | 0 | 0 | 0 | 0 |
| 22 | 1 | 2 | 3 | 5 | 10 | 18 | 16 | 18 | 15 | 13 | 10 | 1 | 0 | 0 | 0 | 0 | 0 | 0 | 0 |
| 23 | 1 | 2 | 3 | 5 | 10 | 18 | 16 | 18 | 15 | 10 | 10 | 1 | 0 | 0 | 0 | 0 | 0 | 0 | 0 |
| 24 | 1 | 2 | 3 | 5 | 10 | 18 | 16 | 18 | 15 | 10 | 9 | 1 | 0 | 0 | 0 | 0 | 0 | 0 | 0 |
| 25 | 1 | 2 | 3 | 5 | 10 | 18 | 16 | 18 | 15 | 10 | 8 | 1 | 0 | 0 | 0 | 0 | 0 | 0 | 0 |
| 26 | 1 | 2 | 3 | 5 | 10 | 18 | 16 | 18 | 15 | 10 | 8 | 1 | 0 | 0 | 0 | 0 | 0 | 0 | 0 |
| 27 | \multicolumn{19}{c|}{EXIT} |

RETAINED QUANTITY OF HEAT

SMALL · · · · · · · · · · · · · · · LARGE

FIG. 39

| | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|
| 1 | 0 | 0 | 0 | \multicolumn{4}{l}{FAN F1} | | | 0 | 0 | \multicolumn{3}{l}{FAN F2} | | 0 | 0 | 0 | 0 | 0 | 0 |
| 2 | 0 | 0 | 0 | 0 | 0 | 0 | 0 | 0 | 0 | 0 | 0 | 0 | 0 | 0 | 0 | 0 | 0 | 0 | 0 |
| 3 | 0 | 0 | 0 | 0 | 0 | 0 | 0 | 0 | 0 | 0 | 0 | 0 | 0 | 0 | 0 | 0 | 0 | 0 | 0 |
| 4 | 0 | 0 | 0 | 0 | 0 | 0 | 0 | 0 | 0 | 0 | 0 | 0 | 0 | 0 | 0 | 0 | 0 | 0 | 0 |
| 5 | 0 | 0 | 0 | 0 | 0 | 0 | 8 | 15 | 20 | 27 | 15 | 7 | 2 | 0 | 0 | 0 | 0 | 0 | 0 |
| 6 | 0 | 0 | 0 | 0 | 0 | 5 | 8 | | | | 15 | 8 | 4 | 2 | 0 | 0 | 0 | 0 | 0 |
| 7 | 0 | 0 | 0 | 0 | 1 | 4 | 8 | \multicolumn{3}{c}{HEATING ELEMENT H1} | 15 | 9 | 5 | 3 | 1 | 0 | 0 | 0 | 0 |
| 8 | 0 | 0 | 0 | 0 | 1 | 3 | 8 | | | | 15 | 10 | 7 | 4 | 2 | 1 | 0 | 0 | 0 |
| 9 | 0 | 0 | 0 | 1 | 2 | 3 | 8 | 10 | 14 | 15 | 15 | 10 | 9 | 3 | 3 | 2 | 1 | 0 | 0 |
| 10 | 0 | 0 | 0 | 1 | 2 | 3 | 5 | 9 | 14 | 13 | 14 | 12 | 10 | 6 | 3 | 3 | 1 | 0 | 0 |
| 11 | 0 | 0 | 0 | 1 | 2 | 3 | 6 | 10 | 13 | 13 | 13 | 13 | 8 | 3 | 3 | 3 | 1 | 0 | 0 |
| 12 | 0 | 0 | 0 | 0 | 1 | 2 | 5 | 9 | 10 | 11 | 10 | 9 | 8 | 3 | 6 | 3 | 0 | 0 | 0 |
| 13 | 0 | 0 | 0 | 0 | 1 | 2 | 4 | 8 | 9 | 10 | 10 | 8 | 7 | 4 | 3 | 0 | 0 | 0 | 0 |
| 14 | 0 | 0 | 0 | 0 | 0 | 1 | 4 | 7 | 8 | 9 | 9 | 8 | 7 | 5 | 2 | 0 | 0 | 0 | 0 |
| 15 | 0 | 0 | 0 | 0 | 0 | 0 | 4 | 5 | 9 | 13 | 10 | 8 | 7 | 5 | 2 | 0 | 0 | 0 | 0 |
| 16 | 0 | 0 | 0 | 0 | 0 | 0 | 5 | | | | 5 | 6 | 5 | 4 | 2 | 0 | 0 | 0 | |
| 17 | 0 | 0 | 0 | 0 | 0 | 3 | 7 | \multicolumn{3}{c}{HEATING ELEMENT H2} | 7 | 8 | 6 | 4 | 2 | 0 | 0 | 0 | FAN F3 |
| 18 | 0 | 0 | 0 | 0 | 1 | 3 | 9 | | | | 9 | 14 | 8 | 6 | 3 | 0 | 0 | 0 | |
| 19 | 0 | 0 | 0 | 0 | 1 | 2 | 11 | 15 | 15 | 15 | 15 | 16 | 9 | 7 | 6 | 0 | 0 | 0 | |
| 20 | 0 | 0 | 0 | 1 | 2 | 7 | 12 | 15 | 15 | 15 | 17 | 17 | 10 | 7 | 6 | 0 | 0 | 0 | 0 |
| 21 | 0 | 0 | 0 | 1 | 3 | 10 | 13 | 14 | 15 | 14 | 18 | 18 | 13 | 8 | 7 | 0 | 0 | 0 | 0 |
| 22 | 0 | 0 | 0 | 0 | 0 | 1 | 10 | 13 | 15 | 13 | 18 | 18 | 10 | 5 | 3 | 0 | 0 | 0 | 0 |
| 23 | 0 | 0 | 0 | 0 | 0 | 1 | 10 | 10 | 15 | 10 | 18 | 18 | 10 | 5 | 3 | 0 | 0 | 0 | 0 |
| 24 | 0 | 0 | 0 | 0 | 0 | 1 | 9 | 10 | 15 | 10 | 18 | 18 | 10 | 5 | 3 | 0 | 0 | 0 | 0 |
| 25 | 0 | 0 | 0 | 0 | 0 | 1 | 8 | 10 | 15 | 10 | 18 | 18 | 10 | 5 | 3 | 0 | 0 | 0 | 0 |
| 26 | 0 | 0 | 0 | 0 | 0 | 1 | 8 | 10 | 15 | 10 | 18 | 18 | 10 | 5 | 3 | 0 | 0 | 0 | 0 |
| 27 | \multicolumn{19}{c}{EXIT} | | | | | | | | | | | | | | | | | | |

FIG. 40

|    | 1 | 2 | 3 | 4 | 5 | 6 | 7 | 8 | 9 | 10 | 11 | 12 | 13 | 14 | 15 | 16 | 17 | 18 | 19 |
|----|---|---|---|---|---|---|---|---|---|----|----|----|----|----|----|----|----|----|----|
| 1  | 0 | 0 | 0 | \multicolumn{4}{c}{FAN F1} | | | | 0 | 0 | \multicolumn{3}{c}{FAN F2} | | | 0 | 0 | 0 | 0 | 0 | 0 |
| 2  | 0 | 0 | 0 | 0 | 0 | 0 | 0 | 0 | 0 | 0 | 0 | 0 | 0 | 0 | 0 | 0 | 0 | 0 | 0 |
| 3  | 0 | 0 | 0 | 0 | 0 | 0 | 0 | 0 | 0 | 0 | 0 | 0 | 0 | 0 | 0 | 0 | 0 | 0 | 0 |
| 4  | 0 | 0 | 0 | 0 | 0 | 0 | 0 | 0 | 0 | 0 | 0 | 0 | 0 | 0 | 0 | 0 | 0 | 0 | 0 |
| 5  | 0 | 0 | 0 | 0 | 0 | 0 | 0 | 0 | 0 | 0 | 0 | 0 | 0 | 0 | 0 | 0 | 0 | 0 | 0 |
| 6  | 0 | 0 | 0 | 0 | 0 | 0 | 0 | \multicolumn{3}{c}{HEATING ELEMENT H1} | | | 0 | 0 | 0 | 0 | 0 | 0 | 0 |
| 7  | 0 | 0 | 0 | 0 | 0 | 0 | 0 | | | | 0 | 0 | 0 | 0 | 0 | 0 | 0 | 0 | 0 |
| 8  | 0 | 0 | 0 | 0 | 0 | 0 | 0 | | | | 0 | 0 | 0 | 0 | 0 | 0 | 0 | 0 | 0 |
| 9  | 0 | 0 | 0 | 0 | 0 | 0 | 0 | 0 | 0 | 0 | 0 | 0 | 0 | 0 | 0 | 0 | 0 | 0 | 0 |
| 10 | 0 | 0 | 0 | 0 | 0 | 0 | 0 | 0 | 0 | 0 | 0 | 0 | 0 | 0 | 0 | 0 | 0 | 0 | 0 |
| 11 | 0 | 0 | 0 | 0 | 0 | 0 | 0 | 0 | 0 | 0 | 0 | 0 | 0 | 0 | 0 | 0 | 0 | 0 | 0 |
| 12 | 0 | 0 | 0 | 0 | 0 | 0 | 0 | 0 | 0 | 0 | 0 | 0 | 0 | 0 | 0 | 0 | 0 | 0 | 0 |
| 13 | 0 | 0 | 0 | 0 | 0 | 0 | 0 | 0 | 0 | 0 | 0 | 0 | 0 | 0 | 0 | 0 | 0 | 0 | 0 |
| 14 | 0 | 0 | 0 | 0 | 0 | 0 | 0 | 0 | 0 | 0 | 0 | 0 | 0 | 0 | 0 | 0 | 0 | 0 | 0 |
| 15 | 0 | 0 | 0 | 0 | 0 | 0 | 4 | 5 | 2 | 2 | 1 | 0 | 0 | 0 | 0 | 0 | 0 | 0 | 0 |
| 16 | 0 | 0 | 0 | 0 | 0 | 0 | 5 | \multicolumn{3}{c}{HEATING ELEMENT H2} | | | 1 | 0 | 0 | 0 | 0 | 0 | 0 | |
| 17 | 0 | 0 | 0 | 0 | 0 | 3 | 7 | | | | 1 | 0 | 0 | 0 | 0 | 0 | 0 | FAN F3 |
| 18 | 0 | 0 | 0 | 0 | 1 | 3 | 9 | | | | 2 | 1 | 0 | 0 | 0 | 0 | 0 | |
| 19 | 0 | 0 | 0 | 0 | 1 | 2 | 8 | 7 | 7 | 7 | 3 | 2 | 0 | 0 | 0 | 0 | 0 | |
| 20 | 0 | 0 | 0 | 1 | 2 | 7 | 9 | 7 | 7 | 7 | 4 | 4 | 0 | 0 | 0 | 0 | 0 | 0 |
| 21 | 0 | 0 | 0 | 1 | 3 | 10 | 11 | 7 | 7 | 7 | 7 | 5 | 0 | 0 | 0 | 0 | 0 | 0 |
| 22 | 0 | 1 | 1 | 1 | 1 | 1 | 7 | 7 | 7 | 7 | 7 | 7 | 5 | 5 | 0 | 0 | 0 | 0 |
| 23 | 0 | 1 | 1 | 1 | 1 | 1 | 10 | 7 | 7 | 7 | 7 | 7 | 5 | 5 | 3 | 0 | 0 | 0 |
| 24 | 0 | 1 | 1 | 1 | 1 | 1 | 9 | 7 | 7 | 7 | 7 | 7 | 5 | 5 | 3 | 0 | 0 | 0 |
| 25 | 0 | 1 | 1 | 1 | 1 | 1 | 8 | 7 | 7 | 7 | 7 | 7 | 5 | 5 | 3 | 0 | 0 | 0 |
| 26 | 0 | 1 | 1 | 1 | 1 | 1 | 8 | 7 | 7 | 7 | 7 | 7 | 5 | 5 | 3 | 0 | 0 | 0 |
| 27 | \multicolumn{19}{c}{EXIT} | | | | | | | | | | | | | | | | | | |

FIG. 46

| | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|
| 1 | 0 | 0 | 0 | FAN F1 | | | | 0 | 0 | FAN F2 | | | 0 | 0 | 0 | 0 | 0 | 0 | 0 |
| 2 | 0 | 0 | 0 | 0 | 0 | 0 | 0 | 0 | 0 | 0 | 0 | 0 | 0 | 0 | 0 | 0 | 0 | 0 | 0 |
| 3 | 0 | 0 | 0 | 0 | 0 | 0 | 0 | 0 | 0 | 0 | 0 | 0 | 0 | 0 | 0 | 0 | 0 | 0 | 0 |
| 4 | 0 | 0 | 0 | 0 | 0 | 0 | 0 | 0 | 0 | 0 | 0 | 0 | 0 | 0 | 0 | 0 | 0 | 0 | 0 |
| 5 | 0 | 0 | 0 | 0 | 0 | 5 | 9 | 27 | 12 | 6 | 0 | 0 | 0 | 0 | 0 | 0 | 0 | 0 | 0 |
| 6 | 0 | 0 | 0 | 0 | 10 | 0 | 9 | HEATING ELEMENT H1 | | | 0 | 0 | 0 | 0 | 0 | 0 | 0 | 0 | 0 |
| 7 | 0 | 0 | 0 | 8 | -5 | -5 | 6.3 | | | | 0 | 0 | 0 | 0 | 0 | 0 | 0 | 0 | 0 |
| 8 | 0 | 0 | 3 | -4 | 4 | 3.6 | 3.6 | | | | 0 | 0 | 0 | 0 | 0 | 0 | 0 | 0 | 0 |
| 9 | 0 | 0 | 3 | 0 | 3 | -1.8 | 0 | 1.4 | 1.5 | 0.4 | 0 | 0 | 0 | 0 | 0 | 0 | 0 | 0 | 0 |
| 10 | 0 | 0 | 3 | 1 | -1 | -5.4 | -1.6 | -2.1 | -1.5 | -0.6 | -0.6 | 0 | 0 | 0 | 0 | 0 | 0 | 0 | 0 |
| 11 | 0 | 0 | 3 | -1 | 4.5 | 3.6 | -5.6 | -2.1 | -3 | -0.8 | -1 | 0 | 0 | 0 | 0 | 0 | 0 | 0 | 0 |
| 12 | 0 | 0 | 6 | -1 | 2.7 | -5.4 | -4 | 1.5 | 0.6 | 0.2 | -0.2 | 0 | 0 | 0 | 0 | 0 | 0 | 0 | 0 |
| 13 | 0 | 3 | -6 | 4 | -0.9 | 6.3 | -5.6 | 4 | 1.5 | 1.2 | -0.2 | -0.8 | 0 | 0 | 0 | 0 | 0 | 0 | 0 |
| 14 | 0 | 3 | -1 | -3.6 | 0.9 | 0 | -4.8 | 2.5 | 0.9 | 0.6 | 0 | -0.4 | 0 | 0 | 0 | 0 | 0 | 0 | 0 |
| 15 | 0 | 6 | -1 | -1.8 | 0 | 1 | 4 | 6 | 3 | 2 | -0.6 | 0.8 | 0 | 0 | 0 | 0 | 0 | 0 | 0 |
| 16 | 3 | -6 | 4 | -1.8 | 2.4 | 3 | 4 | HEATING ELEMENT H2 | | | 0.5 | 0 | 0.1 | 0.4 | 0 | 0 | 0 | 0 | |
| 17 | 3 | -1 | -4 | 5.4 | -1.6 | 0 | 4 | | | | 0.7 | 0.3 | 0.2 | 0 | 0 | 0 | 0 | 0 | FAN F3 |
| 18 | 3 | -1 | 2.7 | -1.8 | 0 | 7.2 | 4 | | | | 0.6 | 0 | 0.2 | 0 | 0 | 0 | 0 | 0 | |
| 19 | 6 | 1 | -2.7 | -3.2 | -4.8 | -4 | -4 | 2 | 0.6 | 2 | 1 | 0 | 0.6 | 0.3 | 0 | 0 | 0 | 0 | |
| 20 | -4 | 6 | -2.7 | 4 | 4.8 | 0 | -2.5 | 0 | -0.8 | -1 | 0.3 | -0.1 | 0.1 | -0.1 | 0 | 0 | 0 | 0 | 0 |
| 21 | -7 | 0 | 0.8 | -4 | 4 | -3.2 | -4 | 3 | 0.4 | -0.6 | -0.3 | 0.5 | -0.2 | -0.2 | 0 | 0 | 0 | 0 | 0 |
| 22 | -4.5 | 1.8 | 0.8 | -2.4 | 2.4 | -1.6 | -2 | -2.5 | -1.4 | -0.6 | -0.2 | 0.8 | 0 | 0 | 0 | 0 | 0 | 0 | 0 |
| 23 | -4.5 | 1.8 | 0.8 | -2.4 | 0 | 2.1 | 2.5 | 2.5 | 1 | 0.6 | -0.2 | -0.2 | 0.3 | 0 | 0 | 0 | 0 | 0 | 0 |
| 24 | -4.5 | 1.8 | 0.8 | -2.4 | 0 | 0 | 0 | 0 | 0 | 0 | 0 | -0.7 | 0.5 | 0 | 0 | 0 | 0 | 0 | 0 |
| 25 | -4.5 | 1.8 | 0.8 | -2.4 | 0 | 0 | 0 | 0 | 0 | 0 | 0 | -0.5 | 0.5 | 0 | 0 | 0 | 0 | 0 | 0 |
| 26 | -4.5 | 1.8 | 0.8 | -2.4 | 0 | 0 | 0 | 0 | 0 | 0 | 0 | -0.5 | 0.5 | 0 | 0 | 0 | 0 | 0 | 0 |
| 27 | EXIT | | | | | | | | | | | | | | | | | | |

| | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|
| 1 | 0 | 0 | 0 | FAN F1 | | | | 0 | 0 | FAN F2 | | | 0 | 0 | 0 | 0 | 0 | 0 | 0 |
| 2 | 0 | 0 | 0 | 0 | 0 | 0 | 0 | 0 | 0 | 0 | 0 | 0 | 0 | 0 | 0 | 0 | 0 | 0 | 0 |
| 3 | 0 | 0 | 0 | 0 | 0 | 0 | 0 | 0 | 0 | 0 | 0 | 0 | 0 | 0 | 0 | 0 | 0 | 0 | 0 |
| 4 | 0 | 0 | 0 | 0 | 0 | 0 | 0 | 0 | 0 | 0 | 0 | 0 | 0 | 0 | 0 | 0 | 0 | 0 | 0 |
| 5 | 0 | 0 | 0 | 0 | 0 | 0 | 1 | 3 | 18 | 24 | 10 | 3 | 0 | 0 | 0 | 0 | 0 | 0 | 0 |
| 6 | 0 | 0 | 0 | 0 | 0 | 0 | 1 | HEATING ELEMENT H1 | | | | 9 | 5 | 5 | 0 | 0 | 0 | 0 | 0 |
| 7 | 0 | 0 | 0 | 0 | 0 | 0 | 0.7 | | | | 0 | 3 | 3 | 4 | 0 | 0 | 0 | 0 | 0 |
| 8 | 0 | 0 | 0 | 0 | 0 | 0.4 | 0.4 | | | | 5 | 0 | 3 | -1 | 2 | 0 | 0 | 0 | 0 |
| 9 | 0 | 0 | 0 | 0 | 0 | -0.2 | 0 | 0.6 | 1.5 | 1.6 | 0 | -3 | 5 | 0 | 6 | 0 | 0 | 0 | 0 |
| 10 | 0 | 0 | 0 | 0 | 0 | -0.6 | -0.4 | -0.9 | -1.5 | -2.4 | -2.4 | -7 | 7 | -3 | -4 | 3 | 0 | 0 | 0 |
| 11 | 0 | 0 | 0 | 0 | 0.5 | 0.4 | -1.4 | -0.9 | -3 | -3.2 | -2 | 3 | -3.6 | 1 | 1 | 6 | 0 | 0 | 0 |
| 12 | 0 | 0 | 0 | 0 | 0.3 | -0.6 | -1 | 0.3 | 0.6 | 0.4 | -0.4 | -1.2 | 4.2 | 0 | -4 | -2 | 6 | 0 | |
| 13 | 0 | 0 | 0 | 0 | -0.1 | 0.7 | -1.4 | 0.8 | 1.5 | 2.4 | -0.2 | -0.8 | 1.2 | 0 | 0 | -4.8 | -3 | 2.4 | 0 |
| 14 | 0 | 0 | 0 | -0.4 | 0.1 | 0 | -1.2 | 0.5 | -0.9 | 1.2 | 0 | -0.4 | -0.3 | -0.4 | -1 | 0.6 | -1.2 | 0.6 | 0 |
| 15 | 0 | 0 | 0 | -0.2 | 0 | 0.2 | 0.8 | 4 | 3 | 5 | -0.6 | 0.8 | 0 | -0.4 | 0.2 | 0.1 | 0.4 | 0 | 0 |
| 16 | 0 | 0 | 0 | -0.2 | 1.6 | 3 | 2 | HEATING ELEMENT H2 | | | | 2.5 | 0 | 0.2 | 0.4 | 0.2 | 0.1 | 0 | 0 |
| 17 | 0 | 0 | 0 | 0.6 | -0.4 | 0 | 0 | | | | | 2.3 | 0 | 0.4 | 0 | 0 | 0 | 0 | FAN F3 |
| 18 | 0 | 0 | 0 | -0.2 | 0 | 1.8 | 0.8 | | | | | 3.4 | 0 | 0.4 | 0 | 0 | 0 | 0 | |
| 19 | 0 | 0 | 0 | -0.8 | -1.2 | -1 | -0.8 | -3 | -0.1 | 1 | -1 | 0 | 1.2 | 0.3 | 0.3 | 0 | 0 | 0 | 0 |
| 20 | 0 | 0 | 0 | 1 | 1.2 | 0 | -0.5 | 0 | -0.8 | -1 | 0.9 | -0.3 | 0.2 | -0.1 | -0.1 | -0.6 | 0 | 0 | 0 |
| 21 | 0 | 0 | 0.2 | -1 | 1 | -0.8 | -0.8 | 0.6 | 0.8 | -0.6 | -0.9 | 1.5 | -0.6 | -0.2 | -0.4 | 0.4 | 0 | 0 | 0 |
| 22 | -0.5 | 0.2 | 0.2 | -0.6 | 0.6 | -0.4 | -2 | -0.5 | -2.8 | -0.6 | -0.6 | 2.4 | 0 | 0 | 0 | -0.4 | 0 | 0 | 0 |
| 23 | -0.5 | 0.2 | 0.2 | -0.6 | 0 | 0.9 | 2.5 | 0.5 | 2 | 0.6 | -0.6 | -0.6 | 0.9 | 0 | 0 | -0.2 | 0 | 0 | 0 |
| 24 | -0.5 | 0.2 | 0.2 | -0.6 | 0 | 0 | 0 | 0 | 0 | 0 | 0 | -2.1 | 1.5 | 0 | 0 | -0.2 | 0 | 0 | 0 |
| 25 | -0.5 | 0.2 | 0.2 | -0.6 | 0 | 0 | 0 | 0 | 0 | 0 | 0 | -1.5 | 1.5 | 0 | 0 | -0.2 | 0 | 0 | 0 |
| 26 | -0.5 | 0.2 | 0.2 | -0.6 | 0 | 0 | 0 | 0 | 0 | 0 | 0 | -1.5 | 1.5 | 0 | 0 | -0.2 | 0 | 0 | 0 |
| 27 | EXIT | | | | | | | | | | | | | | | | | | |

|  | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|
| 1 | 0 | 0 | 0 | FAN F1 | | | | 0 | 0 | FAN F2 | | | | 0 | 0 | 0 | 0 | 0 | 0 |
| 2 | 0 | 0 | 0 | 0 | 0 | 0 | 0 | 0 | 0 | 0 | 0 | 0 | 0 | 0 | 0 | 0 | 0 | 0 | 0 |
| 3 | 0 | 0 | 0 | 0 | 0 | 0 | 0 | 0 | 0 | 0 | 0 | 0 | 0 | 0 | 0 | 0 | 0 | 0 | 0 |
| 4 | 0 | 0 | 0 | 0 | 0 | 0 | 0 | 0 | 0 | 0 | 0 | 0 | 0 | 0 | 0 | 0 | 0 | 0 | 0 |
| 5 | 0 | 0 | 0 | 0 | 0 | 0 | 0 | 0 | 0 | 0 | 0 | 0 | 0 | 0 | 0 | 0 | 0 | 0 | 0 |
| 6 | 0 | 0 | 0 | 0 | 0 | 0 | 0 | HEATING ELEMENT H1 | | | 0 | 0 | 0 | 0 | 0 | 0 | 0 | 0 | 0 |
| 7 | 0 | 0 | 0 | 0 | 0 | 0 | 0 | | | | 0 | 0 | 0 | 0 | 0 | 0 | 0 | 0 | 0 |
| 8 | 0 | 0 | 0 | 0 | 0 | 0 | 0 | | | | 0 | 0 | 0 | 0 | 0 | 0 | 0 | 0 | 0 |
| 9 | 0 | 0 | 0 | 0 | 0 | 0 | 0 | 0 | 0 | 0 | 0 | 0 | 0 | 0 | 0 | 0 | 0 | 0 | 0 |
| 10 | 0 | 0 | 0 | 0 | 0 | 0 | 0 | 0 | 0 | 0 | 0 | 0 | 0 | 0 | 0 | 0 | 0 | 0 | 0 |
| 11 | 0 | 0 | 0 | 0 | 0 | 0 | 0 | 0 | 0 | 0 | -2 | 2 | -2.4 | 0 | 0 | 0 | 0 | 0 | 0 |
| 12 | 0 | 0 | 0 | 0 | 0 | 0 | 0 | 1.2 | 0.8 | 0.4 | -0.4 | -0.8 | 2.8 | 0 | 0 | 0 | 0 | 0 | |
| 13 | 0 | 0 | 0 | 0 | 0 | 0 | 0 | 3.2 | 2 | 2.4 | -0.6 | -2.4 | 1.8 | 0 | 0 | -1.2 | -0 | 0.6 | 0 |
| 14 | 0 | 0 | 0 | 0 | 0 | 0 | 0 | 2 | -1.2 | 1.2 | 0 | -1.2 | -0.7 | -1.6 | | 1.4 | -4.8 | 2.4 | 0 |
| 15 | 0 | 0 | 0 | 0 | 0 | 0.8 | 3.2 | 15 | 20 | 18 | -1.8 | 2.4 | | -1.6 | 0.8 | 0.9 | 3.6 | 0 | 0 |
| 16 | 0 | 0 | 0 | 0 | 0 | 0 | | 10 | HEATING ELEMENT H2 | | | 25 | 0 | 0.7 | 3.2 | 1.8 | 0.9 | 0 | 0 |
| 17 | 0 | 0 | 0 | 0 | 0 | 0 | | 3 | | | | 23 | 2.7 | 1.4 | 0 | 0 | 0 | 0 | FAN F3 |
| 18 | 0 | 0 | 0 | 0 | 0 | 0 | | 3.2 | | | | 20 | 0 | 1.4 | 0 | 0 | 0 | 0 | |
| 19 | 0 | 0 | 0 | 0 | 0 | 0 | | -3.2 | 9 | 2.5 | 7 | 10 | 0 | 4.2 | 2.4 | 2.7 | 3 | 0 | 0 |
| 20 | 0 | 0 | 0 | 0 | 0 | 0 | | -2 | 0 | -2.4 | -3 | 1.8 | -0.6 | 0.7 | -0.8 | -0.9 | -5.4 | 6 | 0 | 0 |
| 21 | 0 | 0 | 0 | 0 | 0 | 0 | 0 | -3.2 | 2.4 | 0.8 | -1.8 | -1.8 | 3 | -1.2 | -1.6 | -3.6 | 3.6 | -6 | 3 | 0 |
| 22 | 0 | 0 | 0 | 0 | 0 | 0 | 0 | -2 | -2.8 | -1.8 | -1.2 | 4.8 | 0 | 0 | 0 | -3.6 | -1 | 3 | 0 |
| 23 | 0 | 0 | 0 | 0 | 0 | 0 | 0 | 2 | 2 | 1.8 | -1.2 | -1.2 | 1.8 | 0 | 0 | -1.8 | -1 | 3 | 0 |
| 24 | 0 | 0 | 0 | 0 | 0 | 0 | 0 | 0 | 0 | 0 | 0 | -4.2 | 3 | 0 | 0 | -1.8 | -1 | 3 | 0 |
| 25 | 0 | 0 | 0 | 0 | 0 | 0 | 0 | 0 | 0 | 0 | 0 | -3 | 3 | 0 | 0 | -1.8 | -1 | 3 | 0 |
| 26 | 0 | 0 | 0 | 0 | 0 | 0 | 0 | 0 | 0 | 0 | 0 | -3 | 3 | 0 | 0 | -1.8 | -1 | 3 | 0 |
| 27 | EXIT | | | | | | | | | | | | | | | | | | |

| | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|
| 1 | 0 | 0 | 0 | \multicolumn{4}{c}{FAN F1} | | | 0 | 0 | \multicolumn{3}{c}{FAN F2} | | 0 | 0 | 0 | 0 | 0 | 0 |
| 2 | 0 | 0 | 0 | 0 | 0 | 0 | 0 | 0 | 0 | 0 | 0 | 0 | 0 | 0 | 0 | 0 | 0 | 0 | 0 |
| 3 | 0 | 0 | 0 | 0 | 0 | 0 | 0 | 0 | 0 | 0 | 0 | 0 | 0 | 0 | 0 | 0 | 0 | 0 | 0 |
| 4 | 0 | 0 | 0 | 0 | 0 | 0 | 0 | 0 | 0 | 0 | 0 | 0 | 0 | 0 | 0 | 0 | 0 | 0 | 0 |
| 5 | 0 | 0 | 0 | 0 | 0 | 5 | 10 | 30 | 30 | 30 | 10 | 3 | 0 | 0 | 0 | 0 | 0 | 0 | 0 |
| 6 | 0 | 0 | 0 | 0 | 10 | 0 | 10 | \multicolumn{3}{c}{HEATING} | | 9 | 5 | 5 | 0 | 0 | 0 | 0 | 0 | 0 |
| 7 | 0 | 0 | 0 | 8 | -5 | -5 | 7 | \multicolumn{3}{c}{ELEMENT} | | 0 | 3 | 3 | 4 | 0 | 0 | 0 | 0 | 0 |
| 8 | 0 | 0 | 3 | -4 | 4 | 4 | 4 | \multicolumn{3}{c}{H1} | | 5 | 0 | 3 | -1 | 2 | 0 | 0 | 0 | 0 |
| 9 | 0 | 0 | 3 | 0 | 3 | -2 | 0 | 2 | 3 | 2 | 0 | -3 | 5 | 0 | 6 | 0 | 0 | 0 | 0 |
| 10 | 0 | 0 | 3 | 1 | -1 | -6 | 0 | -3 | -3 | -3 | -3 | -7 | 7 | -3 | -4 | 3 | 0 | 0 | 0 |
| 11 | 0 | 0 | 3 | -1 | 5 | 4 | -7 | -3 | -6 | -4 | -5 | 5 | -6 | 1 | 1 | 6 | 0 | 0 | 0 |
| 12 | 0 | 0 | 6 | -1 | 3 | -6 | -5 | 3 | 2 | 1 | -1 | -2 | 7 | 0 | -4 | -2 | 6 | 0 | 0 |
| 13 | 0 | 3 | -6 | 4 | -1 | 7 | -7 | 8 | 5 | 6 | -1 | -4 | 3 | 0 | 0 | -6 | -4 | 3 | 0 |
| 14 | 0 | 3 | -1 | -4 | 1 | 0 | -6 | 5 | -3 | 3 | 0 | -2 | -1 | -2 | -5 | 2 | -6 | 3 | 0 |
| 15 | 0 | 6 | -1 | -2 | 0 | 2 | 8 | 25 | 26 | 25 | -3 | 4 | 0 | -2 | 1 | 1 | 4 | 0 | 0 |
| 16 | 3 | -6 | 4 | -2 | 4 | 6 | 16 | \multicolumn{3}{c}{HEATING} | | 28 | 0 | 1 | 4 | 2 | 1 | 0 | 0 | |
| 17 | 3 | -1 | -4 | 6 | -2 | 0 | 7 | \multicolumn{3}{c}{ELEMENT} | | 26 | 3 | 2 | 0 | 0 | 0 | 0 | 0 | FAN |
| 18 | 3 | -1 | 3 | -2 | 0 | 9 | 8 | \multicolumn{3}{c}{H2} | | 24 | 0 | 2 | 0 | 0 | 0 | 0 | 0 | F3 |
| 19 | 6 | 1 | -3 | -4 | -6 | -5 | -8 | 8 | 3 | 10 | 10 | 0 | 6 | 3 | 3 | 3 | 0 | 0 | |
| 20 | -4 | 6 | -3 | 5 | 6 | 0 | -5 | 0 | -4 | -5 | 3 | -1 | 1 | -1 | -1 | -6 | 6 | 0 | 0 |
| 21 | -7 | 0 | 1 | -5 | 5 | -4 | -8 | 6 | 2 | -3 | -3 | 5 | -2 | -2 | -4 | 4 | -6 | 3 | 0 |
| 22 | -5 | 2 | 1 | -3 | 3 | -2 | -4 | -5 | -7 | -3 | -2 | 8 | 0 | 0 | 0 | -4 | -1 | 3 | 0 |
| 23 | -5 | 2 | 1 | -3 | 0 | 3 | 5 | 5 | 5 | 3 | -2 | -2 | 3 | 0 | 0 | -2 | -1 | 3 | 0 |
| 24 | -5 | 2 | 1 | -3 | 0 | 0 | 0 | 0 | 0 | 0 | 0 | -7 | 5 | 0 | 0 | -2 | -1 | 3 | 0 |
| 25 | -5 | 2 | 1 | -3 | 0 | 0 | 0 | 0 | 0 | 0 | 0 | -5 | 5 | 0 | 0 | -2 | -1 | 3 | 0 |
| 26 | -5 | 2 | 1 | -3 | 0 | 0 | 0 | 0 | 0 | 0 | 0 | -5 | 5 | 0 | 0 | -2 | -1 | 3 | 0 |
| 27 | \multicolumn{19}{c}{EXIT} | | | | | | | | | | | | | | | | | | |

|   | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|
| 1 | 0 | 0 | 0 | FAN F1 | | | | 0 | 0 | FAN F2 | | | 0 | 0 | 0 | 0 | 0 | 0 | 0 |
| 2 | 0 | 0 | 0 | 0 | 0 | 0 | 0 | 0 | 0 | 0 | 0 | 0 | 0 | 0 | 0 | 0 | 0 | 0 | 0 |
| 3 | 0 | 0 | 0 | 0 | 0 | 0 | 0 | 0 | 0 | 0 | 0 | 0 | 0 | 0 | 0 | 0 | 0 | 0 | 0 |
| 4 | 0 | 0 | 0 | 0 | 0 | 0 | 0 | 0 | 0 | 0 | 0 | 0 | 0 | 0 | 0 | 0 | 0 | 0 | 0 |
| 5 | 0 | 0 | 0 | 0 | 0 | 5 | 9 | 27 | 12 | 6 | 0 | 0 | 0 | 0 | 0 | 0 | 0 | 0 | 0 |
| 6 | 0 | 0 | 0 | 0 | 10 | 0 | 9 | HEATING ELEMENT H1 | | | 0 | 0 | 0 | 0 | 0 | 0 | 0 | 0 | 0 |
| 7 | 0 | 0 | 0 | 8 | -5 | -5 | 6.3 | | | | 0 | 0 | 0 | 0 | 0 | 0 | 0 | 0 | 0 |
| 8 | 0 | 0 | 3 | -4 | 4 | 3.6 | 3.6 | | | | 0 | 0 | 0 | 0 | 0 | 0 | 0 | 0 | 0 |
| 9 | 0 | 0 | 3 | 0 | 3 | -1.8 | 0 | 1.4 | 1.5 | 0.4 | 0 | 0 | 0 | 0 | 0 | 0 | 0 | 0 | 0 |
| 10 | 0 | 0 | 3 | 1 | -1 | -5.4 | -1.6 | -2.1 | -1.5 | -0.6 | -0.6 | 0 | 0 | 0 | 0 | 0 | 0 | 0 | 0 |
| 11 | 0 | 0 | 3 | -1 | 4.5 | 3.6 | -5.6 | -2.1 | -3 | -0.8 | -1 | 0 | 0 | 0 | 0 | 0 | 0 | 0 | 0 |
| 12 | 0 | 0 | 6 | -1 | 2.7 | -5.4 | -4 | 1.5 | 0.6 | 0.2 | -0.2 | 0 | 0 | 0 | 0 | 0 | 0 | 0 | 0 |
| 13 | 0 | 3 | -6 | 4 | -0.9 | 6.3 | -5.6 | 4 | 1.5 | 1.2 | -0.2 | -0.8 | 0 | 0 | 0 | 0 | 0 | 0 | 0 |
| 14 | 0 | 3 | -1 | -3.6 | 0.9 | 0 | -4.8 | 2.5 | 0.9 | 0.6 | 0 | -0.4 | 0 | 0 | 0 | 0 | 0 | 0 | 0 |
| 15 | 0 | 6 | -1 | -1.8 | 0 | 1 | 4 | 6 | 3 | 2 | -0.6 | 0.8 | 2 | 0 | 0 | 0 | 0 | 0 | 0 |
| 16 | 3 | -6 | 4 | -1.8 | 2.4 | 3 | 4 | HEATING ELEMENT H2 | | | 0.5 | 0 | 0.1 | 0.4 | 0 | 0 | 0 | 0 | 0 |
| 17 | 3 | -1 | -4 | 5.4 | -1.6 | 0 | 4 | | | | 0.7 | 0.3 | 0.2 | 0 | 0 | 0 | 0 | 0 | FAN F3 |
| 18 | 3 | -1 | 2.7 | -1.8 | 0 | 7.2 | 4 | | | | 0.6 | 0 | 0.2 | 0 | 0 | 0 | 0 | 0 | |
| 19 | 6 | 1 | -2.7 | -3.2 | -4.8 | -4 | -4 | 2 | 0.6 | 2 | 1 | 0 | 0.6 | 0.3 | 0 | 0 | 0 | 0 | 0 |
| 20 | -4 | 6 | -2.7 | 4 | 4.8 | 0 | -2.5 | 0 | -0.8 | -1 | 0.3 | -0.1 | 0.1 | -0.1 | 0 | 0 | 0 | 0 | 0 |
| 21 | -7 | 0 | 0.8 | -4 | 4 | -3.2 | -4 | 3 | 0.4 | -0.6 | -0.3 | 0.5 | -0.2 | -0.2 | 0 | 0 | 0 | 0 | 0 |
| 22 | -4.5 | 1.8 | 0.8 | -2.4 | 2.4 | -1.6 | -2 | -2.5 | -1.4 | -0.6 | -0.2 | 0.8 | 0 | 0 | 0 | 0 | 0 | 0 | 0 |
| 23 | -4.5 | 1.8 | 0.8 | -2.4 | 0 | 2.1 | 2.5 | 2.5 | 1 | 0.6 | -0.2 | -0.2 | 0.3 | 0 | 0 | 0 | 0 | 0 | 0 |
| 24 | -4.5 | 1.8 | 0.8 | -2.4 | 0 | 0 | 0 | 0 | 0 | 0 | 0 | -0.7 | 0.5 | 0 | 0 | 0 | 0 | 0 | 0 |
| 25 | -4.5 | 1.8 | 0.8 | -2.4 | 0 | 0 | 0 | 0 | 0 | 0 | 0 | -0.5 | 0.5 | 0 | 0 | 0 | 0 | 0 | 0 |
| 26 | -4.5 | 1.8 | 0.8 | -2.4 | 0 | 0 | 0 | 0 | 0 | 0 | 0 | -0.5 | 0.5 | 0 | 0 | 0 | 0 | 0 | 0 |
| 27 | EXIT | | | | | | | | | | | | | | | | | | |

| | 1 | 2 | 3 | 4 | 5 | 6 | 7 | 8 | 9 | 10 | 11 | 12 | 13 | 14 | 15 | 16 | 17 | 18 | 19 | |
|---|---|---|---|---|---|---|---|---|---|---|---|---|---|---|---|---|---|---|---|---|
| 1 | 0 | 0 | 0 | FAN F1 | | | | 0 | 0 | FAN F2 | | | | 0 | 0 | 0 | 0 | 0 | 0 | |
| 2 | 0 | 0 | 0 | 0 | 0 | 0 | 0 | 0 | 0 | 0 | 0 | 0 | 0 | 0 | 0 | 0 | 0 | 0 | 0 | |
| 3 | 0 | 0 | 0 | 0 | 0 | 0 | 0 | 0 | 0 | 0 | 0 | 0 | 0 | 0 | 0 | 0 | 0 | 0 | 0 | |
| 4 | 0 | 0 | 0 | 0 | 0 | 0 | 0 | 0 | 0 | 0 | 0 | 0 | 0 | 0 | 0 | 0 | 0 | 0 | 0 | |
| 5 | 0 | 0 | 0 | 0 | 0 | 0 | 1 | 3 | 18 | 24 | 10 | 3 | 0 | 0 | 0 | 0 | 0 | 0 | 0 | ←R12 |
| 6 | 0 | 0 | 0 | 0 | 0 | 0 | 1 | HEATING ELEMENT H1 | | | 9 | 5 | 5 | 0 | 0 | 0 | 0 | 0 | 0 | |
| 7 | 0 | 0 | 0 | 0 | 0 | 0 | 0.7 | | | | 0 | 3 | 3 | 4 | 0 | 0 | 0 | 0 | 0 | |
| 8 | 0 | 0 | 0 | 0 | 0 | 0.4 | 0.4 | | | | 5 | 0 | 3 | -1 | 2 | 0 | 0 | 0 | 0 | |
| 9 | 0 | 0 | 0 | 0 | 0 | -0.2 | 0 | 0.6 | 1.5 | 1.6 | 0 | -3 | 5 | 0 | 6 | 0 | 0 | 0 | 0 | |
| 10 | 0 | 0 | 0 | 0 | 0 | -0.6 | -0.4 | -0.9 | -1.5 | -2.4 | -2.4 | -7 | 7 | -3 | -4 | 3 | 0 | 0 | 0 | |
| 11 | 0 | 0 | 0 | 0 | 0.5 | 0.4 | -1.4 | -0.9 | -3 | -3.2 | -2 | 3 | -3.6 | 1 | 1 | 6 | 0 | 0 | 0 | |
| 12 | 0 | 0 | 0 | 0 | 0.3 | -0.6 | -1 | 0.3 | 0.6 | 0.4 | -0.4 | -1.2 | 4.2 | 0 | -4 | -2 | 6 | 0 | 0 | ←R22 |
| 13 | 0 | 0 | 0 | 0 | -0.1 | 0.7 | -1.4 | 0.8 | 1.5 | 2.4 | -0.2 | -0.8 | 1.2 | 0 | 0 | -4.8 | -3.2 | 2.4 | 0 | |
| 14 | 0 | 0 | 0 | -0.4 | 0.1 | 0 | -1.2 | 0.5 | -0.9 | 1.2 | 0 | -0.4 | -0.3 | -0.4 | -1 | 0.5 | -1.2 | 0.6 | 0 | |
| 15 | 0 | 0 | 0 | -0.2 | 0 | 0.2 | 0.8 | 4 | 3 | 5 | -0.6 | 0.8 | 4 | 0.4 | 0.2 | 0.1 | 0.4 | 0 | 0 | |
| 16 | 0 | 0 | 0 | -0.2 | 1.6 | 3 | 2 | HEATING ELEMENT H2 | | | 2.5 | 0 | 0.2 | 0.4 | 0.2 | 0.1 | 0 | 0 | 0 | |
| 17 | 0 | 0 | 0 | 0.6 | -0.4 | 0 | 0 | | | | 2.3 | 0 | 0.4 | 0 | 0 | 0 | 0 | 0 | 0 | FAN F3 |
| 18 | 0 | 0 | 0 | -0.2 | 0 | 1.8 | 0.8 | | | | 3.4 | 0 | 0.4 | 0 | 0 | 0 | 0 | 0 | 0 | |
| 19 | 0 | 0 | 0 | -0.8 | -1.2 | -1 | -0.8 | -3 | -0.1 | 1 | -1 | 0 | 1.2 | 0.3 | 0.3 | 0 | 0 | 0 | 0 | |
| 20 | 0 | 0 | 0 | 1 | 1.2 | 0 | -0.5 | 0 | -0.8 | -1 | 0.9 | -0.3 | 0.2 | -0.1 | -0.1 | -0.6 | 0 | 0 | 0 | |
| 21 | 0 | 0 | 0.2 | -1 | 1 | -0.8 | -0.8 | 0.6 | 0.8 | -0.6 | -0.9 | 1.5 | -0.6 | -0.2 | -0.4 | 0.4 | 0 | 0 | 0 | |
| 22 | -0.5 | 0.2 | 0.2 | -0.6 | 0.6 | -0.4 | -2 | -0.5 | -2.8 | -0.6 | -0.6 | 2.4 | 0 | 0 | 0 | -0.4 | 0 | 0 | 0 | |
| 23 | -0.5 | 0.2 | 0.2 | -0.6 | 0 | 0.9 | 2.5 | 0.5 | 2 | 0.6 | -0.6 | -0.6 | 0.9 | 0 | 0 | -0.2 | 0 | 0 | 0 | |
| 24 | -0.5 | 0.2 | 0.2 | -0.6 | 0 | 0 | 0 | 0 | 0 | 0 | 0 | -2.1 | 1.5 | 0 | 0 | -0.2 | 0 | 0 | 0 | |
| 25 | -0.5 | 0.2 | 0.2 | -0.6 | 0 | 0 | 0 | 0 | 0 | 0 | 0 | -1.5 | 1.5 | 0 | 0 | -0.2 | 0 | 0 | 0 | |
| 26 | -0.5 | 0.2 | 0.2 | -0.6 | 0 | 0 | 0 | 0 | 0 | 0 | 0 | -1.5 | 1.5 | 0 | 0 | -0.2 | 0 | 0 | 0 | |
| 27 | EXIT | | | | | | | | | | | | | | | | | | | |

FIG. 54

| | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|
| 1 | 0 | 0 | 0 | \multicolumn{4}{l}{FAN F1} | 0 | 0 | \multicolumn{3}{l}{FAN F2} | 0 | 0 | 0 | 0 | 0 | 0 |
| 2 | 0 | 0 | 0 | 0 | 0 | 0 | 0 | 0 | 0 | 0 | 0 | 0 | 0 | 0 | 0 | 0 | 0 | 0 | 0 |
| 3 | 0 | 0 | 0 | 0 | 0 | 0 | 0 | 0 | 0 | 0 | 0 | 0 | 0 | 0 | 0 | 0 | 0 | 0 | 0 |
| 4 | 0 | 0 | 0 | 0 | 0 | 0 | 0 | 0 | 0 | 0 | 0 | 0 | 0 | 0 | 0 | 0 | 0 | 0 | 0 |
| 5 | 0 | 0 | 0 | 0 | 0 | 0 | 0 | 0 | 0 | 0 | 0 | 0 | 0 | 0 | 0 | 0 | 0 | 0 | 0 |
| 6 | 0 | 0 | 0 | 0 | 0 | 0 | 0 | | | | 0 | 0 | 0 | 0 | 0 | 0 | 0 | 0 | 0 |
| 7 | 0 | 0 | 0 | 0 | 0 | 0 | 0 | \multicolumn{3}{c}{HEATING ELEMENT H1} | 0 | 0 | 0 | 0 | 0 | 0 | 0 | 0 | 0 |
| 8 | 0 | 0 | 0 | 0 | 0 | 0 | 0 | | | | 0 | 0 | 0 | 0 | 0 | 0 | 0 | 0 | 0 |
| 9 | 0 | 0 | 0 | 0 | 0 | 0 | 0 | 0 | 0 | 0 | 0 | 0 | 0 | 0 | 0 | 0 | 0 | 0 | 0 |
| 10 | 0 | 0 | 0 | 0 | 0 | 0 | 0 | 0 | 0 | 0 | 0 | 0 | 0 | 0 | 0 | 0 | 0 | 0 | 0 |
| 11 | 0 | 0 | 0 | 0 | 0 | 0 | 0 | 0 | 0 | 0 | -2 | 2 | -2.4 | 0 | 0 | 0 | 0 | 0 | 0 |
| 12 | 0 | 0 | 0 | 0 | 0 | 0 | 0 | 1.2 | 0.8 | 0.4 | -0.4 | -0.8 | 2.8 | 0 | 0 | 0 | 0 | 0 | 0 |
| 13 | 0 | 0 | 0 | 0 | 0 | 0 | 0 | 3.2 | 2 | 2.4 | -0.6 | -2.4 | 1.8 | 0 | 0 | -1.2 | -0.8 | 0.6 | 0 |
| 14 | 0 | 0 | 0 | 0 | 0 | 0 | 0 | 2 | -1.2 | 1.2 | 0 | -1.2 | -0.7 | -1.6 | -4 | 1 | -4.8 | 2.4 | 0 |
| 15 | 0 | 0 | 0 | 0 | 0 | 0.8 | 3.2 | 15 | 20 | 18 | -1.8 | 2.4 | 5 | 1.6 | 0.8 | 0.9 | 3.6 | 0 | 0 |
| 16 | 0 | 0 | 0 | 0 | 0 | 0 | 10 | | | | 25 | 0 | 0.7 | 3.2 | 1.8 | 0.9 | 0 | 0 | 0 |
| 17 | 0 | 0 | 0 | 0 | 0 | 0 | 3 | \multicolumn{3}{c}{HEATING ELEMENT H2} | 23 | 2.7 | 1.4 | 0 | 0 | 0 | 0 | 0 | FAN F3 |
| 18 | 0 | 0 | 0 | 0 | 0 | 0 | 3.2 | | | | 20 | 0 | 1.4 | 0 | 0 | 0 | 0 | 0 | |
| 19 | 0 | 0 | 0 | 0 | 0 | 0 | -3.2 | 9 | 2.5 | 7 | 10 | 0 | 4.2 | 2.4 | 2.7 | 3 | 0 | 0 | |
| 20 | 0 | 0 | 0 | 0 | 0 | 0 | -2 | 0 | -2.4 | -3 | 1.8 | -0.6 | 0.7 | -0.8 | -0.9 | -5.4 | 6 | 0 | 0 |
| 21 | 0 | 0 | 0 | 0 | 0 | 0 | -3.2 | 2.4 | 0.8 | -1.8 | -1.8 | 3 | -1.2 | -1.6 | -3.6 | 3.6 | -6 | 3 | 0 |
| 22 | 0 | 0 | 0 | 0 | 0 | 0 | 0 | -2 | -2.8 | -1.8 | -1.2 | 4.8 | 0 | 0 | 0 | -3.6 | -1 | 3 | 0 |
| 23 | 0 | 0 | 0 | 0 | 0 | 0 | 0 | 2 | 2 | 1.8 | -1.2 | -1.2 | 1.8 | 0 | 0 | -1.8 | -1 | 3 | 0 |
| 24 | 0 | 0 | 0 | 0 | 0 | 0 | 0 | 0 | 0 | 0 | 0 | -4.2 | 3 | 0 | 0 | -1.8 | -1 | 3 | 0 |
| 25 | 0 | 0 | 0 | 0 | 0 | 0 | 0 | 0 | 0 | 0 | 0 | -3 | 3 | 0 | 0 | -1.8 | -1 | 3 | 0 |
| 26 | 0 | 0 | 0 | 0 | 0 | 0 | 0 | 0 | 0 | 0 | 0 | -3 | 3 | 0 | 0 | -1.8 | -1 | 3 | 0 |
| 27 | \multicolumn{19}{c}{EXIT} |

INFORMATION PROCESSING APPARATUS AND AIR VOLUME CALCULATION METHOD

CROSS-REFERENCE TO RELATED APPLICATION

This application is based upon and claims the benefit of priority of the prior Japanese Patent Application No. 2014-000910, filed on Jan. 7, 2014, the entire contents of which are incorporated herein by reference.

FIELD

The embodiments discussed herein relate to an information processing apparatus and an air volume calculation method.

BACKGROUND

Today, various types of products have electronic components incorporated therein. Electronic components consume power and generate heat as they operate. The quantity of heat generation may increase depending on the power consumption of the electronic components and density of the placement of the electronic components. Accumulation of heat inside a product housing may raise the temperature inside the housing. Rise of the temperature of a product may cause failure, injury to the user, accidental ignition, or the like. Therefore, when developing a product, design is performed in consideration of countermeasures against heat to improve the reliability and safety of the product.

Here, a heating element such as an electronic component may be air-cooled. Specifically, convection is forcibly generated inside the housing to dissipate heat out of the housing by taking air into the housing of the product or evacuating air from the housing using a fan. In order to examine the performance of heat dissipation by air-cooling, thermo-fluid analysis may be performed using a technique referred to as CFD (Computational Fluid Dynamics). In CFD, a set of basic equations referred to as advection-diffusion equations is used. Evaluation and verification of advection or heat diffusion may be performed by discretizing the space using the difference method, the finite volume method, the finite element method, or the like, and numerically solving the advection-diffusion equations under a condition desired to be verified.

In addition, it is also conceivable to improve the efficiency of cooling by adjusting the operation of the fan. For example, when cooling a part desired to be cooled with a plurality of cooling fans, there is a proposal to control the rotation of the plurality of cooling fans, taking advantage of the cooling capacity of each cooling fan for the part desired to be cooled. In addition, there is a proposal to enhance the evacuation efficiency by setting the rotation speed of some of the plurality of fans which are distant from the outlet of the housing to be higher than the other fans. In addition, there is also a proposal to perform energy saving operation which decreases the rotation speed of the fan in a storage room when an illuminating apparatus is turned off with an aperture of an open showcase being covered with a night cover and the temperature in the storage room of the open showcase is stable.

Japanese Laid-Open Patent Publication No. 2008-235696
Japanese Laid-Open Patent Publication No. 2007-115070
Japanese Laid-Open Patent Publication No. 2010-71609

A plurality of heating elements may be cooled by operating a plurality of fans. On this occasion, when, for example, the temperature of a heating element is lower than the upper limit of the temperature permitted to the heating element, it may be conceivable that the heating element is being over-cooled. In this case, power consumption of the fan may be reduced by reducing the air volume of each fan. However, there arises the problem of how to adjust the air volume of each of the plurality of fans in relation to the temperature of the plurality of heating elements.

For example, although the air volume of the plurality of fans is adjusted focusing on a single heating element, the result of adjustment is not necessarily be appropriate for other heating elements. Other heating elements may be rather over-cooled, or other heating elements may exceed their upper limit temperature. Although it is conceivable to adjust the air volume of each fan with a trial and error approach by performing experiments and simulation while changing the air volume of each fan so that each heating element approaches the upper limit temperature, this method is troublesome and time consuming to determine the air volume of each fan.

SUMMARY

According to an aspect, there is provided a non-transitory computer-readable storage medium storing an air volume calculation program that causes a computer to perform a procedure to calculate air volumes of a plurality of fans configured to cool a plurality of heat generating objects. The procedure includes: calculating, for each object, a ratio of an amount of temperature rise against a tolerance for temperature rise by using an amount of temperature rise from a predetermined temperature of each object when the plurality of fans is operated with a first air volume of each fan and a tolerance for temperature rise from the predetermined temperature of each of the plurality of objects; and calculating a second air volume of each fan, based on the ratio calculated for each object and cooling contribution of each fan to each object.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 5 illustrates exemplary definition information of the second embodiment;

FIG. 7 illustrates exemplary PQ tables of the second embodiment;

FIGS. 8A and 8B illustrate exemplary air volume ratio tables of the second embodiment;

FIGS. 9A and 9B illustrate exemplary air volume tables of the second embodiment;

FIGS. 11A and 11B illustrate exemplary rotation speed by temperature tables of the second embodiment;

FIG. 29 illustrates a velocity distribution of mixed air;

FIG. 31 illustrates an exemplary flow rate distribution (part 2);

FIG. 35 illustrates an exemplary distribution of the transferred quantity of heat per fan (initial value), (part 1);

FIG. 36 illustrates an exemplary distribution of the transferred quantity of heat per fan (initial value), (part 2);

FIG. 37 illustrates an exemplary distribution of the transferred quantity of heat per fan (initial value), (part 3);

FIG. 39 illustrates an exemplary distribution of the retained quantity of heat per fan (initial value), (part 2);

FIG. 40 illustrates an exemplary distribution of the retained quantity of heat per fan (initial value), (part 3);

FIG. 46 illustrates an exemplary distribution of the transferred quantity of heat per fan (after convergence), (part 1);

FIG. 47 illustrates an exemplary distribution of the transferred quantity of heat per fan (after convergence), (part 2);

FIG. 48 illustrates an exemplary distribution of the transferred quantity of heat per fan (after convergence), (part 3);

FIG. 50 illustrates an exemplary cell range involved in heat transfer;

FIG. 52 illustrates an exemplary evaluation of the cooling capacity per fan (part 1);

FIG. 53 illustrates an exemplary evaluation of the cooling capacity per fan (part 2); and FIG. 54 illustrates an exemplary evaluation of the cooling capacity per fan (part 3).

DESCRIPTION OF EMBODIMENTS

Figure 1:
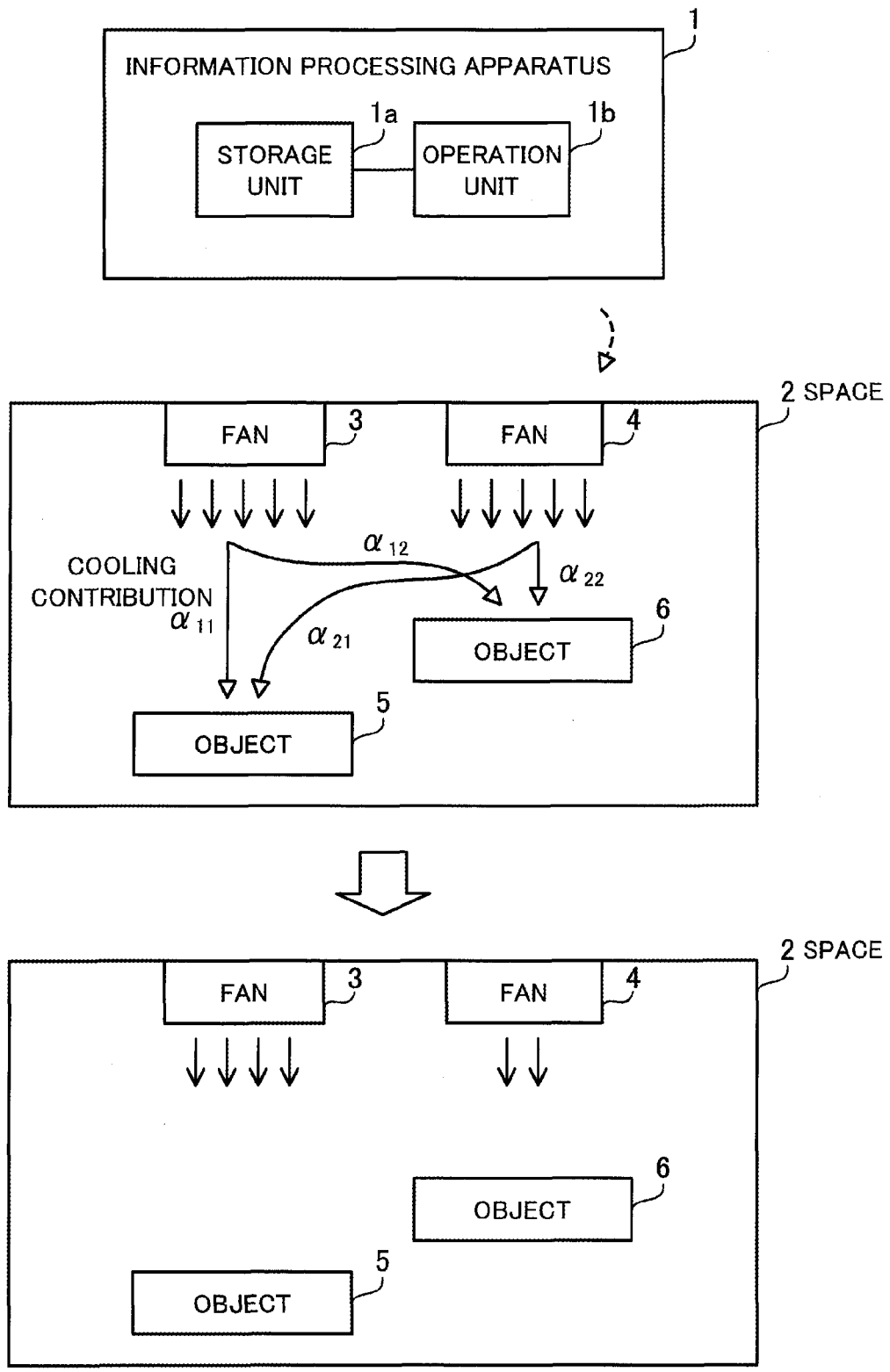
FIG. 1 illustrates an information processing apparatus of a first embodiment.

Several embodiments will be described below with reference to the accompanying drawings, wherein like reference numerals refer to like elements throughout.

First Embodiment

FIG. 1 illustrates an information processing apparatus of a first embodiment. An information processing apparatus 1 calculates the air volumes of a plurality of fans configured to cool a plurality of heat generating objects. The information processing apparatus 1 has a storage unit 1$a$ and an operation unit 1$b$. The storage unit 1$a$ may be a volatile storage device such as a RAM (Random Access Memory), or may be a non-volatile storage device such as an HDD (Hard Disk Drive) or a flash memory. The operation unit 1$b$ may include a CPU (Central Processing Unit), a DSP (Digital Signal Processor), an ASIC (Application Specific Integrated Circuit), an FPGA (Field Programmable Gate Array), or the like. The operation unit 1$b$ may be a processor which executes programs. The "processor" mentioned herein may also include a set of a plurality of processors (multiprocessor).

The storage unit 1$a$ stores information about the contribution of cooling by each fan to each object. The contribution of cooling (cooling contribution) is an index indicating the quantity of heat robbed by the wind sent from a certain fan, of the heat generation quantity. The cooling contribution may be regarded as a degree indicating how much each fan contributes to the cooling of a single object. Specifically, focusing on a single object, the sum of cooling contributions by all the fans is assumed to be one when cooling the object by using a plurality of fans. A ratio in relation to the sum indicating how much each fan contributes to cooling of the object (how much heat is robbed from the heat generation quantity of the object) is the cooling contribution of each fan to the object. Since it is conceivable that the larger the air volume blows against an object, the larger the quantity of heat is robbed, the cooling contribution may be regarded as the ratio of air volume sent to the object by each fan. The cooling contribution is a positive real number which is larger than zero and smaller than one.

For example, it is conceivable to arrange fans 3 and 4 and heat generating objects 5 and 6 in a space 2 and cool the objects 5 and 6 by sending air to the objects 5 and 6 from the fans 3 and 4. In this case, the storage unit 1*a* stores cooling contributions $\alpha_{11}$, $\alpha_{12}$, $\alpha_{21}$ and $\alpha_{22}$. The cooling contribution $\alpha_{11}$ is the cooling contribution of the fan 3 to the object 5. The cooling contribution $\alpha_{12}$ is the cooling contribution of the fan 3 to the object 6. The cooling contribution $\alpha_{21}$ is the cooling contribution of the fan 4 to the object 5. The cooling contribution $\alpha_{22}$ is the cooling contribution of the fan 4 to the object 6. The equations $\alpha_{11}+\alpha_{21}=1$ and $\alpha_{12}+\alpha_{22}=1$ hold. The cooling contributions may be preliminarily calculated by a predetermined simulation using the operation unit 1*b* and may be stored in the storage unit 1*a*.

In addition, the storage unit 1*a* stores information about the upper limit temperature tolerable by each object. When, for example, an object is an electronic circuit, an upper limit temperature for appropriately operating the electronic circuit is preliminarily stored in the storage unit 1*a*.

The operation unit 1*b* calculates, for each object, a ratio of the amount of temperature rise against a tolerance for temperature rise, using the amount of temperature rise from a predetermined temperature of each object when each fan is operated with a first air volume of each fan and a tolerance for temperature rise from the predetermined temperature of each object. In the following, the ratio is referred to as temperature rise ratio and denoted by $\beta$. In this case, assuming the tolerance for temperature rise to be 1, $1-\beta$ may be referred to as margin of cooling (cooling margin). Since the current temperature rise ratio in relation to the tolerance for temperature rise of the object is $\beta$, it is conceivable that there is a margin of $1-\beta$ with regard to temperature rise of the object.

For example, an amount of temperature rise $\Delta T_1$ of the object 5 may be calculated as a temperature resulting from subtracting the temperature in the space 2 from the temperature of the object 5 when the fan 3 is operated with an air volume $Q_1$ and the fan 4 is operated with an air volume $Q_2$. The amount of temperature rise $\Delta T_2$ of the object 6 may be similarly calculated. The amounts of temperature rise $\Delta T_1$ and $\Delta T_2$ may be values obtained in an experiment using an actual machine having the fans 3 and 4 as well as the objects 5 and 6 being arranged in the space 2. The amounts of temperature rise $\Delta T_1$ and $\Delta T_2$ may also be values calculated in a simulation performed using CFD assuming that the fans 3 and 4 as well as the objects 5 and 6 are arranged in the space 2.

In addition, the tolerance $\Delta T_{01}$ for temperature rise of the object 5 may be calculated as a temperature resulting from subtracting the temperature in the space 2 from the upper limit temperature of the object 5 when the fan 3 is operated with the air volume $Q_1$ and the fan 4 is operated with the air volume $Q_2$. The tolerance $\Delta T_{02}$ for temperature rise of the object 6 may be similarly calculated. Here, for example, the air volumes $Q_1$ and $Q_2$ of the fans 3 and 4 are chosen so that $\Delta T_1 < \Delta T_{01}$ and $\Delta T_2 < \Delta T_{02}$ hold.

In this case, a ratio $\beta_1$ (temperature rise ratio) of the amount of temperature rise $\Delta T_1$ against the tolerance $\Delta T_{01}$ for temperature rise of the object 5 is $\beta_1 = \Delta T_1/\Delta T_{01}$. Therefore, the cooling margin for the object 5 is $1-\beta_1$. Similarly, the cooling margin for the object 6 is given by $1-\beta_2$, using the temperature rise ratio $\beta_2 = \Delta T_2/\Delta T_{02}$. In this case, it turns out that the objects 5 and 6 are over-cooled by the cooling margin. Therefore, it is conceivable that, for each of the objects 5 and 6, air volumes due to the fans 3 and 4 may be reduced by the ratio represented by these cooling margins (i.e., the air volumes of the fans 3 and 4 may be reduced down to the temperature rise ratio $\beta$ in relation to the current air volume "1").

The operation unit 1*b* calculates a second air volume of each fan, based on information about temperature rise ratio for each object and cooling contribution stored in the storage unit 1*a*. For example, let $q_1$ ($0 \leq q_1$) be the ratio (proportion) of the air volume of the fan 3 to be changed from the air volume $Q_1$, and $q_2$ ($0 \leq q_2$) be the ratio (proportion) of the air volume of the fan 4 to be changed from the air volume $Q_2$. In other words, the air volume of the fan 3 after the change may be represented as $Q_1 \times q_1$. The air volume of the fan 4 after the change may be represented as $Q_2 \times q_2$.

Accordingly, it is considered possible to cool the object 5 to or below the upper limit temperature of the object 5 provided that $q_1$ and $q_2$ satisfy the following inequality (1), considering the weighting by the cooling contributions of the fans 3 and 4 to the object 5. This is because it is considered possible to keep the object 5 to or below the upper limit temperature even when the air volume to the object 5 is reduced from the current air volume (assumed to be "1") by the cooling margin $1-\beta_1$.

$$q_1 \cdot \alpha_{11} + q_2 \cdot \alpha_{21} \geq (1-(1-\beta_1)) = \beta_1 \quad (1)$$

Similarly, it is considered possible to cool the object 6 to or below the upper limit temperature of the object 6 provided that $q_1$ and $q_2$ satisfy the following inequality (2), considering the weighting by the cooling contributions of the fans 3 and 4 to the object 6. This is because it is considered possible to keep the object 6 to or below the upper limit temperature even when the air volume to the object 6 is reduced from the current air volume (assumed to be "1") by the cooling margin $1-\beta_2$.

$$q_1 \cdot \alpha_{12} + q_2 \cdot \alpha_{22} \geq (1-(1-\beta_2)) = \beta_2 \quad (2)$$

For example, the operation unit 1*b* may calculate the minimum $q_1$ and $q_2$ which simultaneously satisfy the inequalities (1) and (2), by solving the simultaneous equations where the inequality signs in the inequalities (1) and (2) are replaced by equality signs. The operation unit 1*b* then sets $Q_1 \times q_1$ as a new air volume (second air volume), for example, of the fan 3. In addition, the operation unit 1*b* sets $Q_2 \times q_2$ as a new air volume of the fan 4 (second air volume).

Here, the aforementioned simultaneous inequalities may be extended to a case where the number of fans is m (m is an integer of 2 or more) and the number of objects is n (n is an integer of 2 or more). Specifically, the following simultaneous inequalities (3) may be formed.

$$\begin{cases} q_1 \cdot \alpha_{11} + \cdots + q_m \cdot \alpha_{m1} \geq \beta_1 \\ \vdots \quad \vdots \quad \vdots \quad \vdots \\ q_1 \cdot \alpha_{1n} + \cdots + q_m \cdot \alpha_{mn} \geq \beta_n \end{cases} \quad (3)$$

$q_m$ is the ratio of air volume of the m-th fan to be changed. $\alpha_{mn}$ is the cooling contribution of the m-th fan to the n-th object. $\beta_n$ is the temperature rise ratio of the n-th object when each of the m fans is operated at the first air volume. Accordingly, air volumes of a plurality of fans to a plurality of objects may be simultaneously determined by solving the simultaneous inequalities so that $q_1, \ldots, q_m$ become smaller. Formula (3) is a relational expression between m parameters and n temperature rise ratios.

For example, $q_1, \ldots, q_m$ may be calculated by solving the simultaneous equations where the inequality signs are replaced by equality signs, provided that m=n holds. However, it is also conceivable that the second air volume of some of the fans is calculated as a negative value. In this case, the air volume of the fan is set to be zero (equivalent to stopping the fan). When m≠n, $q_1, \ldots, q_m$ are provided with an initial value (e.g., 1) and smaller $q_1, \ldots, q_m$ satisfying the simultaneous inequalities may be calculated while decrementing them from the initial value with a predetermined ratio.

According to the information processing apparatus 1, a temperature rise ratio is calculated for each object, using the amount of temperature rise from a predetermined temperature of each object when each fan is operated at a first air volume of each fan, and the tolerance for temperature rise from the predetermined temperature of each object. A second air volume of each fan is calculated, based on the temperature rise ratio for each object and the cooling contribution by each fan to each object. Accordingly, the air volume of each fan may be efficiently determined.

Here, even when the air volumes of a plurality of fans are adjusted, focusing on a single object, for example, the result of adjustment is not necessarily appropriate for other objects. Adjusting the air volumes of a plurality of fans focusing on a single object may result in that other objects are over-cooled, or other objects exceed the upper limit temperature. Although it is conceivable to adjust the air volume of each fan by trial and error so that all the objects do not reach the upper limit temperature by performing an experiment or simulation while changing the air volume of each fan, this approach is troublesome and time consuming to determine the air volume of each fan. The larger the number of fans and objects, the more serious the problem becomes.

According to a method of the first embodiment, on the other hand, the air volumes of a plurality of fans may be determined simultaneously in accordance with the amount of temperature rise of the plurality of objects, using the inequalities (1) and (2), (or simultaneous inequalities (3)) considering the cooling contribution. Therefore, the trouble and time for determining the air volume of each fan may be reduced in comparison with adjusting the air volume of each fan by trial and error, whereby the air volume of each fan may be determined efficiently. Particularly, the air volume of each fan may be adjusted to operate each object near the upper limit temperature for each object, and therefore it is possible to suppress over-cooling of each object by each fan. In other words, surplus air volumes of fans may be reduced. The rotation speed of the fans may be suppressed by reducing their air volumes and thus power consumption and noise of fans may be reduced.

Second Embodiment

Figure 2:
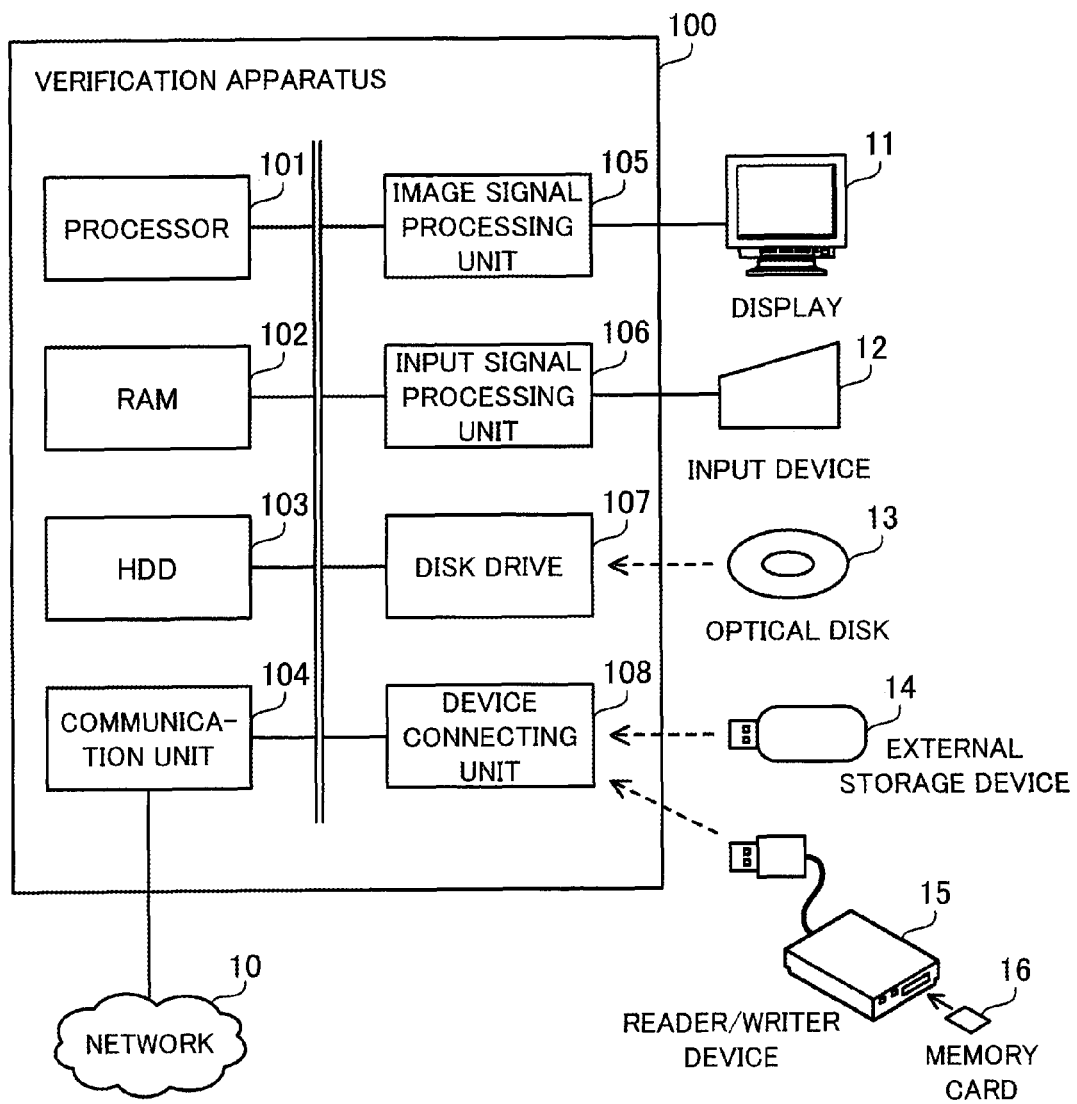
FIG. 2 illustrates exemplary hardware of a verification apparatus of a second embodiment.

FIG. 2 illustrates exemplary hardware of a verification apparatus of a second embodiment. A verification apparatus 100 is a computer configured to perform a thermo-fluid analysis using CFD. For example, the verification apparatus 100 is used for developing electronic devices having a plurality of fans and a plurality of heating elements (e.g., electronic components).

The verification apparatus 100 provides a function of reproducing the structure of each fan and each heating element in an actual machine by simulation, and determining the air volume and the rotation speed of each fan according to the amount of temperature rise of each heating element. The verification apparatus 100 stores the result in the actual machine as control information for individual fans, and controls the air volume (rotation speed) of each fan to avoid over-cooling relative to the amount of temperature rise of the electronic components provided in the actual machine. In the aforementioned manner, operation of each fan is expected to be optimized according to the amount of temperature rise of each electronic component.

In the second embodiment, a case where the number of fans is the same as the number of heating elements is particularly assumed. A case where the number of fans and the number of heating elements are different will be illustrated in the third and later embodiments described below. Here, the verification apparatus 100 is an example of the information processing apparatus 1 of the first embodiment.

The verification apparatus 100 has a processor 101, a RAM 102, an HDD 103, a communication unit 104, an image signal processing unit 105, an input signal processing unit 106, a disk drive 107 and a device connecting unit 108. Each unit is connected to a bus of the verification apparatus 100.

The processor 101 controls information processing of the verification apparatus 100. The processor 101 is a CPU, an MPU (Micro Processing Unit), a DSP (Digital Signal Processor), an ASIC (Application Specific Integrated Circuit), an FPGA, or a PLD (Programmable Logic Device), for example. The processor 101 may be a multiprocessor. The processor 101 may also be a combination of two or more elements of a CPU, an MPU, a DSP, an ASIC, an FPGA, and a PLD.

The RAM 102 is a main storage device of the verification apparatus 100. The RAM 102 temporarily stores at least a part of the program of the OS (Operating System) or application programs to be executed by the processor 101. In addition, the RAM 102 stores various data to be used in processing by the processor 101.

The HDD 103 is an auxiliary storage device of the verification apparatus 100. The HDD 103 magnetically writes and reads data to and from a built-in magnetic disk. The HDD 103 has the program of the OS, application programs, and various data stored therein. The verification apparatus 100 may be provided with another type of auxiliary storage device such as a flash memory or an SSD (Solid State Drive), and may be provided with a plurality of auxiliary storage devices.

The communication unit 104 is an interface capable of communicating with other computers via a network 10. The communication unit 104 may be a wired interface or a wireless interface.

The image signal processing unit 105 outputs images to a display 11 connected to the verification apparatus 100, according to an instruction from the processor 101. A CRT (Cathode Ray Tube) display or a liquid crystal display may be used as the display 11.

The input signal processing unit 106 obtains an input signal from an input device 12 connected to the verification apparatus 100 and outputs it to the processor 101. A pointing device such as a mouse or a touch panel, a keyboard or the like, for example, may be used as the input device 12.

The disk drive 107 is a driving apparatus which reads programs or data stored on an optical disk 13 using laser beam or the like. The disk drive 107 stores programs or data read from the optical disk 13 in the RAM 102 or the HDD 103 according to an instruction from the processor 101, for example.

The device connecting unit 108 is an interface for connecting peripheral devices to the verification apparatus 100. The device connecting unit 108 stores, in the RAM 102 or the HDD 103, programs or the data read from an auxiliary storage device 14, or from a memory card 16 via a reader/writer device 15 or the like, according to an instruction from the processor 101, for example.

Figure 3:
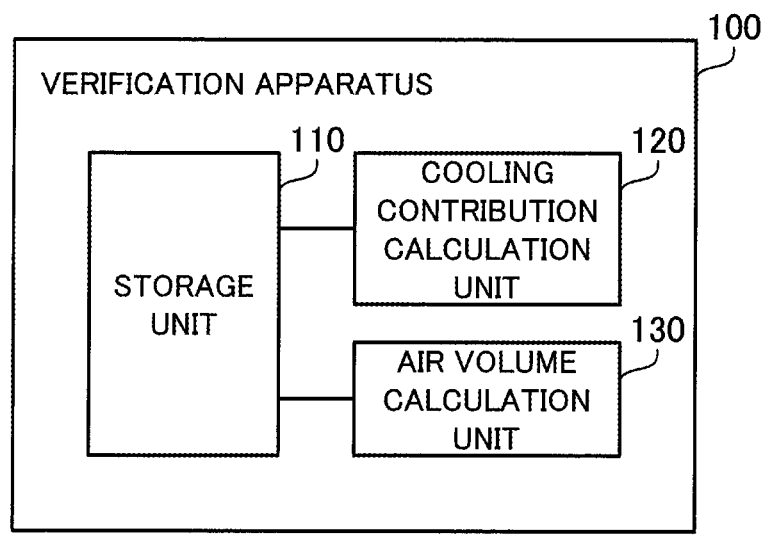
FIG. 3 illustrates an exemplary function of a verification apparatus of the second embodiment.

FIG. 3 illustrates an exemplary function of the verification apparatus of the second embodiment. The verification apparatus 100 has a storage unit 110, a cooling contribution calculation unit 120, and an air volume calculation unit 130. The storage unit 110 may be realized using a storage area of the RAM 102 or the HDD 103. The cooling contribution calculation unit 120 and the air volume calculation unit 130 may be realized as a module of a program executed by the processor 101.

The storage unit 110 stores various information used for processing by the cooling contribution calculation unit 120 and the air volume calculation unit 130. The information stored in the storage unit 110 includes definition information, a cooling contribution table, a PQ (Pressure-Quantity) table, an air volume table, and a rotation speed by temperature table.

The definition information is information for defining a model which will be an object of thermo-fluid analysis (analysis object model). The cooling contribution table includes information having registered therein cooling contribution of each fan to each heating element. The PQ table includes information having registered therein relation between static pressure and air volume or the like for each attribute (size and rotation speed) of a fan.

The air volume table and the rotation speed by temperature table include information generated by the air volume calculation unit 130. The air volume table includes information having registered therein air volume of each fan in relation to the amount of temperature rise of each heating element. The rotation speed by temperature table includes the rotation speed for each fan in relation to the amount of temperature rise of each heating element obtained based on each air volume registered in the air volume table and the PQ table.

The cooling contribution calculation unit 120 calculates the cooling contribution of each fan to each heating element by performing a CFD-based simulation. The cooling contribution calculation unit 120 registers the calculated cooling contribution in the cooling contribution table, in association with each heating element.

The air volume calculation unit 130 calculates the air volumes of a plurality of fans configured to cool a plurality of heating elements, based on the simulation result. Specifically, the air volume calculation unit 130 calculates the temperature rise ratio for each heating element when a plurality of fans is operated with an initial air volume. The temperature rise ratio is a proportion indicating how much the temperature of a heating element has risen against the tolerance for temperature rise of a heating element.

The air volume calculation unit 130 calculates a new air volume of each fan, based on the temperature rise ratio for each heating element and the cooling contribution by each fan to each heating element. Specifically, the air volume calculation unit 130 calculates the ratio of the change of air volume (referred to as air volume ratio) against the initial air volume of each fan, according to a variety of temperature rise of each heating element, and registers it in the air volume ratio table. The air volume calculation unit 130 then calculates a new air volume of each fan in accordance with the amount of temperature rise of each heating element by multiplying the initial air volume by the air volume ratio registered in the air volume ratio table, and registers the new air volume in the air volume table.

Furthermore, the air volume calculation unit 130 determines the rotation speed for each fan in accordance with the amount of temperature rise of each heating element based on a PQ table stored in the storage unit 110 and the new air volume, and registers the rotation speed in the rotation speed by temperature table.

Figure 4:
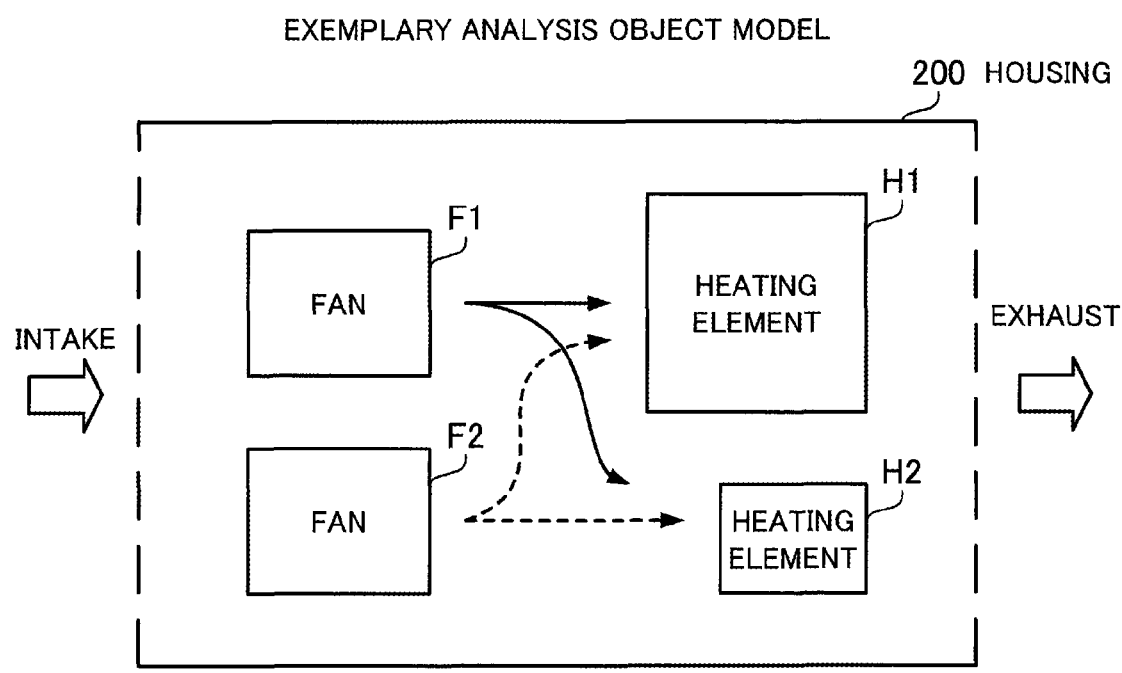
FIG. 4 illustrates an exemplary analysis object model of the second embodiment.

FIG. 4 illustrates an exemplary analysis object model of the second embodiment. In FIG. 4, a housing 200 to be analyzed is illustrated. Such an analysis object model is constructed by the verification apparatus 100 as a virtual environment for simulation, using definition information described below. The housing 200 has fans F1 and F2 and heating elements H1 and H2 arranged therein.

The housing 200 is a rectangular parallelepiped. The housing 200 has a bore provided at a position corresponding to the fans F1 and F2 (left-hand side of FIG. 4). In FIG. 4, the right-hand side of the housing 200 is an aperture. The six sides of the housing 200 are blocked by the housing panel except for the bore and the aperture. The space surrounded by the six sides of the housing 200 is the inside of the housing 200. The space other than the former is the outside of the housing 200.

The fans F1 and F2 take in air from the outside of the housing 200 and discharge the air into the internal space of the housing 200. The air discharged by the fans F1 and F2 into the housing 200 flows inside the housing 200 toward the aperture. The air discharged by the fans F1 and F2 rob heat from the heating elements H1 and H2 and carry the heat away to the outside. Accordingly, the heating elements H1 and H2 are cooled.

FIG. 5 illustrates exemplary definition information of the second embodiment. Definition information 111 is preliminarily stored in the storage unit 110. The definition information 111 includes columns for item-name, name, and attribute.

The item-name column has set therein names of items to be defined. The name column has registered therein names of components or the like to be defined. When no name is set, however, a "-" (hyphen) indicating absence of setting is registered. The attribute column has registered therein attributes of items to be defined.

For example, the definition information 111 has registered therein information indicating "environment temperature" as the item-name, "-" as the name, and "30° C." as the attribute. This indicates that the initial value of the temperature inside and outside the housing 200 is set to be 30° C. The name "-" indicates that there is no setting of name.

In addition, the definition information 111 has registered therein information indicating, for example, "component" as the item-name, "fan F1" as the name, and "placement: P1, air volume: 3 m$^3$/min, rotation speed: 3000 rpm" as the attribute. This indicates that the fan F1 is placed as a component at a position P1 in the housing 200. In addition, the information indicates that the air volume of the fan F1 is 3 m$^3$/min and the rotation speed is 3000 rpm. The definition information 111 also has the fan F2 similarly defined therein.

Furthermore, the definition information 111 has registered therein information indicating, for example, "component" as the item-name, "heating element H1" as the name, and "placement: P3, permissive temperature: 80° C." as the attribute. This indicates that the heating element H1 is placed as a component at a position P3 of the housing 200. In addition, the information indicates that the upper limit of the temperature permitted for the heating element H1 (referred to as permissive temperature) is 80° C. The definition information 111 also has the heating element H2 similarly defined therein.

Figure 6:
FIG. 6 illustrates an exemplary cooling contribution table of the second embodiment.

FIG. 6 illustrates an exemplary cooling contribution table of the second embodiment. A cooling contribution table 112 is stored in the storage unit 110. The cooling contribution table 112 includes columns for heating element, fan F1 and fan F2.

The heating element column has registered therein names of heating elements. The fan F1 column has registered therein cooling contributions of the fan F1 to the heating elements. The fan F2 column has registered therein cooling contributions of the fan F2 to the heating elements.

For example, the cooling contribution table 112 has registered therein information indicating "heating element H1" as the heating element, "70%" for the fan F1, and "30%" for the fan F2. This indicates that the cooling contribution of the fan F1 to the heating element H1 is 70%. In addition, the information indicates that the cooling contribution of the fan F2 to the heating element H1 is 30%. The cooling contribution table 112 has similarly registered therein "40%" as the cooling contribution of the fan F1 to the heating element H2, and "60%" as the cooling contribution of the fan F2.

FIG. 7 illustrates exemplary PQ tables of the second embodiment. PQ tables 113, 113a, 113b, 113c and 113d are preliminarily stored in the storage unit 110. Here, the fans F1 and F2 are assumed to be a 120 mm square and 38 mm thick fan, as an example. The PQ tables 113, 113a, 113b, 113c and 113d satisfy the above condition of the fan.

The PQ tables 113, 113a, 113b, 113c and 113d indicate the relation between the air volume, static pressure and noise for rotation speeds of 5000 rpm, 4000 rpm, 3500 rpm, 3000 rpm and 2500 rpm, respectively. Although the PQ table 113 will be mainly described in the following, the PQ tables 113a, 113b, 113c and 113d have a similar data structure.

The PQ table 113 includes columns for air volume, static pressure and noise. The air volume column has registered therein air volumes. The unit of air volume is cubic meter per minute ($m^3$/min). The static pressure column has registered therein static pressure values. The unit of static pressure value is pascal (Pa). The noise column has registered therein noise values. The unit of noise value is decibel (dB).

For example, the PQ table 113 has registered therein information indicating "3.37" as the air volume, "69" as the static pressure, and "60.2" as the noise. The information indicates that the static pressure value is 69 Pa and the noise value is 60.2 dB when the fan F1 or the fan F2 is operated at a rotation speed of 5000 rpm and an air volume of 3.37 $m^3$/min.

The storage unit 110 has also preliminarily registered therein a PQ table corresponding to rotation speeds other than those described above (a rotation speed higher than 5000 rpm or lower than 2500 rpm).

FIGS. 8A and 8B illustrate exemplary air volume ratio tables of the second embodiment. FIG. 8A illustrates an air volume ratio table 114. The air volume ratio table 114 has registered therein the air volume ratio of the fan F1. FIG. 8B illustrates an air volume ratio table 114a. The air volume ratio table 114a has registered therein the air volume ratio of the fan F2. The air volume ratio tables 114 and 114a are generated by the air volume calculation unit 130 and stored in the storage unit 110. Although the air volume ratio table 114 will be mainly described in the following, the air volume ratio table 114a has a similar data structure.

The air volume ratio table 114 indicates the air volume ratio of the fan F1 against respective amounts of temperature rise of the heating elements H1 and H2. Specifically, the column L1 is a series of amounts of temperature rise of the heating element H1. The row L2 is a series of amounts of temperature rise of the heating element H2. Referring to the air volume ratio table 114, the air volume ratio of the fan F1 according to the amount of temperature rise of the heating elements H1 and H2 may be obtained.

For example, the air volume ratio of the fan F1 is 0.6 when the amount of temperature rise of the heating element H1 is 30° C. and the amount of temperature rise of the heating element H2 is 30° C. Therefore, a new air volume is obtained by multiplying the initial air volume of the fan F1 by the air volume ratio 0.6.

On this occasion, the air volume ratio of the fan F2 under the same condition may be obtained by referring to the air volume ratio table 114a. Specifically, the air volume ratio of the fan F2 under the same condition (temperature rise of both the heating elements H1 and H2 is 30° C.) is 0.6. Therefore, a new air volume is obtained by multiplying the initial air volume of the fan F2 by the air volume ratio 0.6.

FIGS. 9A and 9B illustrate exemplary air volume tables of the second embodiment. FIG. 9A illustrates an air volume table 115. The air volume table 115 has registered therein the air volume of the fan F1 calculated based on air volume ratio table 114. FIG. 9B illustrates an air volume table 115a. The air volume table 115a has registered therein the air volume of the fan F2 calculated based on the air volume ratio table 114a. The air volume tables 115 and 115a are generated by the air volume calculation unit 130 and stored in the storage unit 110. Although the air volume table 115 will be mainly described in the following, the air volume table 115a has a similar data structure.

The air volume table 115 indicates the air volume of the fan F1 in relation to respective amounts of temperature rise of the heating elements H1 and H2 (in $m^3$/min). Specifically, the column L3 is a series of temperature rise of the heating element H1. The row L4 is a series of amounts of temperature rise of the heating element H2. Referring to the air volume table 115, a new air volume of the fan F1 according to the amounts of temperature rise of the heating elements H1 and H2 may be obtained.

For example, the air volume of the fan F1 is 1.8 $m^3$/min when the amount of temperature rise of the heating element H1 is 30° C. and the amount of temperature rise of the heating element H2 is 30° C.

On this occasion, a new air volume of the fan F2 under the same condition may be obtained by referring to the air volume table 115a. Specifically, the new air volume of the fan F2 under the same condition (temperature rise of both the heating elements H1 and H2 is 30° C.) is 1.8 $m^3$/min.

Figure 10:
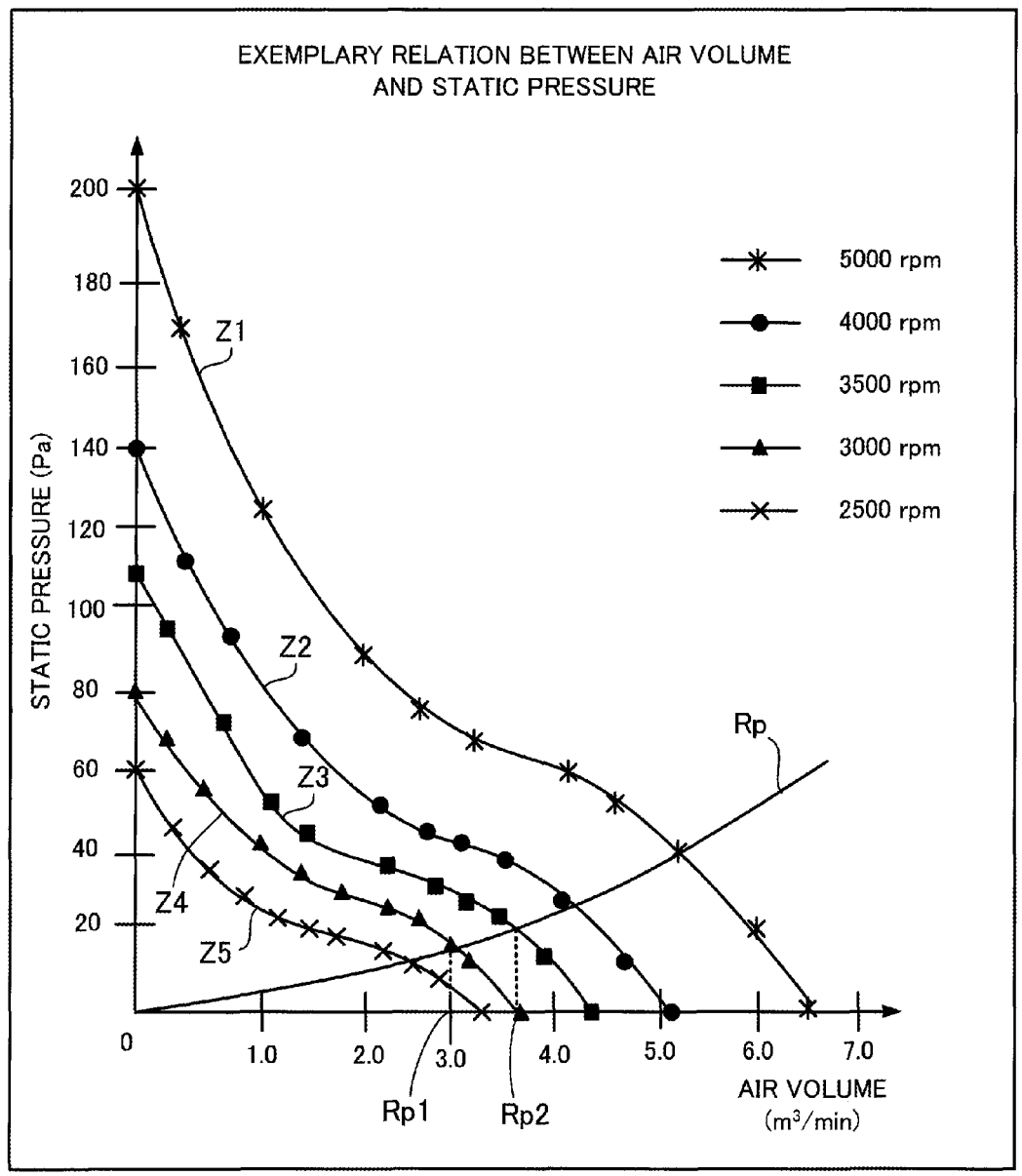
FIG. 10 illustrates an exemplary relation between air volume and static pressure of the second embodiment.

FIG. 10 illustrates an exemplary relation between air volume and static pressure of the second embodiment. In FIG. 10 the bottom-left corner of the graph is the origin O. The coordinate axis along the rightward direction from the origin O indicates the air volume. The coordinate axis along the upward direction from the origin O indicates the static pressure. In FIG. 10, the series Z1, Z2, Z3, Z4 and Z5 indicating the relation between the static pressure and the air volume are illustrated respectively for 5000 rpm, 4000 rpm, 3500 rpm, 3000 rpm and 2500 rpm. In addition, a system impedance curve Rp for the fans F1 and F2 is also illustrated.

Here, the series Z1 represents the relation between static pressure and air volume of the PQ table 113 in the form of a graph. The series Z2 represents the relation between static pressure and air volume of the PQ table 113a in the form of a graph. The series Z3 represents the relation between static pressure and air volume of the PQ table 113b in the form of a graph. The series Z4 represents the relation between static pressure and air volume of the PQ table 113c in the form of a graph. The series Z5 represents the relation between static pressure and air volume of the PQ table 113d in the form of a graph. It may also be said that the series Z1, Z2, Z3, Z4 and Z5 are curves indicating the properties of air volume and static pressure. On the other hand, the system impedance curve Rp indicates the flow path resistance. The intersection between the series Z1, Z2, Z3, Z4 and Z5, and the system impedance curve Rp is the operating point of the fans F1 and F2.

Using the curves, the air volume calculation unit 130 may obtain the rotation speed for the new air volumes of the fans F1 and F2. When, for example, the new air volume coincides with the air volume at the intersection between the system impedance curve Rp and any of the series, the rotation speed of the fan is set to the rotation speed corresponding to the series. In addition, when, for example, the new air volume coincides with the air volume at the intersection between the system impedance curve Rp and the series Z5, the rotation speed may be determined to be 2500 rpm.

In addition, the rotation speeds of the fans F1 and F2 may also be obtained using respective curves when the new air volume lies between given series. As an example, let us consider a case where the new air volume is 3.5 m³/min. In this case, it is conceivable from the system impedance curve Rp that the series for the rotation speed corresponding to the new air volume lies between the series Z3 for the rotation speed of 3500 rpm and the series Z4 for the rotation speed of 3000 rpm.

Therefore, the air volume calculation unit 130 approximately calculates the rotation speed for the new air volume 3.5 m³/min, using an air volume Rp1 at the intersection between the system impedance curve Rp and the series Z4, and an air volume Rp2 at the intersection between the system impedance curve Rp and the series Z3. Specifically, let us consider a straight line connecting the intersections. Subsequently, the proportion by which the new air volume 3.5 m³/min is shifted to either the series Z3 or the series Z4 on the straight line is calculated for the air volume difference 500 rpm between the series Z3 and Z4. When, for example, "new air volume−air volume Rp1=air volume Rp2−new air volume" holds, the rotation speed is determined to be 3000+500*½=3250 rpm. When, alternatively, "new air volume−air volume Rp1=4*(air volume Rp2−new air volume)" holds, the rotation speed is determined to be 3000+500*⅘=3400 rpm.

FIGS. 11A and 11B illustrate exemplary rotation speed by temperature tables of the second embodiment. FIG. 11A illustrates a rotation speed by temperature table 116. The rotation speed by temperature table 116 has registered therein rotation speeds by temperature of the fan F1. FIG. 11B illustrates a rotation speed by temperature table 116a. The rotation speed by temperature table 116a has registered therein rotation speeds by temperature of the fan F2 according to the temperature. The rotation speed by temperature tables 116 and 116a are generated by the air volume calculation unit 130 based on respective PQ tables and the air volume tables 115 and 115a, and stored in the storage unit 110. Although the rotation speed by temperature table 116 will be mainly described in the following, the rotation speed by temperature table 116a has a similar data structure.

The rotation speed by temperature table 116 indicates rotation speeds (in rpm) of the fan F1 for respective amounts of temperature rise of the heating elements H1 and H2. Specifically, the column L5 is a series of temperature rise of the heating element H1. The row L6 is a series of amounts of temperature rise of the heating element H2. Rotation speeds of the fan F1 according to the amounts of temperature rise of the heating elements H1 and H2 may be obtained by referring to the rotation speed by temperature table 116. When, for example, the temperature rise of the heating element H1 is 30° C. and the temperature rise of the heating element H2 is 30° C., the rotation speed of the fan F1 is 1800 rpm.

On this occasion, the rotation speed of the fan F2 under the same condition may be obtained by referring to the rotation speed by temperature table 116a. Specifically, the rotation speed of the fan F2 under the same condition (the amount of temperature rise of the heating elements H1 and H2 are both 30° C.) is 1800 rpm.

Next, a procedure of the analysis process of the second embodiment will be described. In the following, the aforementioned housing 200 is assumed as an exemplary verification model.

Figure 12:
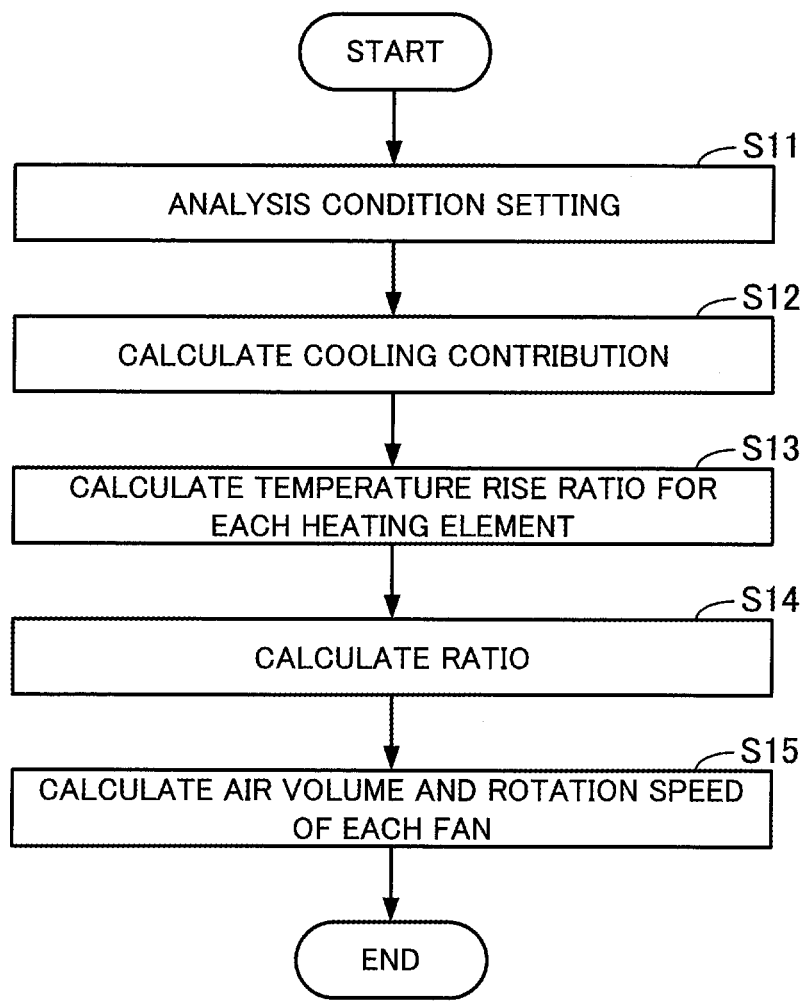
FIG. 12 is a flowchart illustrating an exemplary analysis processing of the second embodiment.

FIG. 12 is a flowchart illustrating an exemplary analysis processing of the second embodiment. In the following, the procedure illustrated in FIG. 12 will be described along with step numbers.

(S11) The cooling contribution calculation unit 120 performs initial setting for a CFD-based simulation, referring to the definition information 111 stored in the storage unit 110. Specifically, the cooling contribution calculation unit 120 reads information about placement of the fans F1 and F2, and the heating elements H1 and H2 in the housing 200, together with attribute values (including environment temperature). In the following description, the air volume of the fan F1 is denoted by $A_0$, the air volume of the fan F2 is denoted by $B_0$, the environment temperature is denoted by $T_a$, the permissive temperature of the heating element H1 is denoted by $T_{w1}$, and the permissive temperature of the heating element H2 is denoted by $T_{w2}$.

(S12) The cooling contribution calculation unit 120 performs a CFD-based simulation on an analysis object model and, using the result, calculates the cooling contributions of the fans F1 and F2 to the heating elements H1 and H2. The calculation method of the cooling contribution will be described below. The cooling contribution calculation unit 120 registers the calculated cooling contribution in the cooling contribution table 112. The cooling contribution calculation unit 120 obtains, as the result of the simulation, a temperature $T_{s1}$ of the heating element H1 and a temperature $T_{s2}$ of the heating element H2 in the steady state when the fans F1 and F2 are operated according to the content of the definition information 111.

(S13) Using the following formula (4), the air volume calculation unit 130 calculates temperature rise ratios $T_1$ and $T_2$ respectively for the heating elements H1 and H2 when the fans F1 and F2 are operated with the air volume of the definition information 111.

$$\begin{cases} T_1 = \dfrac{T_{s1} - T_a}{T_{w1} - T_a} \\ T_2 = \dfrac{T_{s2} - T_a}{T_{w2} - T_a} \end{cases} \quad (4)$$

It may also be said that the temperature rise ratios $T_1$ and $T_2$ or the cooling margin (amount represented by $1-T_1$ or $1-T_2$) indicate the degree of deviation of the amounts of temperature rise of the heating elements H1 and H2 calculated by the simulation from the permissive temperatures $T_{w1}$ and $T_{w2}$. The smaller the temperature rise ratios $T_1$ and $T_2$ are, the larger the degree of over-cooling is. The larger the cooling margin is, the larger the degree of over-cooling is.

(S14) The air volume calculation unit 130 calculates an air volume ratio $X_a$ (may be abbreviated as ratio $X_a$, in the following) of a new air volume $A_1$ against the air volume $A_0$, and an air volume ratio $X_b$ (may be abbreviated as $X_b$, in the following) of a new air volume $B_1$ against the air volume $B_0$. The ratios $X_a$ and $X_b$ may be represented in the following formula (5).

$$\begin{cases} X_a = \dfrac{A_1}{A_0} \\ X_b = \dfrac{B_1}{B_0} \end{cases} \quad (5)$$

In addition, the air volume calculation unit 130 determines, for each of the heating elements H1 and H2, a relational expression between the total sum of values obtained by weighting the ratios $X_a$ and $X_b$ with the cooling contributions of the fans F1 and F2 to the heating elements H1 and H2, and the temperature rise ratios $T_1$ and $T_2$, with the ratios $X_a$ and $X_b$ being parameters for the fans F1 and F2. First, focusing on the heating element H1, the ratio $X_a$ is weighted with the cooling contribution $a_1$ of the fan F1 to the heating element H1 ($X_a \times a_1$). The ratio $X_b$ is weighted with the cooling contribution $b_1$ of the fan F2 to the heating element H1 ($X_b \times b_1$). The air volume calculation unit 130 determines the relational expression between the total sum after the weighting and the temperature rise ratio $T_1$. Specifically, since it is conceivable that the air volumes of the fans F1 and F2 may be reduced by $1-T_1$, the relation "$X_a \times a_1 + X_b \times b_1 \geq 1-(1-T_1) = T_1$" is obtained. A similar result is obtained focusing on the heating element H2. Therefore, the air volume calculation unit 130 determines the following simultaneous inequalities (6).

$$\begin{cases} X_a \cdot a_1 + X_b \cdot b_1 \geq T_1 \\ X_a \cdot a_2 + X_b \cdot b_2 \geq T_2 \end{cases} \quad (6)$$

It may also be said that the first formula of expression (6) (upper formula) indicates the relation between the total sum obtained by weighting the ratios $X_a$ and $X_b$ with the cooling contributions $a_1$ and $b_1$ of the fans F1 and F2 to the heating element H1, and the temperature rise ratio $T_1$ of the heating element H1. In addition, it may also be said that the second formula of expression (6) (lower formula) indicates the relation between the total sum obtained by weighting the ratios $X_a$ and $X_b$ with the cooling contributions $a_2$ and $b_2$ of the fans F1 and F2 to the heating element H2, and the temperature rise ratio $T_2$ of the heating element H2.

In formula (6), the minimum values of the ratios $X_a$ and $X_b$ may be obtained as a solution of simultaneous equations by replacing the inequality signs by equality signs. This is because two relational expressions with regard to the two heating elements have been obtained for two parameters with regard to the two fans. Therefore, the air volume calculation unit 130 replaces the inequality signs in formula (6) by equality signs to define a set of simultaneous equations. The air volume calculation unit 130 calculates the ratios $X_a$ and $X_b$ by solving the simultaneous equations. Here, the air volume calculation unit 130 determines whether or not the calculated solution of the ratio $X_a$ or the ratio $X_b$ is equal to or larger than zero. When the solution of one of the ratios is smaller than zero, the air volume calculation unit 130 determines the solution of the ratio to be zero. The air volume calculation unit 130 registers the obtained ratios $X_a$ and $X_b$ in the air volume ratio tables 114 and 114a, in association with the amount of temperature rise $T_{s1}-T_a$ of the heating element H1 and the amount of temperature rise $T_{s2}-T_a$ of the heating element H2.

(S15) The air volume calculation unit 130 calculates the air volumes $A_1$ and $B_1$, using the ratios $X_a$ and $X_b$ calculated at step S14 and formula (5). The air volume calculation unit 130 registers the calculated air volumes $A_1$ and $B_1$ in the air volume tables 115 and 115a, in association with the amount of temperature rise $T_{s1}-T_a$ of the heating element H1 and the amount of temperature rise $T_{s2}-T_a$ of the heating element H2. The air volume calculation unit 130 determines, based on respective PQ tables, the rotation speed of the fan F1 according to the calculated air volume $A_1$. Similarly, the air volume calculation unit 130 determines, based on respective PQ tables, the rotation speed of the fan F2 according to the calculated air volume $B_1$. The determination method of the rotation speed is as illustrated in FIG. 10. The air volume calculation unit 130 registers the determined rotation speeds of the fans F1 and F2 in the rotation speed by temperature tables 116 and 116a, in association with the amount of temperature rise $T_{s1}-T_a$ of the heating element H1 and the amount of temperature rise $T_{s2}-T_a$ of the heating element H2.

Upon applying specific numerical values to each of the aforementioned steps, the air volume calculation unit 130 performs the following processing. First, the environment temperature is $T_a = 30°$ C., according to the definition information 111. The air volumes of the fans F1 and F2 are $A_0 = B_0 = 3$ m³/min. The permissive temperatures of the heating elements H1 and H2 are $T_{w1} = T_{w2} = 80°$ C.

In addition, the cooling contribution $a_1$ of the fan F1 to the heating element H1 is given by $a_1 = 70\%$ and the cooling contribution $b_1$ of the fan F2 is given by $b_1 = 30\%$, according to the cooling contribution table 112. The cooling contribution $a_2$ of the fan F1 to the heating element H2 is given by $a_2 = 40\%$ and the cooling contribution $b_2$ of the fan F2 is given by $b_2 = 60\%$.

In addition, let us assume at step S12 that the temperature $T_{s1}$ of the heating element H1 is given by $T_{s1} = 60°$ C., and the temperature $T_{s2}$ of the heating element H2 is given by $T_{s2} = 50°$ C. in the steady state as a result of the simulation.

On this occasion, the temperature rise ratio $T_1$ of the heating element H1 is given by $T_1 = (60-30)/(80-30) = 0.6$ (60%). This indicates that the temperature of the heating element H1 has risen up to 60% of the permissive temperature. Namely, a temperature rise with a ratio of $1-0.6=0.4$ (40%) is permitted against the permissive temperature, resulting in over-cooling. In other words, there is a 40% margin of temperature rise, which suggests that there is room for reducing the air volumes of the fans F1 and F2 by the margin. Therefore, it is conceivable that the air volume to the heating element H1 may be reduced from the current value by 40%.

Therefore, the air volume calculation unit 130 obtains the relational expression "$0.7 X_a + 0.3 X_b \geq 0.6$", considering the weighting with the cooling contribution, in relation to the heating element H1.

A similar consideration about the heating element H2 results in the temperature rise ratio $T_2$ of the heating element H2 such that $T_2 = (50-30)/(80-30) = 0.4$ (40%). Therefore, it is conceivable that the air volume to the heating element H2 may be reduced from the current value by 60%. Accordingly, the air volume calculation unit 130 obtains the relational expression "$0.4X_a+0.6X_b \geq 0.4$", considering the weighting with the cooling contribution in relation to the heating element H2.

It is possible to form a set of simultaneous equations from the two relational expressions by replacing the inequality signs therein by equality signs, and to calculate the minimum values of the ratios $X_a$ and $X_b$. Specifically, a set of simultaneous equations "$0.7X_a+0.3X_b=0.6$" and "$0.4X_a+0.6X_b=0.4$" is obtained. Solving the simultaneous equations for $X_a$ and $X_b$ gives $X_a=0.8$ and $X_b=0.133$.

The air volume calculation unit 130 calculates the air volumes $A_1$ and $B_1$, using formula (5). In this case, air volumes $A_1=2.4$ m³/min and $B_1=0.4$ m³/min are obtained. The air volume calculation unit 130 determines the rotation speed of the fan F1 corresponding to the air volume $A_1$ and the rotation speed of the fan F2 corresponding to the air volume $B_1$, as illustrated in FIG. 10.

The result calculated by the air volume calculation unit 130 is registered in the air volume ratio tables 114 and 114a, the air volume tables 115 and 115a, and the rotation speed by temperature tables 116 and 116a. In this case, the air volume calculation unit 130 registers respective calculation results in respective tables in association with the 30° C. temperature rise of the heating element H1 and the 20° C. temperature rise of the heating element H2.

The verification apparatus 100 may fill the air volume ratio tables 114 and 114a, the air volume tables 115 and 115a, and the rotation speed by temperature tables 116 and 116a, by repeatedly performing the aforementioned steps S11-S15 for different definition information (e.g., those having different environment temperatures). In addition, although a case has been described above where the number of fans is two and the number of heating elements is two, it is also possible to calculate the air volume and the rotation speed of each fan similarly when there are three or more fans and three or more heating elements.

According to the second embodiment, as thus described, the air volume and the rotation speed of each fan may be efficiently determined when a plurality of heating elements H1 and H2 is over-cooled by a plurality of fans. Here, even when air volumes of a plurality of fans are adjusted focusing on a single heating element, for example, the result of adjustment is not necessarily appropriate for other heating elements. Accordingly, determining the air volume of each fan is troublesome and time consuming although the air volume of each fan is adjusted so that all the heating elements do not reach the upper limit temperature by trial and error by performing an experiment or a simulation while changing the air volume of each fan. The larger the number of fans and heating elements, the more serious the problem becomes.

Furthermore, the work cost increases still more when determining the air volumes and the rotation speeds of a plurality of fans for various combinations of amounts of temperature rise of a plurality of heating elements as in the case where the rotation speed by temperature tables 116 and 116a are preliminarily created at the development stage of a product.

According to the method of the second embodiment, on the other hand, air volumes of a plurality of fans to a plurality of heating elements may be simultaneously determined, using the simultaneous equations considering the cooling contribution. Accordingly, the trouble and time for determining the air volume of each fan may be reduced and the air volume of each fan may be efficiently determined in comparison with the case where the air volume of each fan is adjusted by trial and error. On this occasion, excessive air volume of each fan may be reduced and therefore power consumption of each fan is expected to be reduced by controlling the rotation speed of each fan mounted on the actual machine, using the rotation speed by temperature tables 116 and 116a. In addition, the rotation speed of the fan may also be reduced along with the reduction of the air volume and therefore reduction of the noise is also expected. Next, an exemplary application of the rotation speed by temperature tables 116 and 116a to cooling will be described.

Figure 13:
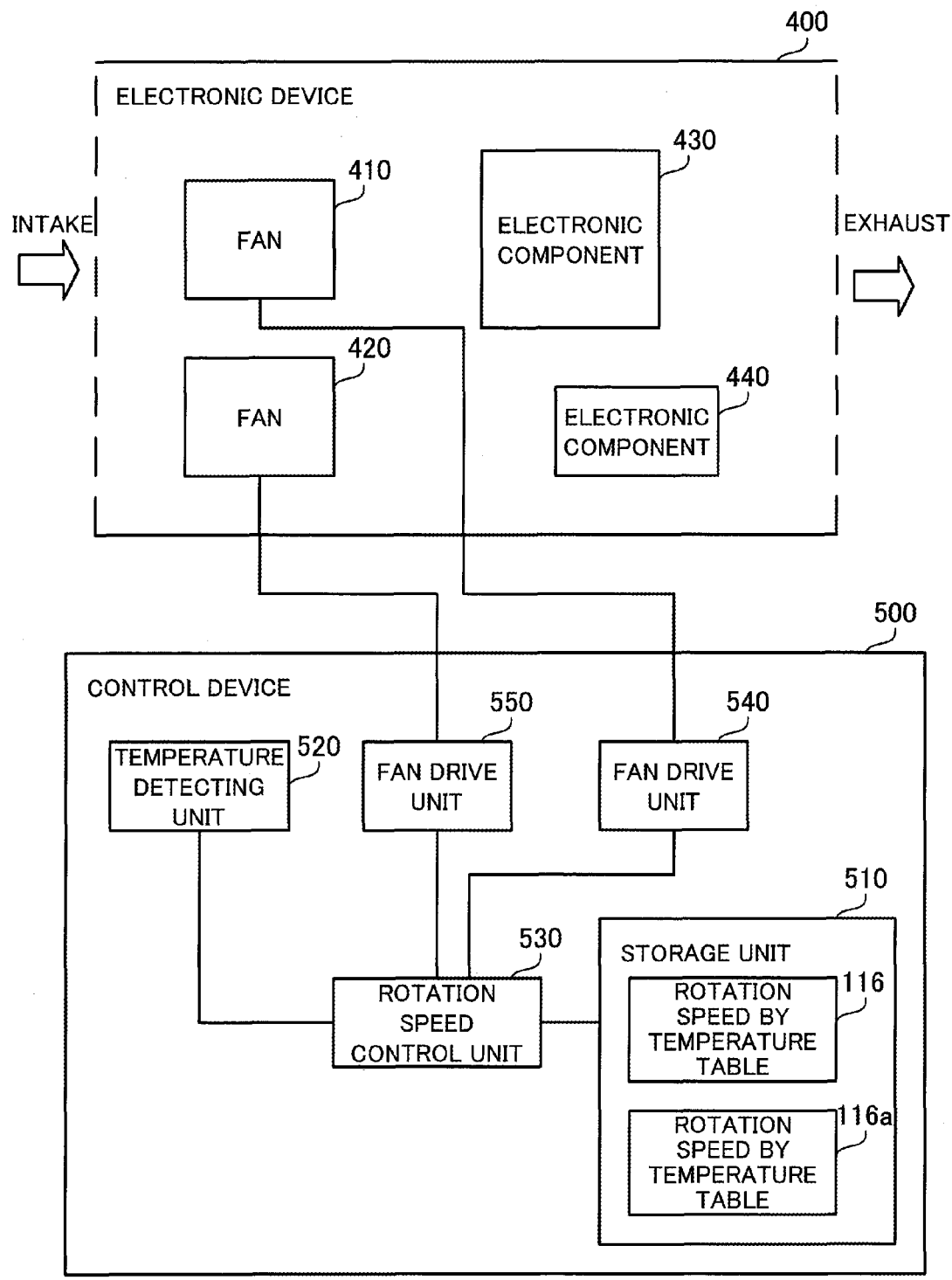
FIG. 13 illustrates a specific example of cooling of the second embodiment.

FIG. 13 illustrates a specific example of cooling of the second embodiment. Here, let us consider a case where a control apparatus 500 performs cooling control of an electronic device 400 as an example. Cooling control according to the temperatures of electronic components included in the electronic device 400 may be performed by storing the rotation speed by temperature tables 116 and 116a in the control apparatus 500.

The electronic device 400 has components corresponding to (placement and attribute being the same as) the analysis object model described in FIG. 4. Specifically, the electronic device 400 has fans 410 and 420 and electronic components 430 and 440.

The fan 410 corresponds to the fan F1 in the aforementioned analysis object model. The fan 420 corresponds to the fan F2. The rotation speeds of the fans 410 and 420 are variable. The fans 410 and 420 change their rotation speeds according to an instruction from the control apparatus 500. The electronic component 430 corresponds to the heating element H1. The electronic component 440 corresponds to the heating element H2.

There are thermometers installed at predetermined positions of the electronic device 400, and in the electronic components 430 and 440. Thermometers installed in respective places measure the temperature inside and outside the electronic device 400, and the temperature of the electronic components 430 and 440.

The control apparatus 500 has a storage unit 510, a temperature detecting unit 520, a rotation speed control unit 530, and fan drive units 540 and 550. The storage unit 510 stores the rotation speed by temperature tables 116 and 116a. The temperature detecting unit 520 monitors thermometers installed in respective places of the electronic device 400, and detects the temperature within the space in the electronic device 400, and the temperature of the electronic components 430 and 440.

Referring to the rotation speed by temperature tables 116 and 116a, the rotation speed control unit 530 instructs the fan drive units 540 and 550 to change the rotation speeds of the fans 410 and 420, according to the temperatures detected by the temperature detecting unit 520. The fan drive unit 540 instructs the fan 410 to change its operation. The fan drive unit 550 instructs the fan 420 to change its operation.

For example, let us assume that the fans 410 and 420 are operating at 3000 rpm. On this occasion, the temperature detecting unit 520 detects 30° C. as the environment temperature (temperature in the room where the electronic device 400 is installed). In addition, the temperature detecting unit 520 detects a temperature of 60° C. of the electronic component 430 and a temperature of 50° C. of the electronic component 440.

The rotation speed control unit 530 then calculates the amount of temperature rise 30° C. from environment temperature 30° C. for the electronic component 430. Similarly, the rotation speed control unit 530 calculates the amount of temperature rise 20° C. from the environment temperature 30° C. for the electronic component 440. The rotation speed control unit 530 then instructs the fan drive unit 540 to set the rotation speed of the fan 410 to 2400 rpm, referring to the rotation speed by temperature table 116. In response to the instruction, the fan drive unit 540 sets the rotation speed of the fan 410 to 2400 rpm.

In addition, the rotation speed control unit 530 instructs the fan drive unit 550 to set the rotation speed of the fan 420 to 400 rpm, referring to the rotation speed by temperature table 116a. In response to the instruction, the fan drive unit 550 sets the rotation speed of the fan 420 to 400 rpm.

As thus described, the air volumes and the rotation speeds of the fans 410 and 420 may be optimized according to the temperature rise of each of the electronic components 430 and 440, using the rotation speed by temperature tables 116 and 116a. Therefore, it is possible to suppress over-cooling of the electronic components 430 and 440 by the fans 410 and 420. In other words, it becomes possible to set the air volumes and the rotation speeds of the fans 410 and 420 to be smaller in accordance with the amounts of temperature rise of the electronic components 430 and 440. Accordingly, it is possible to reduce the load of the fans 410 and 420 and their power consumption. In addition, reducing the rotation speeds of the fans 410 and 420 may also reduce the noise. In the example described above, the rotation speed of the fan 420 may be largely reduced in comparison with the fan 410, whereby the noise of the fan 420 has been significantly reduced.

Although the initial air volumes of respective fans are assumed to be the same in the example described above, different air volumes may be used. In this case, there is also conceivable an application method which, for example, adjusts the air volume of each fan using the aforementioned method, provided that the rotation speed of the fan having the maximum air volume has been reduced by a predetermined value.

Third Embodiment

Next, a third embodiment will be described. Matters which are different from the aforementioned second embodiment will be mainly described, with description of common matters being omitted.

In the second embodiment, a case has been described where the number of fans and the number of heating elements are the same. On the other hand, the air volume and the rotation speed of each fan may also be determined more efficiently when the number of fans and the number of heating elements are different. In the third embodiment, therefore, a function is provided to calculate the air volume when the number of heating elements is different from the number of fans. Particularly, in the third embodiment, a case is assumed where the number of fans is smaller than the number of heating elements. The case where the number of fans is larger than the number of heating elements will be described in a fourth embodiment described below.

Here, a verification apparatus of the third embodiment is similar to the verification apparatus 100 of the second embodiment. Hardware and function blocks of the verification apparatus of the third embodiment are similar to the hardware and function blocks of the verification apparatus 100 described in FIGS. 2 and 3. Therefore, also in the third embodiment, the same names and symbols as those in the second embodiment will be used.

In the third embodiment, the verification apparatus 100 determines the air volume of each fan, considering, in addition to the simultaneous inequalities, the relation between air volume and noise of each fan. The relation between air volume and noise of each fan may be grasped from the PQ tables 113, 113a, 113b, 113c and 113d illustrated in FIG. 7.

Figure 14:
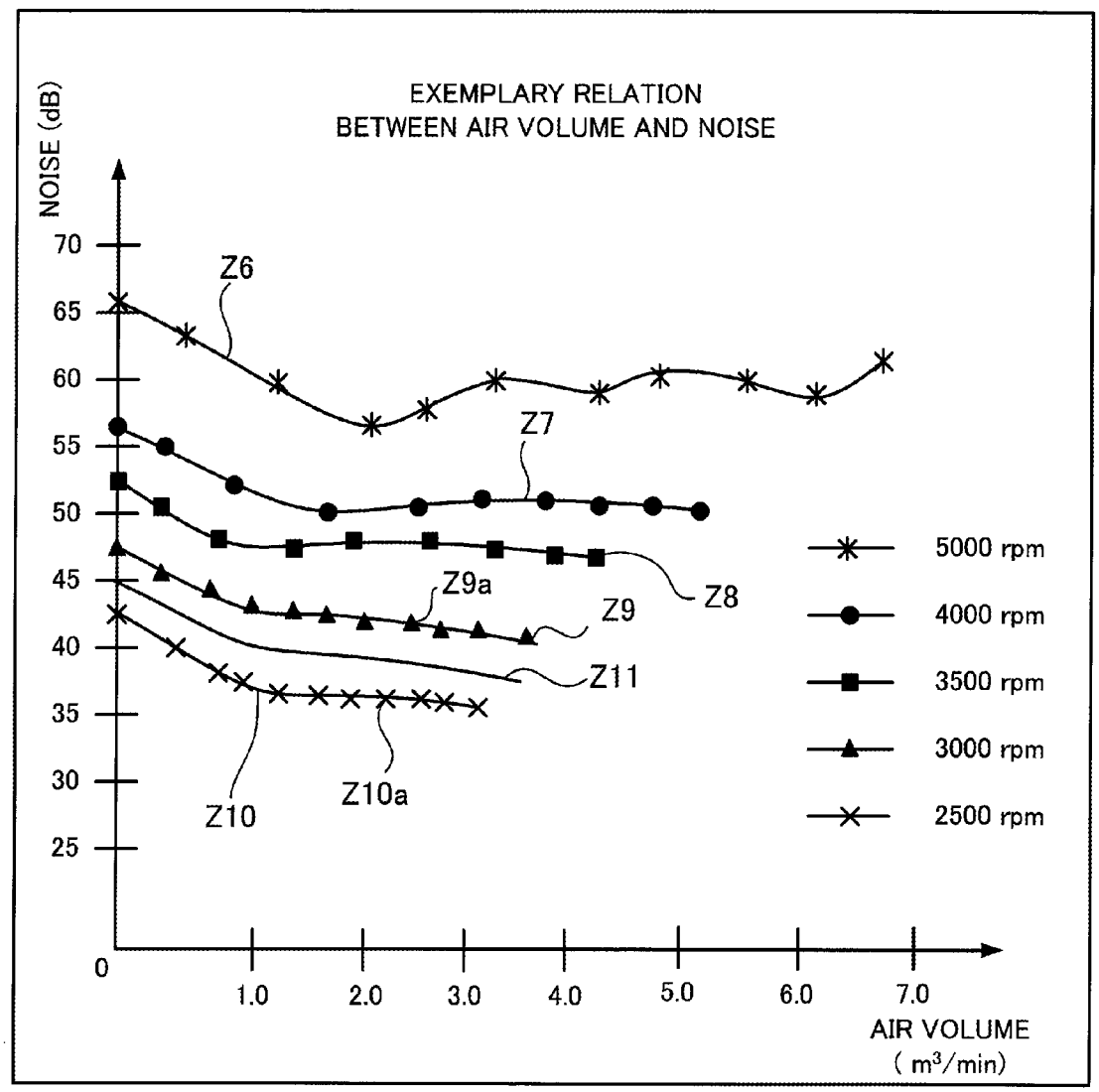
FIG. 14 illustrates an exemplary relation between air volume and noise of a third embodiment.

FIG. 14 illustrates an exemplary relation between air volume and noise of the third embodiment. In FIG. 14, the bottom-left corner of the graph is the origin O. The coordinate axis along the rightward direction from the origin O indicates the air volume. The coordinate axis along the upward direction from the origin O indicates the noise. In FIG. 14, the series Z6, Z7, Z8, Z9 and Z10 indicating the relation between the air volume and the noise are illustrated respectively for 5000 rpm, 4000 rpm, 3500 rpm, 3000 rpm and 2500 rpm.

Here, the series Z6 represents the relation between air volume and noise of the PQ table 113 in the form of a graph. The series Z7 represents the relation between air volume and noise of the PQ table 113a in the form of a graph. The series Z8 represents the relation between air volume and noise of the PQ table 113b in the form of a graph. The series Z9 represents the relation between air volume and noise of the PQ table 113c in the form of a graph. The series Z10 represents the relation between air volume and noise of the PQ table 113d in the form of a graph. It may also be said that the series Z6, Z7, Z8, Z9 and Z10 are curves indicating the properties of air volume and noise.

The air volume calculation unit 130 may obtain a series corresponding to a rotation speed other than the rotation speeds of the PQ table of FIG. 14 from the aforementioned series. For example, the following describes how to obtain a series Z11 corresponding to a rotation speed of 2750 rpm. It is conceivable that the series Z11 of the rotation speed of 2750 rpm lies between the series Z9 and Z10. Therefore, pairs of points are determined by associating respective points plotted on the series Z9 and Z10 (points provided in the PQ tables 113c and 113d) with each other. One of the pairs is, for example, a pair of the point Z9a and the point Z10a. A plurality of such pairs may be determined for the points provided in the PQ tables 113c and 113d.

Furthermore, the air volume calculation unit 130 calculates a plurality of straight lines connecting points included in the pairs determined in the above manner. Here, the rotation speed of 2750 rpm is the intermediate value between the rotation speed of 2500 rpm and the rotation speed of 3000 rpm. The air volume calculation unit 130 then defines a new series connecting the intermediate points of the plurality of calculated straight lines as the series Z11 corresponding to the rotation speed of 2750 rpm. When it is desired to calculate a series of the rotation speed of 2900 rpm, it suffices to define a new series connecting the points dividing each of the calculated straight lines with a ratio of 4 to 1 (ratio between the length of the series Z10 and the length of the series Z9 is 4 to 1) as the series of the rotation speed of 2900 rpm. As thus described, the air volume calculation unit 130 may obtain noise from the air volume and the rotation speed of each fan.

Next, a procedure of the calculation process of the air volume ratio of the third embodiment will be described. In the following description, a case is assumed where the number of fans is two and the number of heating elements is three. In this case, the definition information 111 will have information about two fans and three heating elements registered therein. Specifically, the definition information 111 will have information about the heating element H3 added thereto, besides the fans F1 and F2, and the heating elements H1 and H2. It is assumed that the heating element H3 is placed at a position P6. In addition, the permissive temperature of the heating element H3 is assumed to be 80° C.

Figure 15:
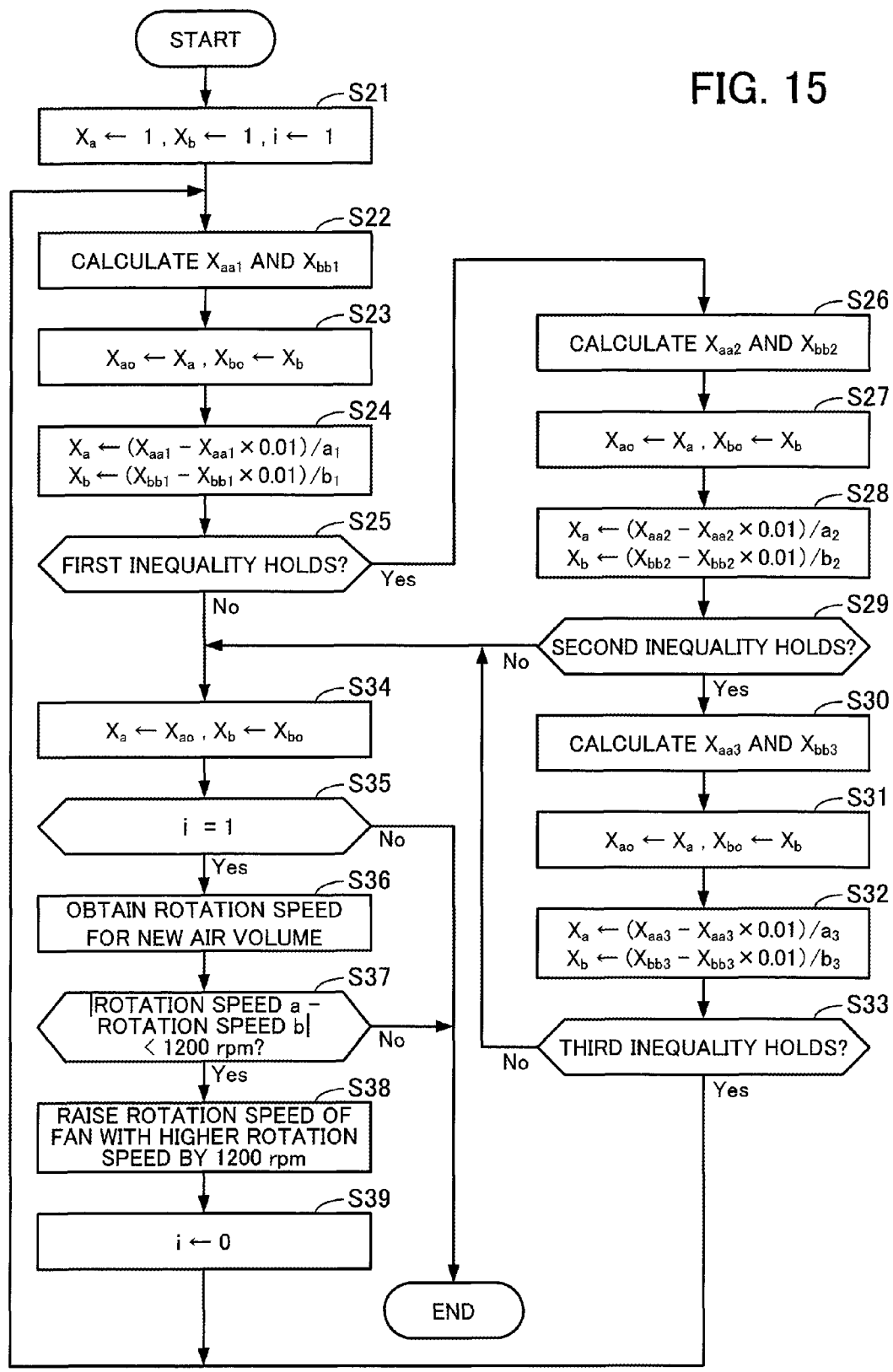
FIG. 15 is a flowchart illustrating an exemplary air volume ratio calculation of the third embodiment.

FIG. 15 is a flowchart illustrating an exemplary air volume ratio calculation of the third embodiment. The procedure illustrated in FIG. 15 is executed instead of step S14 illustrated in FIG. 12. The cooling contribution calculation unit 120 performs a simulation at step S12 considering the heating element H3, and thus preliminarily calculates the amounts of temperature rise of the heating elements H1, H2 and H3, as well as the cooling contributions of the fans F1 and F2 to the heating elements H1, H2 and H3. In this case, the air volume calculation unit 130 obtains, for the ratios $X_a$ and $X_b$, a simultaneous inequalities having the following formula (7) added to the two inequalities indicated in formula (6).

$$X_a \cdot a_3 + X_b \cdot b_3 \geq T_3 \quad (7)$$

Here, $a_3$ denotes the cooling contribution of the fan F1 to the heating element H3, and $b_3$ denotes the cooling contribution of the fan F2 to the heating element H3. In the description of FIG. 15, the upper inequality in formula (6) may be referred to as the first inequality and the lower inequality of formula (6) as the second inequality, and formula (7) as the third inequality. Furthermore, the values $X_{aa1}$, $X_{bb1}$, $X_{aa2}$, $X_{bb2}$, $X_{aa3}$ and $X_{bb3}$ after the ratio of each air volume is weighted with each cooling contribution are represented as the following formula (8).

$$\begin{cases} X_{aa1} = X_a \cdot a_1 \\ X_{bb1} = X_b \cdot b_1 \\ X_{aa2} = X_a \cdot a_2 \\ X_{bb2} = X_b \cdot b_2 \\ X_{aa3} = X_a \cdot a_3 \\ X_{bb3} = X_b \cdot b_3 \end{cases} \quad (8)$$

In the following, the procedure illustrated in FIG. 15 will be described along with step numbers.

(S21) The air volume calculation unit 130 substitutes one into the ratios $X_a$ and $X_b$, and a variable i.

(S22) The air volume calculation unit 130 calculates $X_{aa1}$ and $X_{bb1}$.

(S23) The air volume calculation unit 130 substitutes the ratio $X_a$ into a variable $X_{ao}$. The air volume calculation unit 130 substitutes the ratio $X_b$ into a variable $X_{bo}$.

(S24) The air volume calculation unit 130 substitutes the calculation result of $(X_{aa1} - X_{aa1} * 0.01)/a_1$ into the ratio $X_a$. The air volume calculation unit 130 substitutes the calculation result of $(X_{bb1} - X_{bb1} * 0.01)/b_1$ into the ratio $X_b$.

(S25) The air volume calculation unit 130 determines whether or not the first inequality holds for the updated ratios $X_a$ and $X_b$. When the first inequality holds, the process flow proceeds to step S26. When the first inequality does not hold, the process flow proceeds to step S34.

(S26) The air volume calculation unit 130 calculates $X_{aa2}$ and $X_{bb2}$.

(S27) The air volume calculation unit 130 substitutes the ratio $X_a$ into $X_{ao}$. The air volume calculation unit 130 substitutes the ratio $X_b$ into $X_{bo}$.

(S28) The air volume calculation unit 130 substitutes the calculation result of $(X_{aa2} - X_{aa2} * 0.01)/a_2$ into the ratio $X_a$. In addition, the air volume calculation unit 130 substitutes the calculation result of $(X_{bb2} - X_{bb2} * 0.01)/b_2$ into the ratio $X_b$.

(S29) The air volume calculation unit 130 determines whether or not the second inequality holds for the updated ratios $X_a$ and $X_b$. When the second inequality holds, the process flow proceeds to step S30. When the second inequality does not hold, the process flow proceeds to step S34.

(S30) The air volume calculation unit 130 calculates $X_{aa3}$ and $X_{bb3}$.

(S31) The air volume calculation unit 130 substitutes the ratio $X_a$ into $X_{ao}$. The air volume calculation unit 130 substitutes the ratio $X_b$ into $X_{bo}$.

(S32) The air volume calculation unit 130 substitutes the calculation result of $(X_{aa3} - X_{aa3} * 0.01)/a_3$ into the ratio $X_a$. In addition, the air volume calculation unit 130 substitutes the calculation result of $(X_{bb3} - X_{bb3} * 0.01)/b_3$ into the ratio $X_b$.

(S33) The air volume calculation unit 130 determines whether or not the third inequality holds for the updated ratios $X_a$ and $X_b$. When the third inequality holds, the process flow proceeds to step S22. When the third inequality does not hold, the process flow proceeds to step S34.

(S34) The air volume calculation unit 130 substitutes $X_{ao}$ into the ratio $X_a$. The air volume calculation unit 130 substitutes $X_{bo}$ into the ratio $X_b$. It turns out that $X_{ao}$ and $X_{bo}$ have substituted therein the ratios $X_a$ and $X_b$ immediately before any of the first to third inequalities does not hold. The air volume calculation unit 130 then substitutes the ratios $X_a$ and $X_b$, which have been substituted into $X_{ao}$ and $X_{bo}$, into the ratios $X_a$ and $X_b$ again. In the aforementioned manner, the air volume calculation unit 130 determines the ratios $X_a$ and $X_b$.

(S35) The air volume calculation unit 130 determines whether or not the variable i is one. When the variable i is not one, the air volume calculation unit 130 registers the ratios $X_a$ and $X_b$ in the air volume ratio tables 114 and 114a, in association with respective amounts of temperature rise of the heating elements H1, H2 and H3, and the process is terminated. When the variable i is one, the air volume calculation unit 130 calculates the air volumes $A_1$ and $A_2$ using formula (5). The air volume calculation unit 130 then advances the process flow to step S36.

(S36) The air volume calculation unit 130 obtains the rotation speeds of the fans F1 and F2 corresponding to the air volumes $A_1$ and $B_1$, using the method illustrated in FIG. 10.

(S37) The air volume calculation unit 130 determines whether or not the absolute value of the difference between the rotation speed a of the fan F1 and the rotation speed b of the fan F2 is smaller than 1200 rpm. When the difference is smaller than 1200 rpm, the process flow proceeds to step S38. When the difference is equal to or higher than 1200 rpm, the process is terminated.

(S38) The air volume calculation unit 130 raises the rotation speed of the fan with the higher rotation speed by 1200 rpm. Accordingly, the difference between the rotation speeds of the fans F1 and F2 increases.

(S39) The air volume calculation unit 130 substitutes zero into the variable i. The process flow then proceeds to step S22.

When the number of fans is smaller than the number of heating elements, as thus described, an air volume ratio that does not satisfy any of the simultaneous inequalities is identified while gradually reducing the air volume ratio of each fan from one. Although the extent of reduction is assumed to be 0.01 (1%) in the aforementioned example, other extents of reduction may be used. With regard to the rotation speed determined for the determined air volume, the rotation speed difference between the two fans is increased when the rotation speed difference between both fans is smaller than 1200 rpm.

When the difference of rotational frequency between fans is smaller than 20 Hz (equivalent to 1200 rpm), a person may be annoyed by a humming noise. Therefore, the rotation speed difference between both fans is made equal to or higher than 1200 rpm by the processing at step S38, when the rotation speed difference between fans is smaller than 1200 rpm (equivalent to frequency 20 Hz) in the determination at step S37. Accordingly, the humming noise may be reduced. Here, the threshold value of 1200 rpm at step S37 is an example and different values may be used.

Upon calculating the ratios $X_a$ and $X_b$ by the aforementioned procedure, the air volume calculation unit 130 is supposed to perform the processing at step S15 illustrated in FIG. 12. Specifically, the air volumes $A_1$ and $B_1$ are calculated using the ratios $X_a$ and $X_b$, and formula (5). The air volume calculation unit 130 registers the air volumes $A_1$ and $B_2$ in the air volume tables 115 and 115a, in association with the amounts of temperature rise of the heating elements H1, H2 and H3. The air volume calculation unit 130 determines, based on respective PQ tables, the rotation speed of the fan F1 according to the air volume $A_1$. Similarly, the rotation speed of the fan F2 according to the air volume $B_1$ is determined based on respective PQ tables. The determination method of the rotation speed is as illustrated in FIG. 10. The air volume calculation unit 130 registers the determined rotation speeds of fans F1 and F2 in the rotation speed by temperature table, in association with respective amounts of temperature rise of the heating elements H1, H2 and H3.

Although it is assumed in FIG. 15 that the rotation speed difference between fans is increased based on the rotation speed difference, the rotation speed difference between fans may be increased according to the noise difference between fans to determine a new air volume again. Therefore, a function of adjusting the air volume of a fan according to the noise difference between fans will be described.

Figure 16:
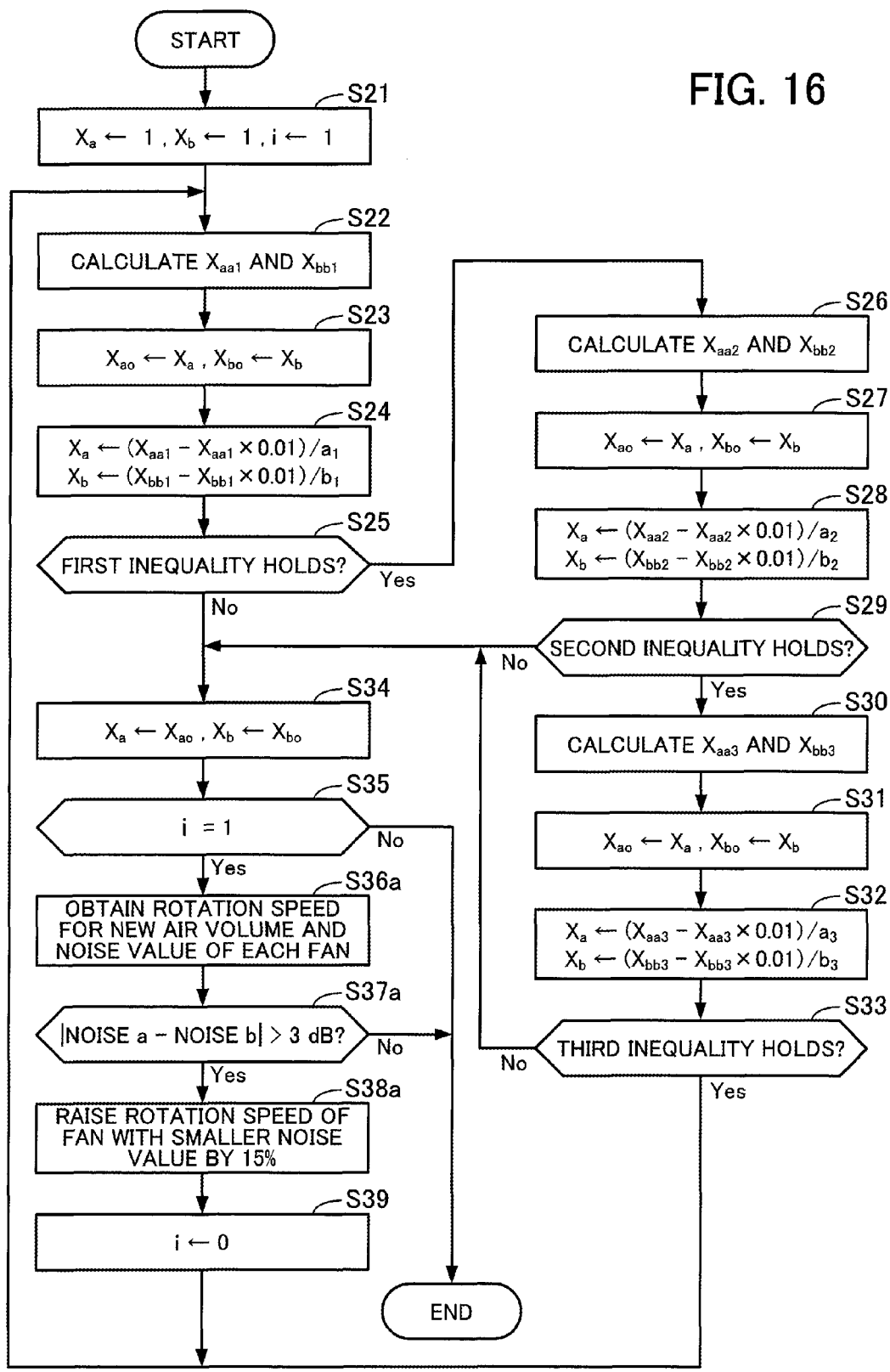
FIG. 16 is a flowchart illustrating another exemplary air volume ratio calculation of the third embodiment.

FIG. 16 is a flowchart illustrating another exemplary air volume ratio calculation of the third embodiment. In the following, the procedure illustrated in FIG. 16 will be described along with step numbers. The procedure of FIG. 16 is a partial modification of the procedure of FIG. 14. Specifically, the air volume calculation unit 130 performs steps S36a, S37a and S38a instead of steps S36, S37 and S38 of FIG. 15. Therefore, these steps will be mainly described, with description of other steps being omitted.

(S36a) The air volume calculation unit 130 obtains the rotation speeds of the fans F1 and F2 corresponding to the air volumes $A_1$ and $B_1$ by the method illustrated in FIG. 10. In addition, the air volume calculation unit 130 obtains, by the method illustrated in FIG. 14, the noise value corresponding to the rotation speeds of the fans F1 and F2.

(S37a) The air volume calculation unit 130 determines whether or not the absolute value of the difference between the noise a of the fan F1 and the noise b of the fan F2 is larger than 3 dB. When the difference is larger than 3 dB, the process flow proceeds to step S38a. When the difference is smaller than 3 dB, the process is terminated.

(S38a) The air volume calculation unit 130 raises the rotation speed of the fan with the smaller noise value by 15%. Assuming that the noise is proportional to the rotation speed to the 5.5th power, the noise difference of 3 dB is equivalent to approximately a rotation speed difference of 13%. Therefore, the rotation speed of the fan with the smaller noise value is supposed to be raised again by 15%, considering the fall of rotation speed when the air volume is calculated.

As thus described, the rotation speed may be adjusted so that the noise difference between fans becomes small. Adjustment to reduce the noise difference reduces the noise perceived by a person. The threshold value of 3 dB at step S37a is an example and different threshold values may be used.

As thus described, the verification apparatus 100 may also efficiently determine the air volume of each fan when the number of fans is smaller than the number of heating elements. On this occasion, the noise may be reduced by adjusting the rotation speed of each fan according to the rotation speed difference or the noise difference between respective fans.

Fourth Embodiment

Next, a fourth embodiment will be described. Matters which are different from the aforementioned second and third embodiments will be mainly described, with description of common matters being omitted.

In the fourth embodiment, a case is assumed where the number of fans is larger than the number of heating elements. A verification apparatus of the fourth embodiment is similar to the verification apparatus 100 of the second embodiment. Hardware and function blocks of the verification apparatus of the third embodiment are similar to the hardware and function blocks of the verification apparatus 100 described in FIGS. 2 and 3. In the fourth embodiment, therefore, the same names and symbols as those in the second embodiment will be used.

In the following description, a case is assumed where the number of fans is three and the number of heating elements is two. In this case, the definition information 111 will have information about three fans and two heating elements registered therein. Specifically, the definition information 111 will have information about the fan F3 added thereto, besides the fans F1 and F2, and the heating elements H1 and H2. It is assumed that the fan F3 is placed at a position P5. The fan F3 is assumed to have an air volume of 3 m³/min and a rotation speed of 3000 rpm.

Figure 17:
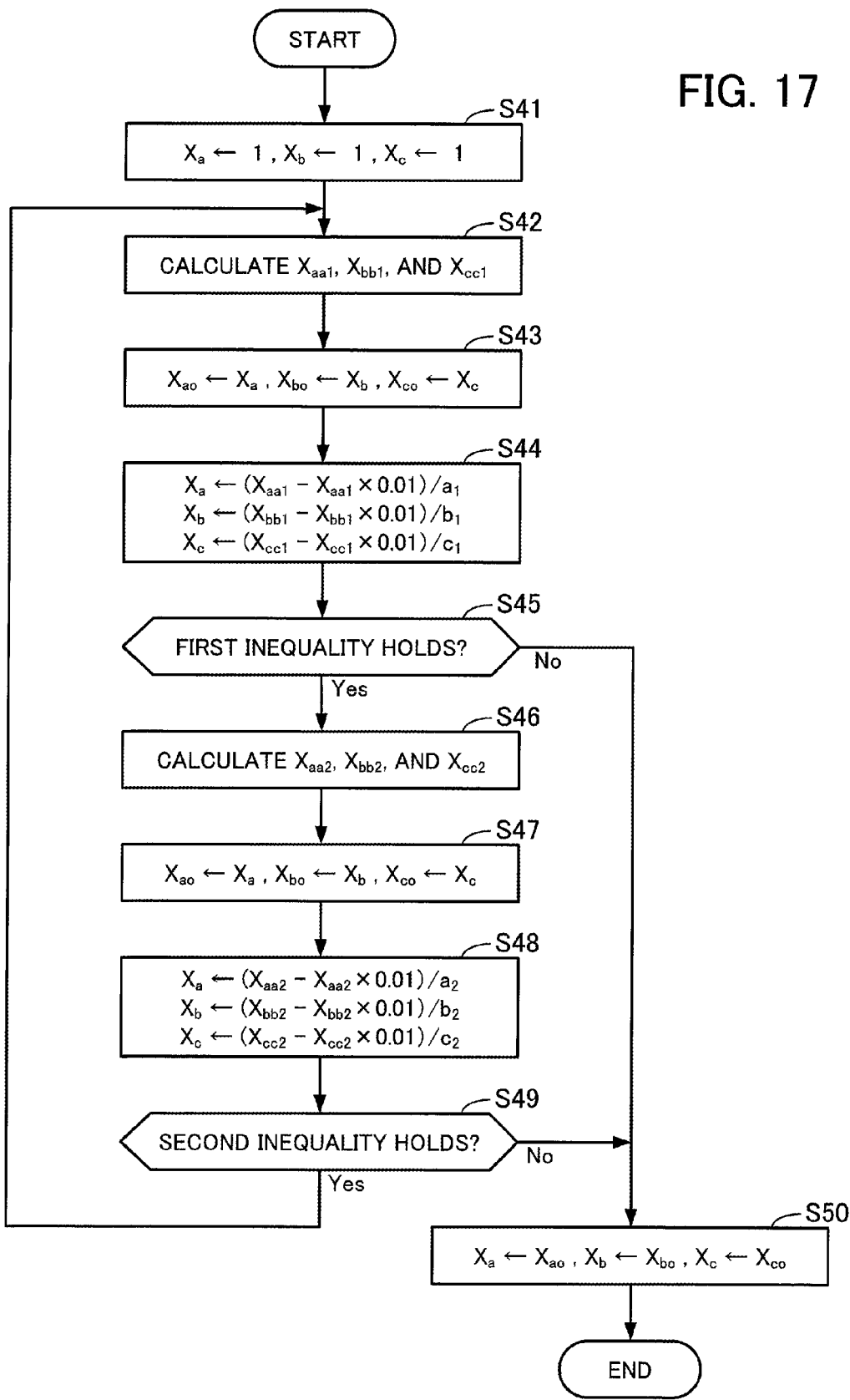
FIG. 17 is a flowchart illustrating an exemplary air volume ratio calculation of a fourth embodiment.

FIG. 17 is a flowchart illustrating an exemplary air volume ratio calculation of the fourth embodiment. The procedure illustrated in FIG. 17 is performed instead of step S14 illustrated in FIG. 12. The cooling contribution calculation unit 120 has performed a simulation at step S12 considering the fan F3, and thus has preliminarily calculated the amounts of temperature rise of the heating elements H1 and H2, as well as the cooling contributions of the fans F1, F2 and F3 to the heating elements H1 and H2. In addition, the air volume calculation unit 130 considers a ratio $X_c$, in addition to the ratios $X_a$ and $X_b$. The ratio $X_c$ is a ratio of a new air volume $C_1$ against the initial air volume $C_0$ of the fan F3 ($X_c = C_1/C_0$).

In this case, the air volume calculation unit 130 obtains the simultaneous inequalities indicated in the following formula (9) for the ratios $X_a$, $X_b$ and $X_c$.

$$\begin{cases} X_a \cdot a_1 + X_b \cdot b_1 + X_c \cdot c_1 \geq T_1 \\ X_a \cdot a_2 + X_b \cdot b_2 + X_c \cdot c_2 \geq T_2 \end{cases} \quad (9)$$

In the description of FIG. 17, the upper inequality in formula (9) may be referred to as the first inequality and the lower inequality in formula (9) as the second inequality. In addition, the values $X_{aa1}$, $X_{bb1}$, $X_{aa2}$ and $X_{bb2}$ after the ratio of each air volume is weighted with each cooling contribution are represented by the aforementioned formula (8), and the values $X_{cc1}$ and $X_{cc2}$ are represented by the following formula (10).

$$\begin{cases} X_{cc1} = X_c \cdot c_1 \\ X_{cc2} = X_c \cdot c_2 \end{cases} \quad (10)$$

In the following, the procedure illustrated in FIG. 17 will be described along with step numbers.

(S41) The air volume calculation unit 130 substitutes one into the ratios $X_a$, $X_b$ and $X_c$.

(S42) The air volume calculation unit 130 calculates $X_{aa1}$, $X_{bb1}$ and $X_{cc1}$.

(S43) The air volume calculation unit 130 substitutes the ratio $X_a$ into a variable $X_{ao}$. The air volume calculation unit 130 substitutes the ratio $X_b$ into the variable $X_{bo}$. The air volume calculation unit 130 substitutes the ratio $X_c$ into a variable $X_{co}$.

(S44) The air volume calculation unit 130 substitutes the calculation result of $(X_{aa1}-X_{aa1}*0.01)/a_1$ into the ratio $X_a$. In addition, the air volume calculation unit 130 substitutes the calculation result of $(X_{bb1}-X_{bb1}*0.01)/b_1$ into the ratio $X_b$. The air volume calculation unit 130 substitutes the calculation result of $(X_{cc1}-X_{cc1}*0.01)/c_1$ into the ratio $X_c$.

(S45) The air volume calculation unit 130 determines whether or not the first inequality holds for the updated ratios $X_a$, $X_b$ and $X_c$. When the first inequality holds, the process flow proceeds to step S46. When the first inequality does not hold, the process flow proceeds to step S50.

(S46) The air volume calculation unit 130 calculates $X_{aa2}$, $X_{bb2}$ and $X_{cc2}$.

(S47) The air volume calculation unit 130 substitutes the ratio $X_a$ into $X_{ao}$. The air volume calculation unit 130 substitutes the ratio $X_b$ into the variable $X_{bo}$. The air volume calculation unit 130 substitutes the ratio $X_c$ into the variable $X_{co}$.

(S48) The air volume calculation unit 130 substitutes the calculation result of $(X_{aa2}-X_{aa2}*0.01)/a_2$ into the ratio $X_a$. The air volume calculation unit 130 substitutes the calculation result of $(X_{bb2}-X_{bb2}*0.01)/b_2$ into the ratio $X_b$. The air volume calculation unit 130 substitutes the calculation result of $(X_{cc2}-X_{cc2}*0.01)/c_2$ into the ratio $X_c$.

(S49) The air volume calculation unit 130 determines whether or not the second inequality holds for the updated ratios $X_a$, $X_b$ and $X_c$. When the second inequality holds, the process flow proceeds to step S42. When the second inequality does not hold, the process flow proceeds to step S50.

(S50) The air volume calculation unit 130 substitutes the variable $X_{ao}$ into the ratio $X_a$. The air volume calculation unit 130 substitutes the variable $X_{bo}$ into the ratio $X_b$. The air volume calculation unit 130 substitutes the variable $X_{co}$ into the ratio $X_c$.

When the number of fans is larger than the number of heating elements, as thus described, the ratios $X_a$, $X_b$ and $X_c$ may be calculated by identifying an air volume ratio immediately before any of the simultaneous inequalities does not hold, while gradually reducing the air volume ratio of each fan from one.

Fifth Embodiment

Next, a fifth embodiment will be described. Matters which are different from the aforementioned second to fourth embodiments will be mainly described, with description of common matters being omitted.

In the third and the fourth embodiments, air volume calculation methods have been illustrated for a case where the number of heating elements is different from the number of fans. In contrast to the methods, the calculation of simultaneous inequalities may be turned into a calculation of simultaneous equations by grouping fans or heating elements and regarding a single group as a single fan or a single heating element. Calculation of simultaneous equations facilitates calculation of air volumes. In the fifth embodiment, therefore, a function of calculating the air volume of each fan by grouping heating elements is provided for a case where the number of fans is smaller than the number of heating elements. A case where the number of fans is larger than the number of heating elements will be described in a sixth embodiment described below.

Here, a verification apparatus of the fifth embodiment is similar to the verification apparatus 100 of the second embodiment. Hardware and function blocks of the verification apparatus of the fifth embodiment are similar to the hardware and function blocks of the verification apparatus 100 described in FIGS. 2 and 3. In the fifth embodiment, therefore, the same names and symbols as those in the second embodiment will be used.

First, an example of grouping heating elements based on the cooling contribution of one of the fans to each heating element will be described. Here, the cooling contribution may be regarded as reflecting, focusing on a fan, the relative positional relation between the fan and the heating element (susceptible to the wind from the fan), as indicated by the calculation method described below. In other words, it is conceivable that, when there exists a plurality of heating elements with similar relative positional relations to the fan of interest, the cooling contributions of fans to these heating elements are also similar. Grouping of the heating elements is performed using the above characteristics.

Figure 18:
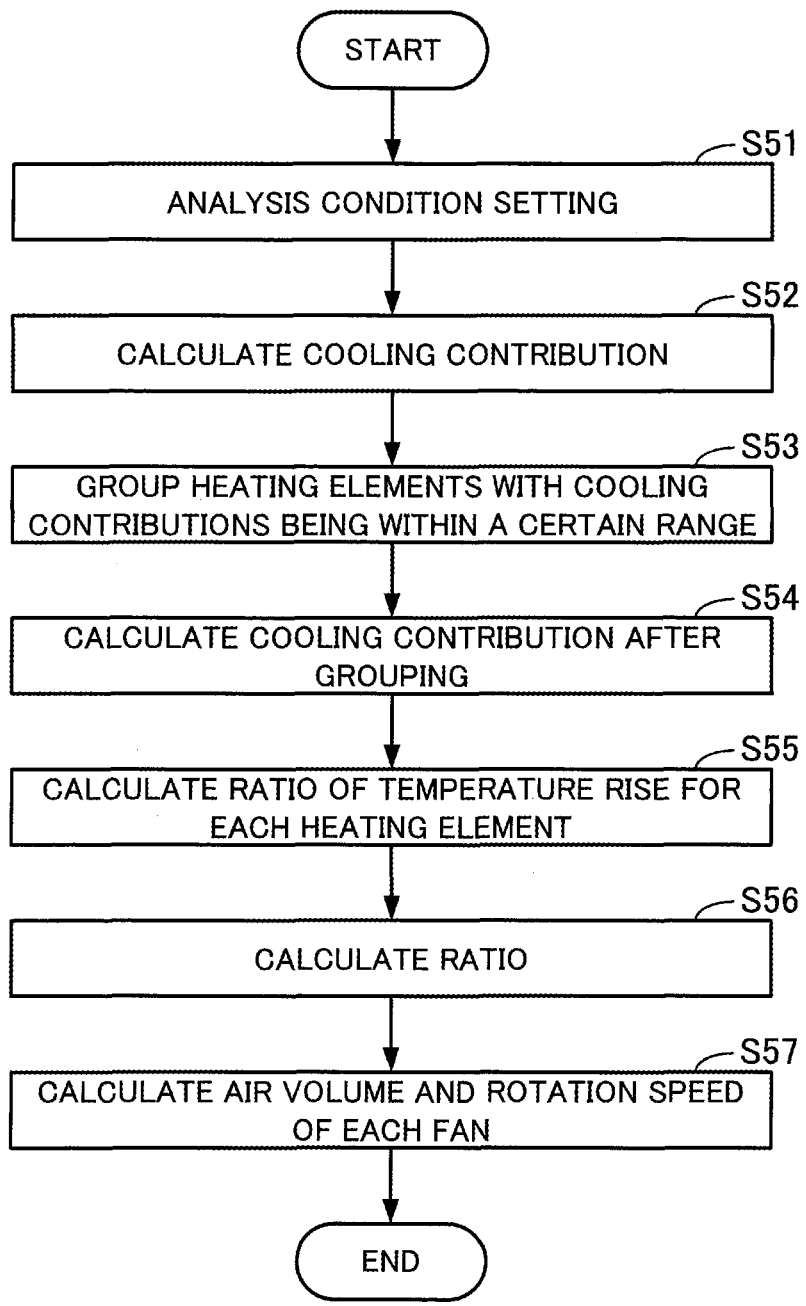
FIG. 18 is a flowchart illustrating an exemplary analysis processing (part 1) of a fifth embodiment.

FIG. 18 is a flowchart illustrating an exemplary analysis processing of the fifth embodiment (part 1). In the following, the procedure illustrated in FIG. 18 will be described along with step numbers.

(S51) The cooling contribution calculation unit 120 performs initial setting for a CFD-based simulation, referring to the definition information 111 stored in the storage unit 110. Here, it is assumed in the analysis object model defined by the definition information 111 that the number of fans is smaller than the number of heating elements.

(S52) The cooling contribution calculation unit 120 performs a CFD-based simulation on the analysis object model and, using the result, calculates the cooling contribution of each fan to each heating element. The cooling contribution calculation unit 120 registers the calculated cooling contribution in the cooling contribution table 112. The cooling contribution calculation unit 120 obtains, as the result of the simulation, the temperature of each heating element in the steady state when each fan is operated according to the content of the definition information 111.

(S53) The air volume calculation unit 130 selects one of the fans, and groups the heating elements with the cooling contributions of the fan generally coinciding (e.g., coinciding in a range of ±5% from an arbitrary median). The air volume calculation unit 130 may select any of the fans. Here, the air volume calculation unit 130 creates a group so that the sum of the number of heating elements which are not grouped and the number of groups coincides with the number of fans. When the sum of the number of groups and the number of heating elements which are not grouped is still larger than the number of fans after the grouping, the range of ±5% may be extended (e.g., changed to a range of ±7%). Alternatively, the air volume calculation unit 130 may adjust the number of heating elements which are not grouped by eliminating, from a group of heating elements, those with the cooling contributions of the selected fan exhibiting a low degree of coincidence (e.g., heating elements with a significant deviation from the average cooling contribution to the heating elements belonging to the group).

(S54) The cooling contribution calculation unit 120 updates the analysis object model, regarding a single group of heating elements as a single heating element. On this occasion, it is conceivable to set the permissive temperature of the heating element obtained by the grouping to be the lowest permissive temperature of those of the heating elements belonging to the group. In addition, for example, the heating elements regarded as a single entity due to grouping may be defined as a polyhedron (polygon in two dimensions) surrounding each of the heating elements belonging to the group. The cooling contribution calculation unit 120 performs a CFD-based simulation on the updated analysis object model and, using the result, calculates the cooling contribution of each fan to each heating element. The cooling contribution calculation unit 120 registers the calculated cooling contribution in the cooling contribution table 112. The cooling contribution calculation unit 120 obtains the temperature of each heating element in the steady state for the updated analysis object model, as the result of the simulation.

(S55) The air volume calculation unit 130 calculates the amount of temperature rise for each heating element using the result of step S54, and calculates the temperature rise ratio for each heating element.

(S56) The air volume calculation unit 130 calculates the air volume ratio of each fan using the temperature rise ratio calculated at step S55. The calculation method is similar to step S14 of FIG. 12. In this case, since the heating elements are grouped so that the number of heating elements coincides with the number of fans at step S53, the air volume calculation unit 130 may obtain simultaneous equations relating to the air volume ratio of each fan, similarly to step S14. The air volume calculation unit 130 may calculate the air volume ratio of each fan by solving the simultaneous equations.

(S57) The air volume calculation unit 130 calculates the air volume of each fan, based on the air volume ratio calculated at step S56, and determines the rotation speed corresponding to the air volume. Calculation of the air volume and determination of the rotation speed of each fan may be performed similarly to step S15 of FIG. 12.

Figure 19A:
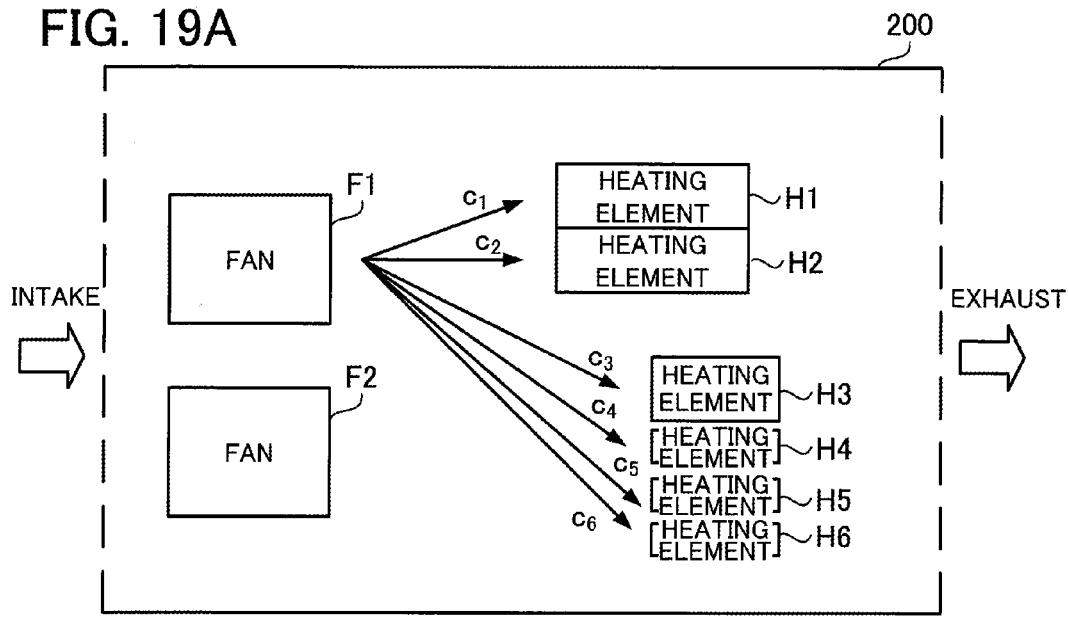
FIGS. 19A and 19B illustrate a specific example of analysis processing of the fifth embodiment (part 1)
Figure 19B:
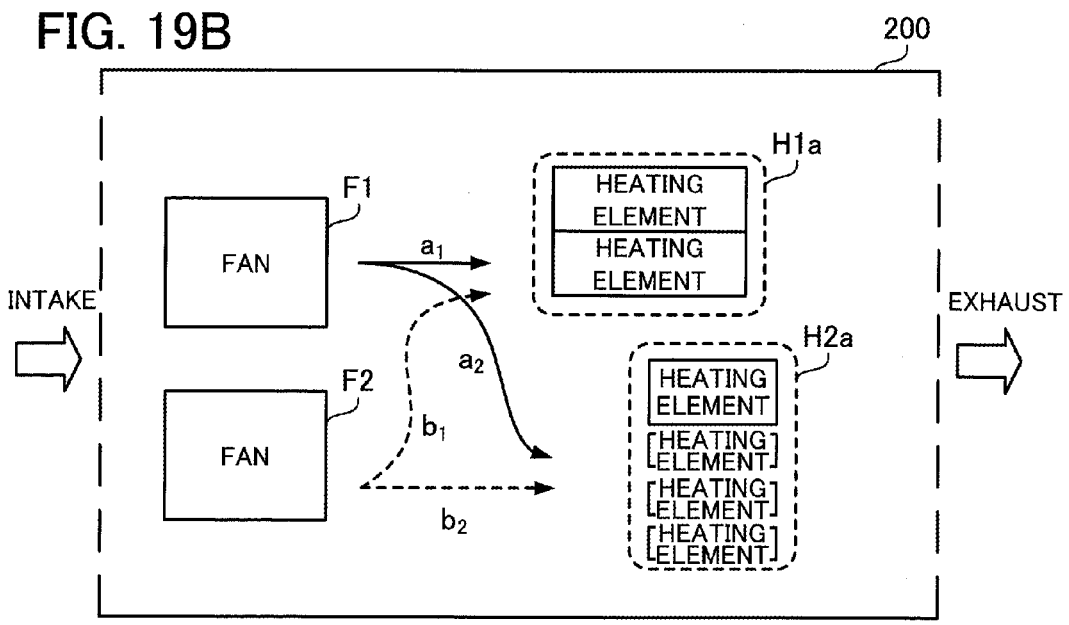

FIGS. 19A and 19B illustrate a specific example of analysis processing of the fifth embodiment (part 1). FIG. 19A illustrates an analysis object model before updating. FIG. 19B illustrates an updated analysis object model.

First, referring to FIG. 19A, the fans F1 and F2, and the heating elements H1, H2, H3, H4, H5 and H6 are placed in the housing 200, in the analysis object model before updating. In the analysis object model, the heating elements H1, H2, H3, H4, H5 and H6 are cooled, using the fans F1 and F2. In this case, the number "2" of the fans F1 and F2 is smaller than the number "6" of the heating elements H1, H2, H3, H4, H5 and H6.

The cooling contribution calculation unit 120 calculates the cooling contributions of the fans F1 and F2 to each heating element for the analysis object model before updating. For example, the cooling contribution of the fan F1 to each heating element is as follows: the cooling contribution $c_1$ to the heating element H1 is such that $c_1=71\%$, the cooling contribution $c_2$ to the heating element H2 is such that $c_2=69\%$, the cooling contribution $c_3$ to the heating element H3 is such that $c_3=42\%$, the cooling contribution $c_4$ to the heating element H4 is such that $c_4=38\%$, the cooling contribution $c_5$ to the heating element H5 is such that $c_6=39\%$, and the cooling contribution $c_6$ to the heating element H6 is such that $c_6=40\%$. The cooling contribution of the fan F2 to each heating element may be similarly calculated.

The air volume calculation unit 130 selects the fan F1, and groups the heating elements with the cooling contributions of the fan F1 generally coinciding (e.g., coinciding in a range of ±0.05 (cooling contribution ±5%) from a certain value).

For example, the air volume calculation unit 130 calculates the average $(71+69)/2=70\%$ (median) of the cooling contributions $c_1$ and $c_2$ of the fan F1 to the heating elements H1 and H2, the values of $c_1$ and $c_2$ being relatively close to each other in comparison with cooling contributions to other heating elements. The cooling contribution $c_1=71\%$ is included in the range of average values 70%±5%. In addition, the cooling contribution $c_2=69\%$ is also included in the range of the average value 70%±5%. Therefore, the air volume calculation unit 130 groups the heating elements H1 and H2. The grouped heating elements are referred to as a heating element H1a. For example, the region of the heating element H1a is equivalent to the regions of the heating elements H1 and H2 combined. In the example of FIGS. 19A and 19B, the continuous region occupied by the heating elements H1 and H2 is the region occupied by the heating element H1a.

Similarly, the air volume calculation unit 130 calculates the average $(42+38+39+40)/4=39.75\%\approx40\%$ (median) of the cooling contributions $c_3$, $c_4$, $c_5$ and $c_6$ of the fan F1 to the heating elements H3, H4, H5 and H6, the values of $c_3$, $c_4$, $c_5$ and $c_6$ being relatively close to each other in comparison with cooling contributions to other heating elements. In this case, the cooling contributions $c_3$, $c_4$, $c_5$ and $c_6$ are included in a range of the average value 40%±5%. Therefore, the air volume calculation unit 130 groups the heating elements H3, H4, H5 and H6. The grouped heating elements are referred to as a heating element H2a. For example, the region of the heating element H2a is equivalent to the regions of the heating elements H3, H4, H5 and H6 combined. In the example of FIGS. 19A and 19B, there exists a space in the vertical direction of the page between the heating elements H3, H4, H5 and H6. The continuous region including the region of the heating elements H3, H4, H5 and H6, together with the region of each space in the vertical direction between the heating elements H3, H4, H5 and H6 may be regarded as the region of the heating element H2a.

Referring to FIG. 19B, the fans F1 and F2, and the heating elements H1a and H2a are placed in the housing 200, in the updated analysis object model. The heating element H1a is regarded as a single heating element, with the heating elements H1 and H2 being grouped therein. For example, it is conceivable to set the permissive temperature of the heating element H1a to be the lower one of the permissive temperatures of the heating elements H1 and H2. The heating element H2a is regarded as a single heating element, with the heating elements H3, H4, H5 and H6 being grouped therein. For example, it is conceivable to set the permissive temperature of the heating element H2a to be the lowest permissive temperature of the permissive temperatures of the heating elements H3, H4, H5 and H6.

In the updated analysis object model, the heating elements H1a and H2a are cooled, using the fans F1 and F2. In this case, the number "2" of the fans F1 and F2 coincides with the number "2" of the heating elements H1a and H2a. The cooling contribution calculation unit 120 calculates, for the fan F1, the cooling contribution $a_1$ to the heating element H1a and the cooling contribution $a_2$ to the heating element H2a. Similarly, the cooling contribution calculation unit 120 calculates, for the fan F2, the cooling contribution $b_1$ to the heating element H1a and the cooling contribution $b_2$ to the heating element H2a. The air volume calculation unit 130 may determine similar simultaneous inequalities to the simultaneous equations (6) using the aforementioned cooling contributions, and may obtain simultaneous equations in which the inequality signs of the simultaneous inequalities are replaced by equality signs.

As thus described, when the number of heating elements is larger than the number of fans, it is possible to make the number of heating elements coincide with the number of fans by grouping the heating elements with the values of cooling contribution being close to each other. It is then possible to calculate a new air volume by determining simultaneous equations similarly to the second embodiment and solving the simultaneous equations.

Next, an example of grouping heating elements based on a distance between each heating elements will be described. Specifically, heating elements having similar distances therebetween are grouped.

Figure 20:
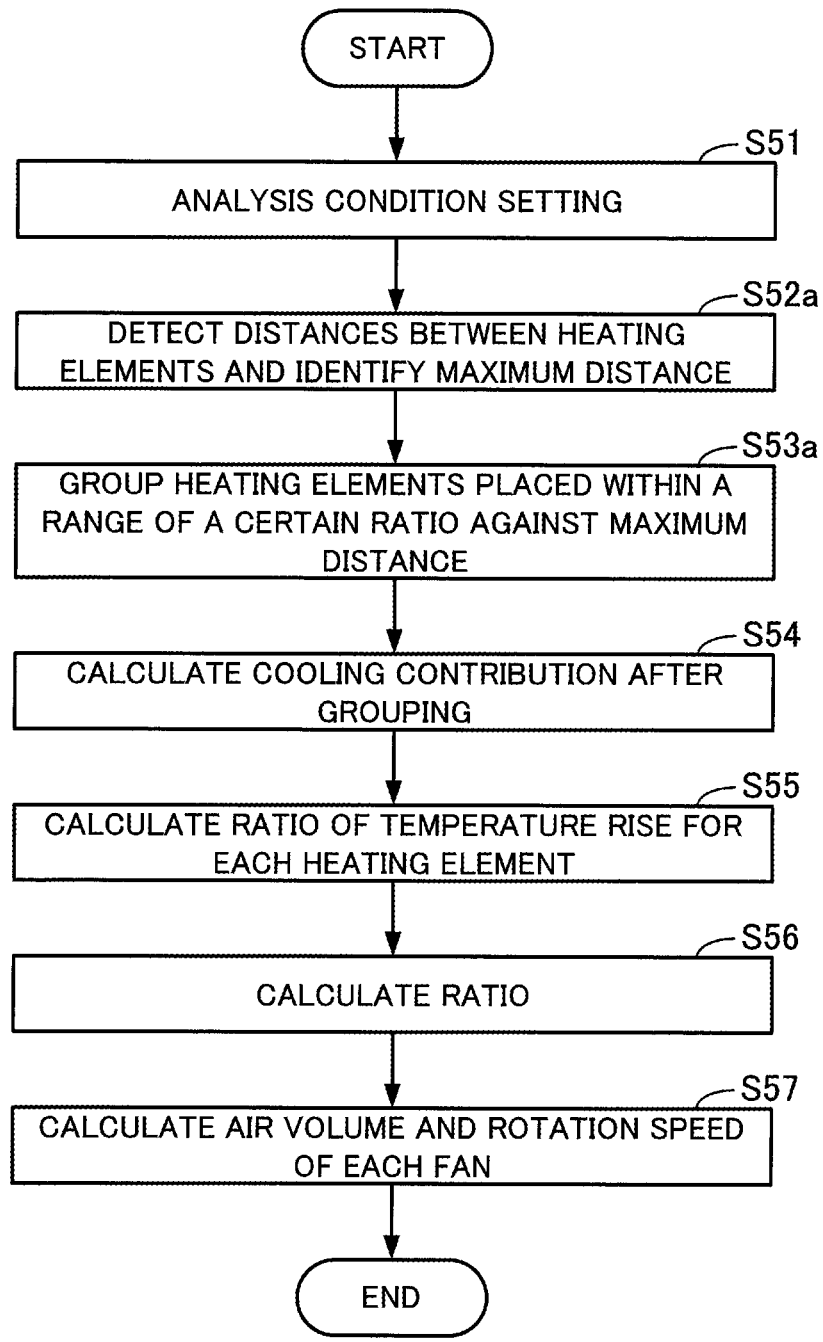
FIG. 20 is a flowchart illustrating an exemplary analysis processing (part 2) of the fifth embodiment.

FIG. 20 is a flowchart illustrating an exemplary analysis processing of the fifth embodiment (part 2). The procedure illustrated in FIG. 20 will be described along with step numbers. In the following procedure, steps S52a and S53a are performed instead of steps S52 and S53 of FIG. 18. Therefore, only the steps which are different from those in FIG. 18 are described, omitting description of other steps.

(S52a) The air volume calculation unit 130 selects one of the heating elements and calculates the distance between the heating element and other heating elements. The air volume calculation unit 130 identifies the maximum distance among the calculated distances. For example, according to the definition information 111, the placement of each component is given as coordinates (coordinates of a point corresponding to the center point of the components in the space within the housing 200, or coordinates of a point corresponding to the center point of the bottom surface (surface contacting the installation surface of the component) of a component on the surface where the component is installed in the housing 200). The air volume calculation unit 130 may calculate the distance between heating elements (e.g., distance between center points of heating elements) using the coordinates.

(S53a) The air volume calculation unit 130 groups heating elements placed within a range of a predetermined ratio against the maximum distance, with the heating element selected at step S52a being the reference. The range of a predetermined ratio is, for example, 0 to 20% against the maximum distance. When the sum of the number of groups and the number of heating elements which are not grouped is larger than the number of fans even after the grouping, steps S52a and S53a are performed again on the heating elements which are not grouped. In addition, when the sum of the number of groups and the number of heating elements which are not grouped is smaller than the number of fans, the air volume calculation unit 130 may adjust the number of heating elements which are not grouped by eliminating, from a group of heating elements, those placed further away from the reference heating element.

Figure 21A:
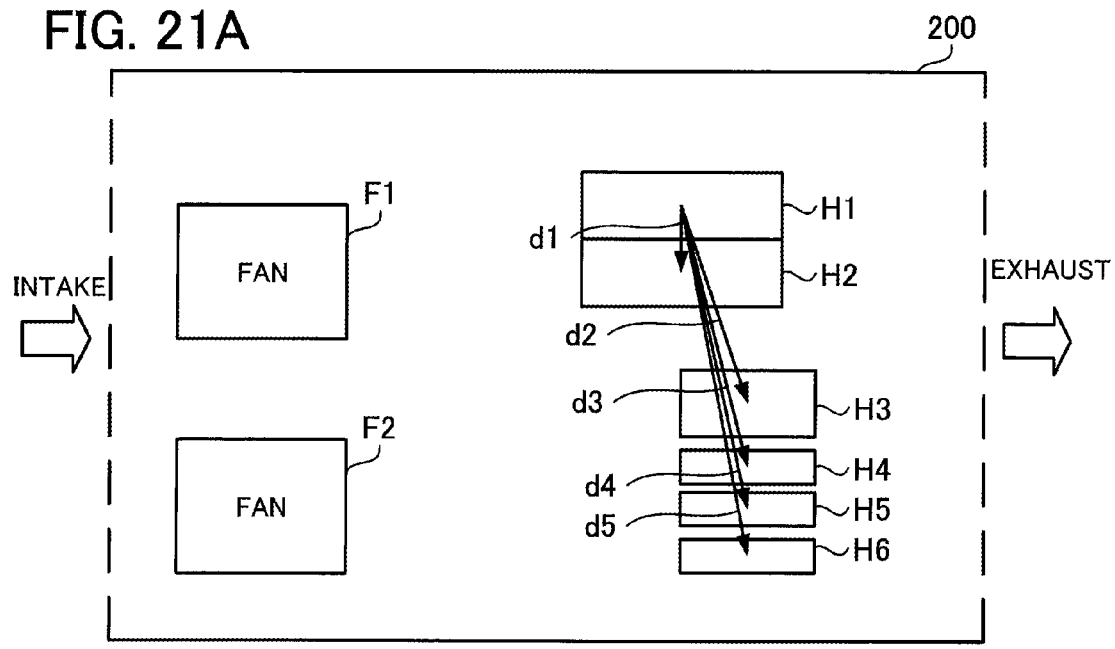
FIGS. 21A and 21B illustrate a specific example of analysis processing (part 2) of the fifth embodiment.
Figure 21B:
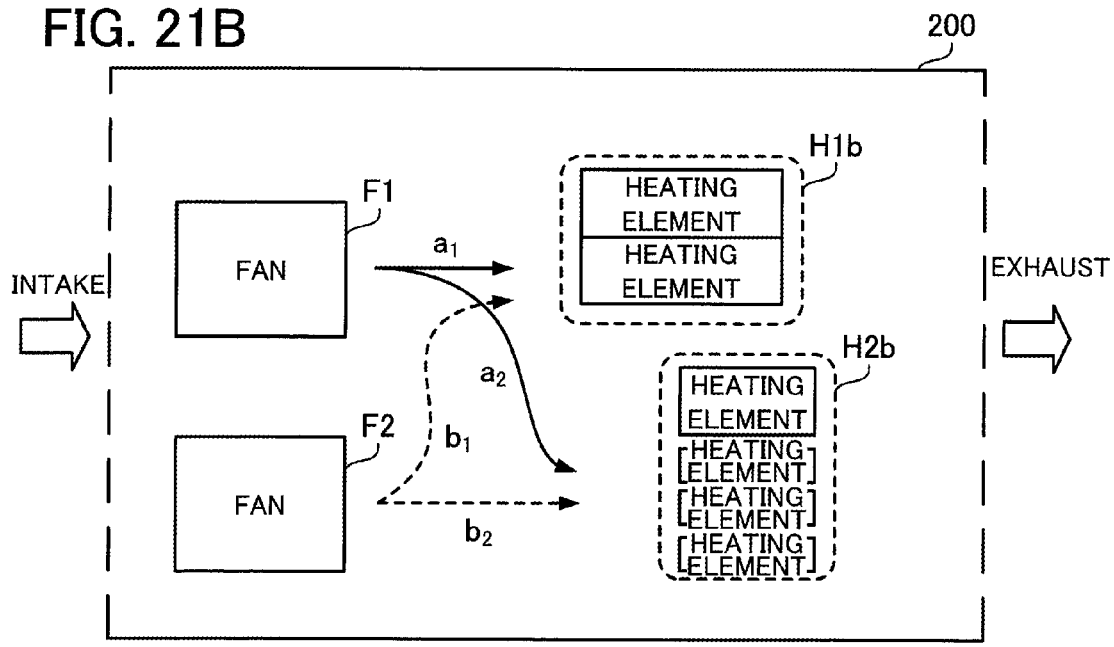

FIGS. 21A and 21B illustrate a specific example of analysis processing of the fifth embodiment (part 2). FIG. 21A illustrates an analysis object model before updating. FIG. 21B illustrates an updated analysis object model.

Referring to FIG. 21A, the fans F1 and F2, and the heating elements H1, H2, H3, H4, H5 and H6 are placed in the housing 200, in the analysis object model before updating. In the analysis object model, the heating elements H1, H2, H3, H4, H5 and H6 are being cooled, using the fans F1 and F2. In this case, the number "2" of the fans F1 and F2 is smaller than the number "6" of the heating elements H1, H2, H3, H4, H5 and H6.

The air volume calculation unit 130 selects the heating element H1 as a reference heating element. The air volume calculation unit 130 calculates the following distances between the heating element H1 and other heating elements. The distance d1 between the heating elements H1 and H2 is given by d1=50 mm. The distance d2 between the heating elements H1 and H3 is given by d2=250 mm. The distance d3 between the heating elements H1 and H4 is given by d3=260 mm. The distance d4 between the heating elements H1 and H5 is given by d4=270 mm. The distance d5 between the heating elements H1 and H6 is given by d5=280 mm.

The air volume calculation unit 130 identifies the maximum distance d5 among the calculated distances. The air volume calculation unit 130 groups the heating elements separated from the heating element H1 within a range of a certain ratio (20%, for example) against the maximum distance d5.

Specifically, the calculation by the air volume calculation unit 130 results in 56 mm, which is 20% of the maximum distance d5 (280*0.2). The air volume calculation unit 130 then identifies the heating element H2 placed within the 56-mm distance from the heating element H1. Accordingly, the air volume calculation unit 130 groups the heating elements H1 and H2. In this case, the sum of the number of groups and the number of heating elements which are not grouped is still larger than the number of fans in spite of having performed the grouping, and therefore the air volume calculation unit 130 performs again grouping of the heating elements H3, H4, H5 and H6 which are not grouped. The air volume calculation unit 130 then groups the heating elements H3, H4, H5 and H6.

Referring to FIG. 21B, the fans F1 and F2, and the heating elements H1b and H2b are placed in the housing 200, in the updated analysis object model. The heating element H1b is regarded as a single heating element, with the heating elements H1 and H2 being grouped therein. For example, it is conceivable to set the permissive temperature of the heating element H1b to be the lowest permissive temperature among the permissive temperatures of the heating elements H1 and H2. The heating element H2b is regarded as a single heating element, with the heating elements H3, H4, H5 and H6 grouped therein. For example, it is conceivable to set the permissive temperature of the heating element H2b to be the lowest permissive temperature among the permissive temperatures of the heating elements H3, H4, H5 and H6. The method of grouping may use a similar method to that illustrated in FIGS. 19A and 19B.

In the updated analysis object model, the heating elements H1b and H2b are cooled, using the fans F1 and F2. In this case, the number "2" of the fans F1 and F2 coincides with the number "2" of the heating elements H1b and H2b. The cooling contribution calculation unit 120 calculates, for the fan F1, the cooling contribution $a_1$ to the heating element H1b and the cooling contribution $a_2$ to the heating element H2b. Similarly, the cooling contribution calculation unit 120 calculates, for the fan F2, the cooling contribution $b_1$ to the heating element H1b and the cooling contribution $b_2$ to the heating element H2b. The air volume calculation unit 130 may determine similar simultaneous inequalities to the simultaneous equations (6) using the aforementioned cooling contributions, and may obtain simultaneous equations in which the inequality signs of the simultaneous inequalities are replaced by equality signs.

As thus described, when the number of heating elements is larger than the number of fans, it is possible to make the number of heating elements coincide with the number of fans by grouping heating elements with distances therebetween being similar to each other. It is then possible to calculate a new air volume by determining simultaneous equations similarly to the second embodiment and solving the simultaneous equations.

Sixth Embodiment

Next, a sixth embodiment will be described. Matters which are different from the aforementioned second to fifth embodiments will be mainly described, with description of common matters being omitted.

In the sixth embodiment, a function is provided to group the fans and calculate the air volume of each fan when the number of fans is larger than the number of heating elements, following the fifth embodiment.

Here, a verification apparatus of a sixth embodiment is similar to the verification apparatus 100 of the second embodiment. Hardware and function blocks of the verification apparatus of the sixth embodiment are similar to the hardware and function blocks of the verification apparatus 100 described in FIGS. 2 and 3. Therefore, the sixth embodiment also uses the same names and symbols as those in the second embodiment.

First, an example of grouping fans based on the cooling contribution of each fan to each heating element will be described. Here, the cooling contribution may be regarded as reflecting, focusing on a heating element, the relative positional relation between the heating element and the fan, as indicated by the calculation method described below. In other words, it is conceivable that, when there exists a plurality of fans with similar relative positional relations to the heating element of interest, the cooling contributions of fans to the heating element of interest are also similar. Grouping of respective fans is performed using the above characteristics.

Figure 22:
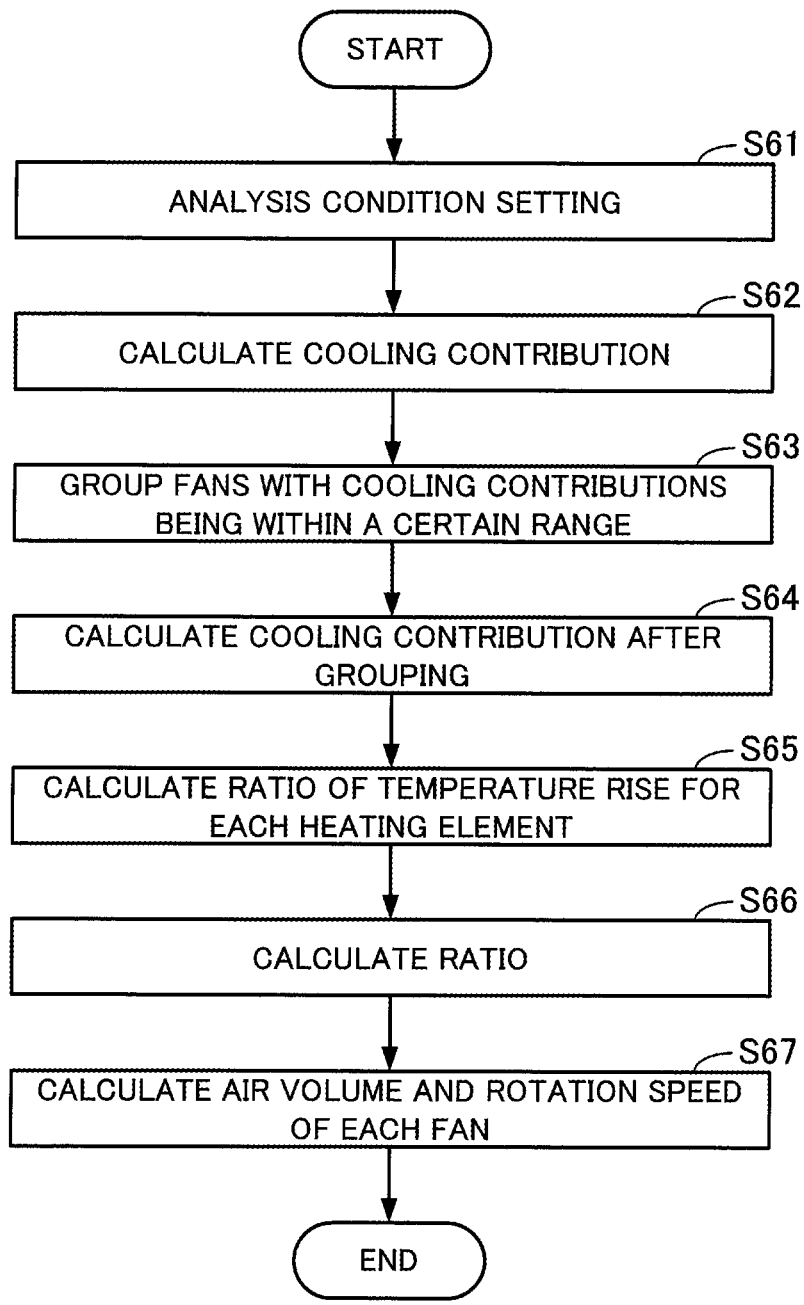
FIG. 22 is a flowchart illustrating an exemplary analysis processing (part 1) of a sixth embodiment.

FIG. 22 is a flowchart illustrating an exemplary analysis processing of the sixth embodiment (part 1). The procedure illustrated in FIG. 22 will be described along with step numbers.

(S61) The cooling contribution calculation unit 120 performs initial setting for a CFD-based simulation, referring to the definition information 111 stored in the storage unit 110. Here, it is assumed in the analysis object model defined by the definition information 111 that the number of fans is larger than the number of heating elements.

(S62) The cooling contribution calculation unit 120 performs a CFD-based simulation on the verification model and, using the result, calculates the cooling contribution of each fan to each heating element. The cooling contribution calculation unit 120 registers the calculated cooling contribution in the cooling contribution table 112. The cooling contribution calculation unit 120 obtains temperature of each heating element in the steady state when each fan is operated according to the content of the definition information 111, as the result of the simulation.

(S63) The air volume calculation unit 130 selects one of the heating elements, and groups the fans whose cooling contributions to the heating element generally coincide (e.g., coincide in a range of ±5% from an arbitrary median). The air volume calculation unit 130 may select any of the heating elements. Here, the air volume calculation unit 130 creates a group so that the sum of the number of heating elements which are not grouped and the number of groups coincides with the number of fans. When the sum of the number of groups and the number of fans which are not grouped is larger than the number of heating elements after the grouping, the range of ±5% may be extended (e.g., changed to a range of ±7%). Alternatively, the air volume calculation unit 130 may adjust the number of fans which are not grouped by eliminating, from a group of fans, those whose cooling contributions to the selected heating element exhibit a low degree of coincidence (e.g., fans with a significant deviation from the average cooling contributions to the heating element by the fans belonging to the group).

(S64) The cooling contribution calculation unit 120 updates the analysis object model, regarding a single group of fans as a single fan. On this occasion, it is conceivable to regard the air volume of the fan obtained by the grouping as the total sum of the air volumes of the fans belonging to the group. In addition, for example, the fans regarded as a single entity due to grouping may be defined as one polyhedron (polygon in two dimensions) surrounding each of the fans belonging to the group. The cooling contribution calculation unit 120 performs a CFD-based simulation on the updated analysis object model and, using the result, calculates the cooling contribution of each fan to each heating element. The cooling contribution calculation unit 120 registers the calculated cooling contribution in the cooling contribution table 112. The cooling contribution calculation unit 120 obtains temperature of each heating element in the steady state for the updated analysis object model, as the result of the simulation.

(S65) The air volume calculation unit 130 calculates the amount of temperature rise for each heating element using the result of step S64, and calculates the temperature rise ratio for each heating element.

(S66) The air volume calculation unit 130 calculates the air volume ratio of each fan using the temperature rise ratio calculated at step S65. The calculation method is similar to step S14 of FIG. 12. In this case, since the heating elements are grouped so that the number of heating elements coincides with the number of fans at step S63, the air volume calculation unit 130 may obtain simultaneous equations relating to the air volume ratio of each fan, similarly to step S14. The air volume calculation unit 130 may calculate the air volume ratio of each fan by solving the simultaneous equations.

(S67) The air volume calculation unit 130 calculates the air volume of each fan, based on the air volume ratio calculated at step S66. Here, the air volume calculation unit 130 calculates the air volume of the fans being regarded as a single fan due to grouping. Therefore, it is conceivable that the air volume calculation unit 130 obtains the air volume of each fan belonging to the group by dividing the calculated air volume equally by the fans belonging to the group. Calculation of air volumes of fans being regarded as single fan due to grouping and the fans which are not grouped may be performed similarly to step S15 of FIG. 12. The air volume calculation unit 130 determines the rotation speed corresponding to the air volume determined for each fan. Determination of the rotation speed of each fan may also be performed similarly to step S15 of FIG. 12.

Figure 23A:
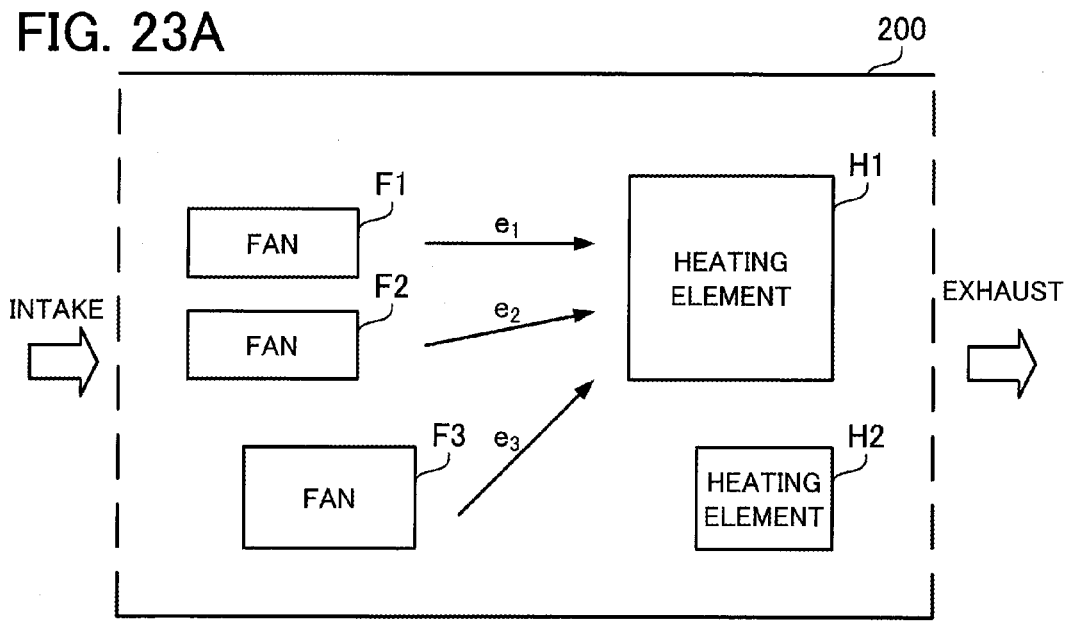
FIGS. 23A and 23B illustrate a specific example of analysis processing (part 1) of the sixth embodiment.
Figure 23B:
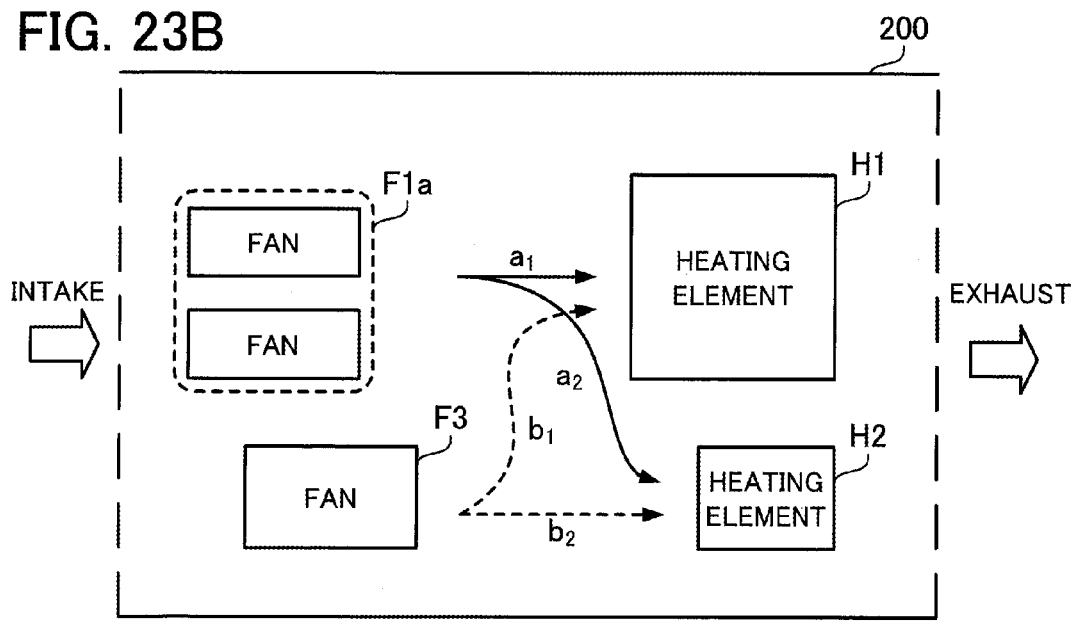

FIGS. 23A and 23B illustrate a specific example of analysis processing of the sixth embodiment (part 1). FIG.

23A illustrates an analysis object model before updating. FIG. 23B illustrates an updated analysis object model.

First, referring to FIG. 23A, the fans F1, F2 and F3, and the heating elements H1 and H2 are placed in the housing 200, in the analysis object model before updating. In the analysis object model, the heating elements H1 and H2 are cooled, using the fans F1, F2 and F3. In this case, the number "3" of the fans F1, F2 and F3 is larger than the number "2" of the heating elements H1 and H2.

The cooling contribution calculation unit 120 calculates, for the analysis object model before updating, the cooling contributions of the fans F1, F2 and F3 to the heating elements H1 and H2. For example, the cooling contributions of the fans F1, F2 and F3 to the heating element H1 are as follows: the cooling contribution $e_1$ of the fan F1 is given by $e_1$=90%, the cooling contribution $e_2$ of the fan F2 is given by $e_2$=80%, and the cooling contribution $e_3$ of the fan F3 is given by $e_3$=10%. The cooling contributions of the fans F1, F2 and F3 to the heating element H2 may be similarly calculated.

The air volume calculation unit 130 selects the heating element H1, and groups the fans whose cooling contributions to the heating element H1 generally coincide (e.g., coincide in a range of ±0.05 (cooling contribution ±5%) from a certain value).

For example, the air volume calculation unit 130 calculates the average (90+80)/2=85% (median) of the cooling contributions $e_1$ and $e_2$ of the fans F1 and F2 to the heating element H1, the values of $e_1$ and $e_2$ being relatively close to each other in comparison with cooling contributions of other fans. The cooling contribution $e_1$=90% is included in the range of average values 85%±5%. In addition, the cooling contribution $e_2$=80% is also included in the range of average values 85%±5%. Therefore, the air volume calculation unit 130 groups the fans F1 and F2. In the example of FIGS. 23A and 23B, there exists a space between the fans F1 and F2 in the vertical direction in the page. The continuous region including the region of the fans F1 and F2 and the region of space in the vertical direction in the page existing between the fans F1 and F2 may be regarded as the region of the fans F1 and F2.

Referring to FIG. 23B, the fans F1a and F3, and the heating elements H1 and H2 are placed in the housing 200, in the updated analysis object model. The fan F1a is regarded as a single fan, with the fans F1 and F2 being grouped therein. For example, it is conceivable to set the air volume of the fan F1a to be the sum of the air volumes of fans F1 and F2. The fan F3 is a fan not grouped.

In the updated analysis object model, the heating elements H1 and H2 are cooled, using the fans F1a and F3. In this case, the number "2" of the fans F1a and F3 coincides with the number "2" of the heating elements H1 and H2. The cooling contribution calculation unit 120 calculates, for the fan F1a, the cooling contribution $a_1$ to the heating element H1 and the cooling contribution $a_2$ to the heating element H2. Similarly, the cooling contribution calculation unit 120 calculates, for the fan F3, the cooling contribution $b_1$ to the heating element H1 and the cooling contribution $b_2$ to the heating element H2. The air volume calculation unit 130 may determine similar simultaneous inequalities to the simultaneous equations (6) using the aforementioned cooling contributions, and may obtain simultaneous equations in which the inequality signs of the simultaneous inequalities are replaced by equality signs.

As thus described, when the number of fans is larger than the number of heating elements, it is possible to make the number of fans coincide with the number of heating elements by grouping the fans whose cooling contributions to the heating elements are similar. It is then possible to calculate a new air volume by determining simultaneous equations similarly to the second embodiment and solving the simultaneous equations.

Next, an example of grouping the fans based on the distance between the fans will be described. Specifically, the fans whose distance therebetween is similar are grouped.

Figure 24:
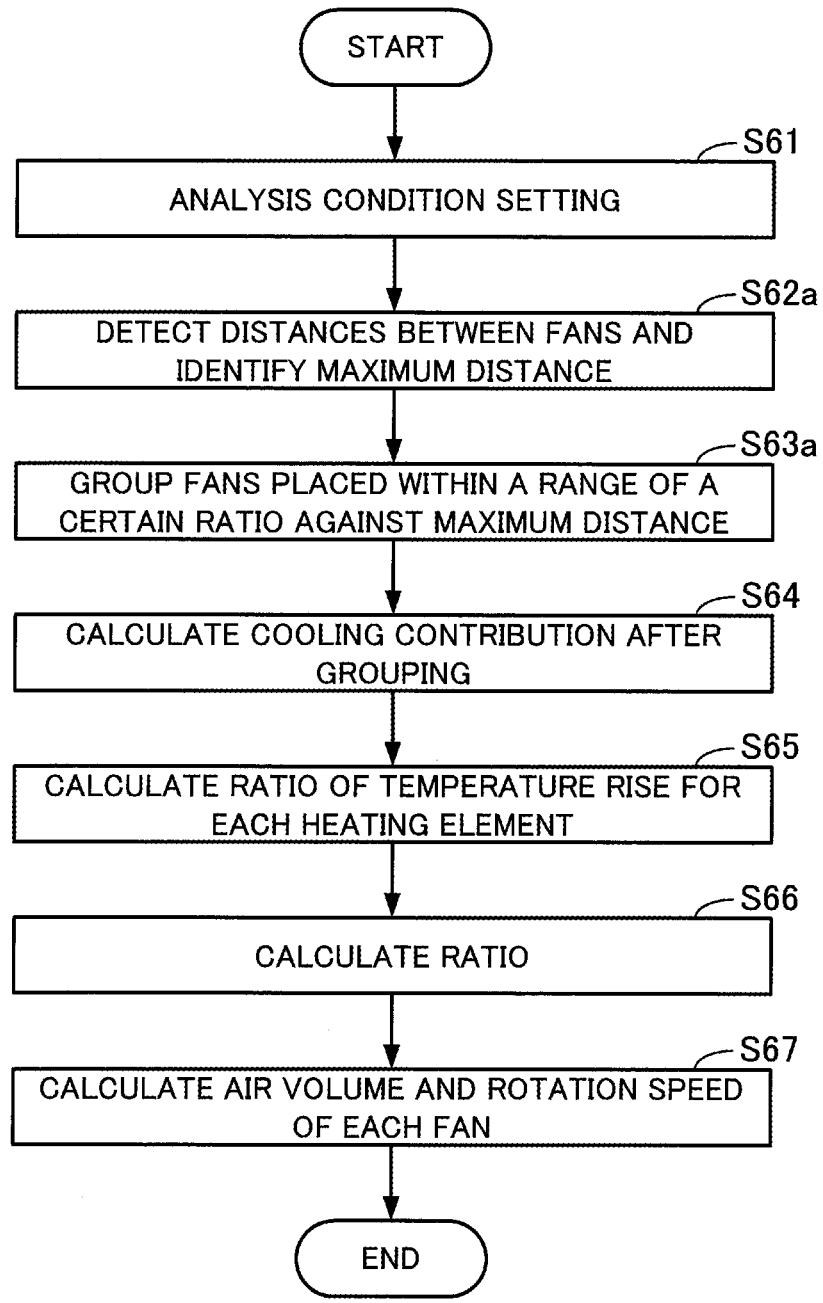
FIG. 24 is a flowchart illustrating an exemplary analysis processing (part 2) of the sixth embodiment.

FIG. 24 is a flowchart illustrating an exemplary analysis processing of the sixth embodiment (part 2). The procedure illustrated in FIG. 24 will be described along with step numbers. Here, in the following procedure, steps S62a and S63a are performed instead of steps S62 and S63 of FIG. 22. Therefore, only the steps which are different from those in FIG. 22 are described, omitting description of other steps.

(S62a) The air volume calculation unit 130 selects one of the fans and calculates the distance between the fan and other fans. The air volume calculation unit 130 identifies the maximum distance among the calculated distances. For example, according to the definition information 111, the placement of each component is given as coordinates (coordinates of a point corresponding to the center point of the components in the space within the housing 200, or coordinates of a point corresponding to the center point of the bottom surface (surface contacting the installation surface of the component) of a component on the surface where the component is installed in the housing 200). The air volume calculation unit 130 may calculate the distance between fans (e.g., distance between center points of fans) using the coordinates.

(S63a) The air volume calculation unit 130 groups fans placed within a range of a predetermined ratio against the maximum distance, with the fan selected at step S62a being the reference. The range of the predetermined ratio is, for example, 0 to 20% against the maximum distance. When the sum of the number of groups and the number of fans which are not grouped is larger than the number of heating elements after the grouping, steps S62a and S63a are performed again on the fans which are not grouped. In addition, when the sum of the number of groups and the number of fans which are not grouped is smaller than the number of heating elements, the air volume calculation unit 130 may adjust the number of fans which are not grouped by eliminating, from a group of fans, those placed further away from the reference fan.

Figure 25A:
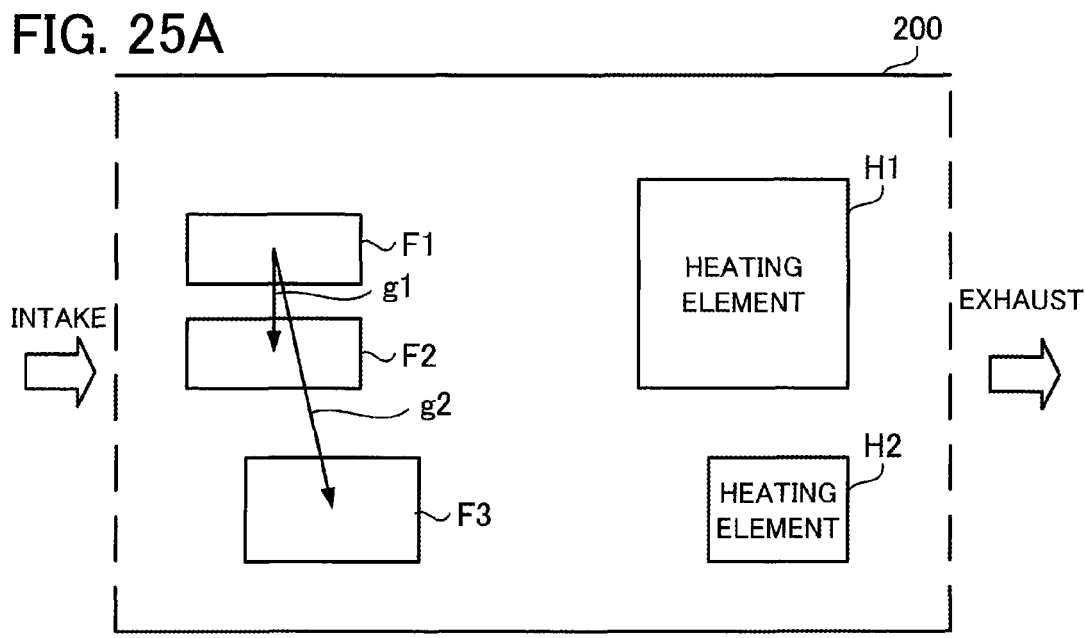
FIGS. 25A and 25B illustrate a specific example of analysis processing (part 2) of the sixth embodiment.
Figure 25B:
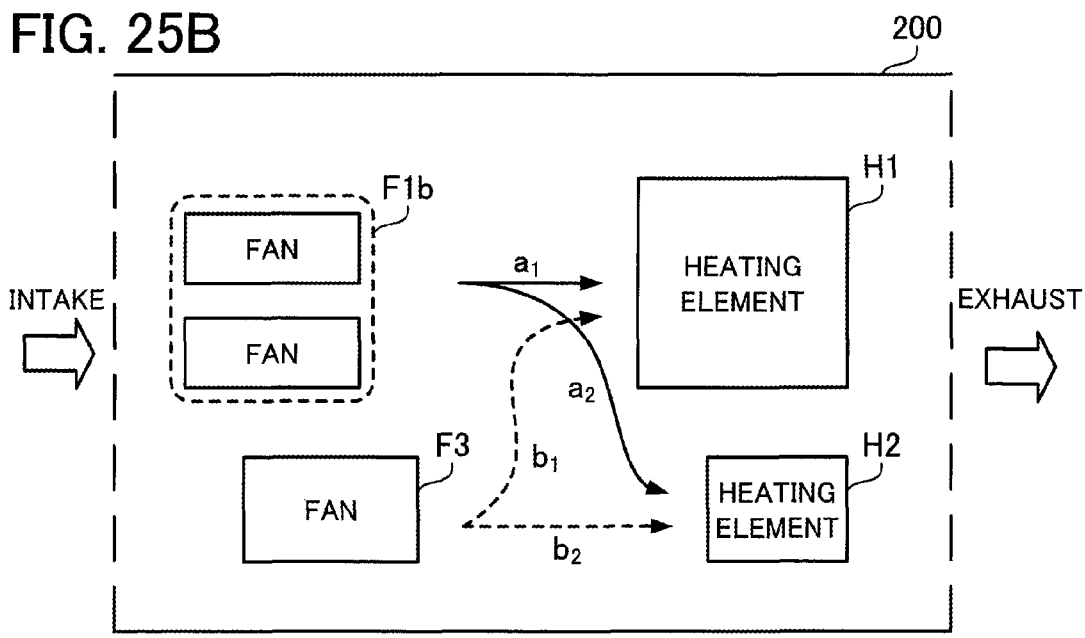

FIGS. 25A and 25B illustrate a specific example of analysis processing of the sixth embodiment (part 2). FIG. 25A illustrates an analysis object model before updating. FIG. 25B illustrates an updated analysis object model.

First, referring to FIG. 25A, the fans F1, F2 and F3, and the heating elements H1 and H2 are placed in the housing 200, in the analysis object model before updating. In the analysis object model, the heating elements H1 and H2 are cooled, using the fans F1, F2 and F3. In this case, the number "3" of the fans F1, F2 and F3 is larger than the number "2" of the heating elements H1 and H2.

The air volume calculation unit 130 selects the fan F1 as a reference fan. The air volume calculation unit 130 calculates the following distances between the fan F1 and other fans. The distance g1 between the fans F1 and F2 is given by g1=60 mm. The distance g2 between the fans F1 and F3 is given by g2=300 mm.

The air volume calculation unit 130 identifies the maximum distance g2 among the calculated distances. The air volume calculation unit 130 groups the fans separated from the fan F1 within a range of a certain ratio (20%, for an example) against the maximum distance g2.

Specifically, the calculation by the air volume calculation unit 130 results in 60 mm, which is 20% of the maximum distance g2 (300*0.2). The air volume calculation unit 130 then identifies the fan F2 placed within 60-mm distance from the fan F1. Accordingly, the air volume calculation unit 130 groups the fans F1 and F2. The method of grouping may use a similar method to that illustrated in FIGS. 23A and 23B.

Referring to FIG. 25B, the updated analysis object model is similar to that illustrated in FIG. 23B. Specifically, the fans F1$b$ and F3, and the heating elements H1 and H2 are placed in the housing 200. The fan F1$b$ is regarded as a single fan, with the fans F1 and F2 being grouped therein. For example, it is conceivable to set the initial air volume of the fan F1$b$ to be the sum of the air volumes of the fans F1 and F2. The fan F3 is a fan not grouped.

In the updated analysis object model, the heating elements H1 and H2 are cooled, using the fans F1$b$ and F3. In this case, number "2" of the fans F1$b$ and F3 coincides with the number "2" of the heating elements H1 and H2. The cooling contribution calculation unit 120 calculates, for the fan F1$b$, the cooling contribution $a_1$ to the heating element H1 and the cooling contribution $a_2$ to the heating element H2. Similarly, the cooling contribution calculation unit 120 calculates, for the fan F3, the cooling contribution $b_1$ to the heating element H1 and the cooling contribution $b_2$ to the heating element H2. The air volume calculation unit 130 may determine similar simultaneous inequalities to the simultaneous equations (6) using the aforementioned cooling contributions, and may obtain simultaneous equations in which the inequality signs of the simultaneous inequalities are replaced by equality signs.

As thus described, when the number of fans is larger than the number of heating elements, it is possible to make the number of fans coincide with the number of heating elements by grouping the fans with the distances therebetween being similar to each other. It is then possible to calculate a new air volume by determining simultaneous equations similarly to the second embodiment and solving the simultaneous equations.

(About Calculation Method of Cooling Contribution)

It is assumed in the aforementioned first to sixth embodiments that cooling contribution of each fan to each heating element is used when cooling a plurality of heating elements by a plurality of fans. In the following description, a method of calculating the cooling contribution by the cooling contribution calculation unit 120 will be specifically described.

In the following, an analysis object model including three fans and two heating elements is assumed, as an example. Specifically, the fans are the fans F1, F2 and F3, and heating elements are the heating elements H1 and H2. The definition information 111 is supposed to have the attributes of the fans and heating elements set therein.

Figure 26A:
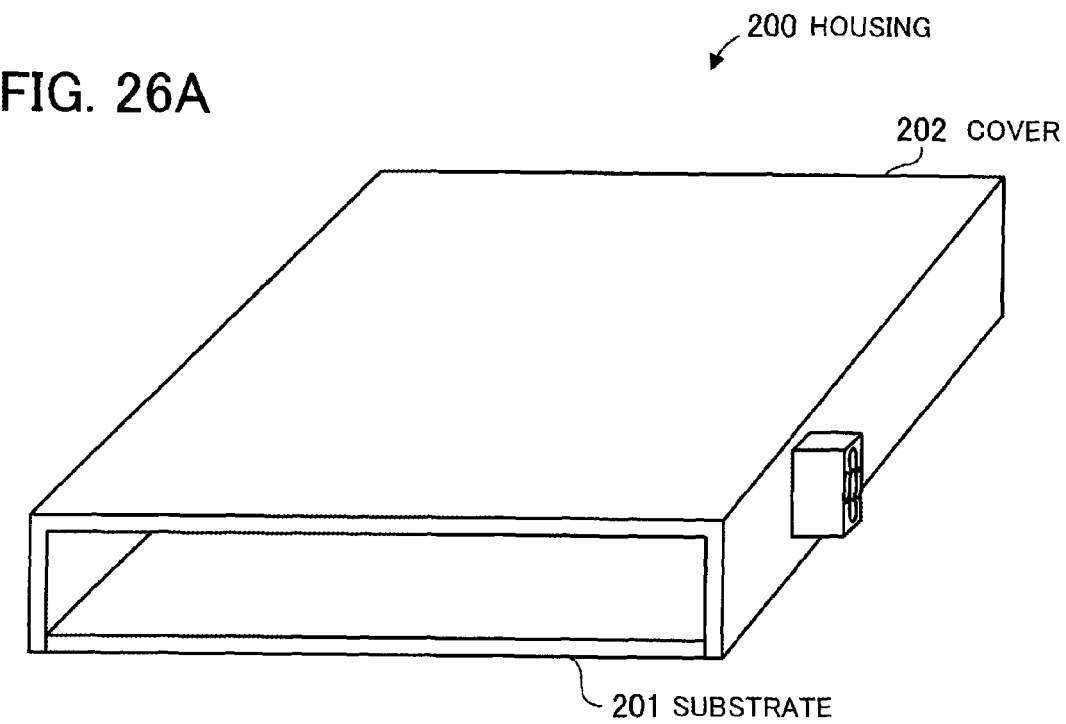
FIGS. 26A and 26B illustrate an exemplary analysis object model which is assumed in the description of calculation of the cooling contribution.
Figure 26B:
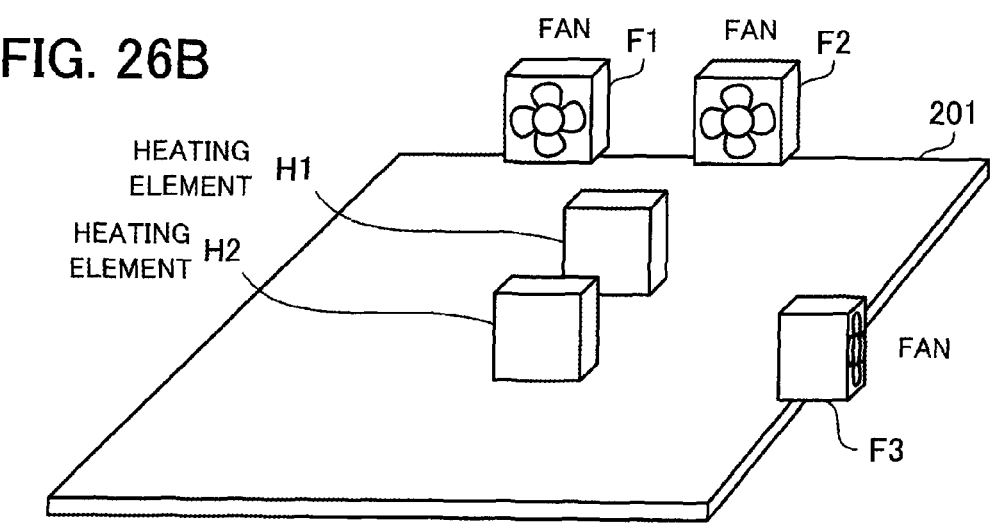

FIGS. 26A and 26B illustrate an exemplary analysis object model assumed in the description of calculation of the cooling contribution. FIG. 26A illustrates an outside appearance model of the housing 200 to be analyzed. The housing 200 has a substrate 201 and a cover 202. The substrate 201 is a member for installing components. The cover 202 covers the top of the substrate 201 with a wall surface contacting with the substrate 201 and a wall surface isolated from the substrate 201, forming a space in a region covered with the substrate 201 and the cover 202. The front side of the housing 200 is open. The back side of the housing 200 is closed. The space formed by the substrate 201 and the cover 202 may be regarded as the internal space of the housing 200. However, the internal space of the housing 200 is continuous with the external space of the housing 200 via the aperture.

FIG. 26B illustrates the cover 202 of the housing 200 in its removed state. The substrate 201 has the fans F1, F2 and F3, and the heating elements H1 and H2 installed thereon. Arrangement and air volumes of the fans F1, F2 and F3, and the heating elements H1 and H2 are defined in the definition information 111 as described above. Here, the cover 202 has bores provided at positions corresponding to the fans F1, F2 and F3, allowing the fans F1, F2 and F3 to take in air from outside the housing 200 and discharge the air into the internal space of the housing 200. In other words, the air discharged by the fans F1, F2 and F3 into the housing 200 flows inside the housing 200 toward the aperture at the front side in the direction of the page. On this occasion, the air discharged by the fans F1, F2 and F3 collects the heat released by the heating elements H1 and H2, and carries the heat away. The heating elements H1 and H2 are cooled thereby.

Figure 27:
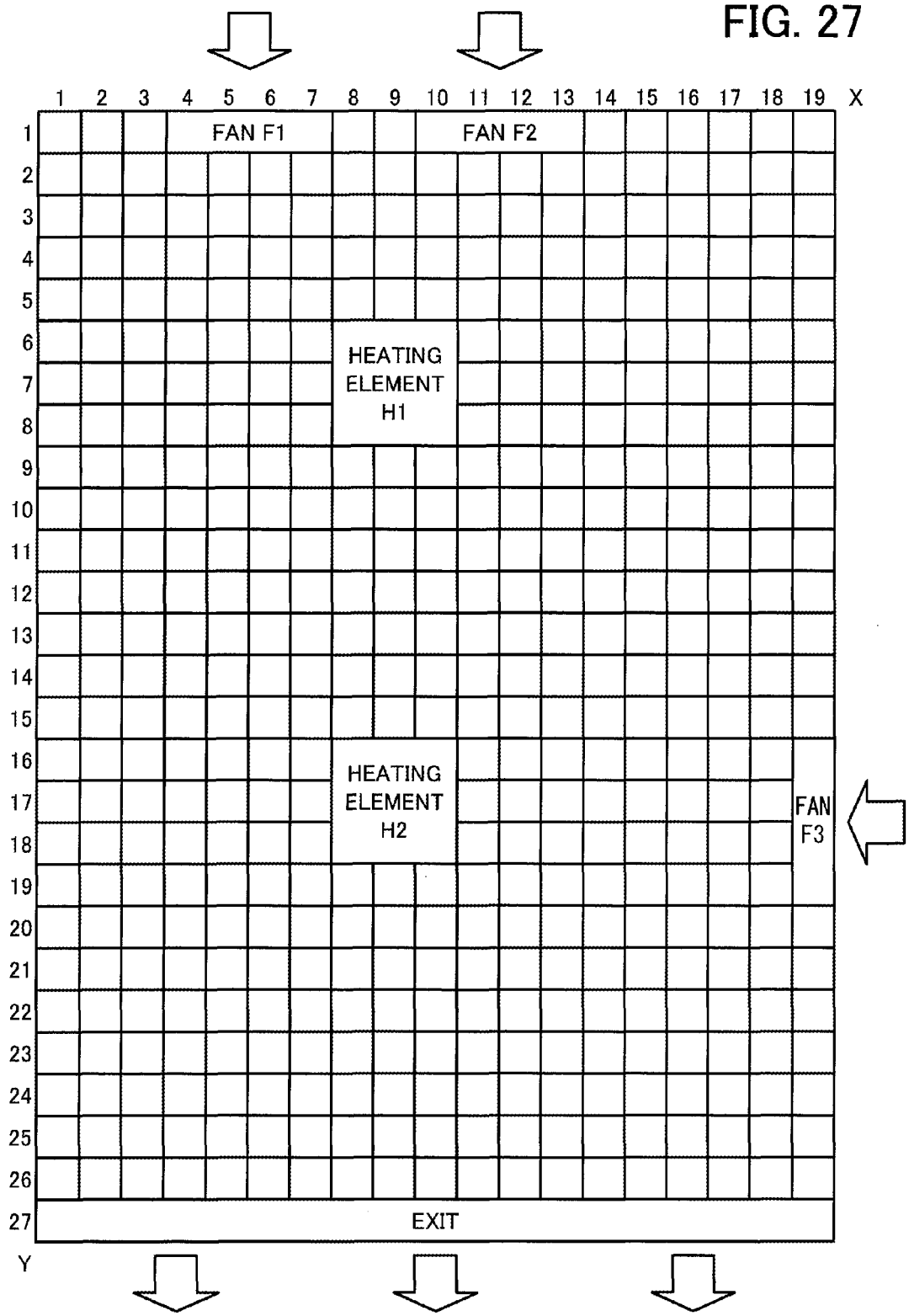
FIG. 27 illustrates an exemplary cell arrangement.

FIG. 27 illustrates an exemplary cell arrangement. A position inside the housing 200 is distinguished by units referred to as cells delimiting the top surface (surface on which fans and heating elements are installed) of the substrate 201 in a lattice-like shape. For example, the horizontal direction of the page is defined as the X-axis and the vertical direction of the page is defined as the Y-axis, with the top left of the page being the origin. Dividing the X-axis into 19 segments and the Y-axis into 26 segments allows 19*26 cell positions to be managed. Fineness of cells may be arbitrarily changed. For example, cells may be defined more finely. Cell coordinates are represented as (X, Y), (illustration of X and Y is omitted in the following description). Here, Y=27 is a cell explicitly indicating that it is the "exit" of air.

For example, a placement "P1" of the fan F1 is {(4,1), (5,1), (6,1), (7,1)}. A placement "P2" of the fan F2 is {(10,1), (11,1), (12,1), (13,1)}. A placement "P5" of the fan F3 is {(19,16), (19,17), (19,18), (19,19)}.

For example, a placement "P3" of the heating element H1 is {(8,6), (9,6), (10,6), (8,7), (9,7), (10,7), (8,8), (9,8), (10,8)}. A placement "P4" of the heating element H2 is {(8,16), (9,16), (10,16), (8,17), (9,17), (10,17), (8,18), (9,18), (10,18)}.

As described above, air flows into the housing 200 from the upper side of the fans F1 and F2 on the page and the right side of the fan F3 on the page, and flows out of the housing 200 from the "exit" side. In the following, the air resulted from mixture of air flown into the housing 200 by the fans F1, F2 and F3 may be referred to as mixed air.

Figure 28:
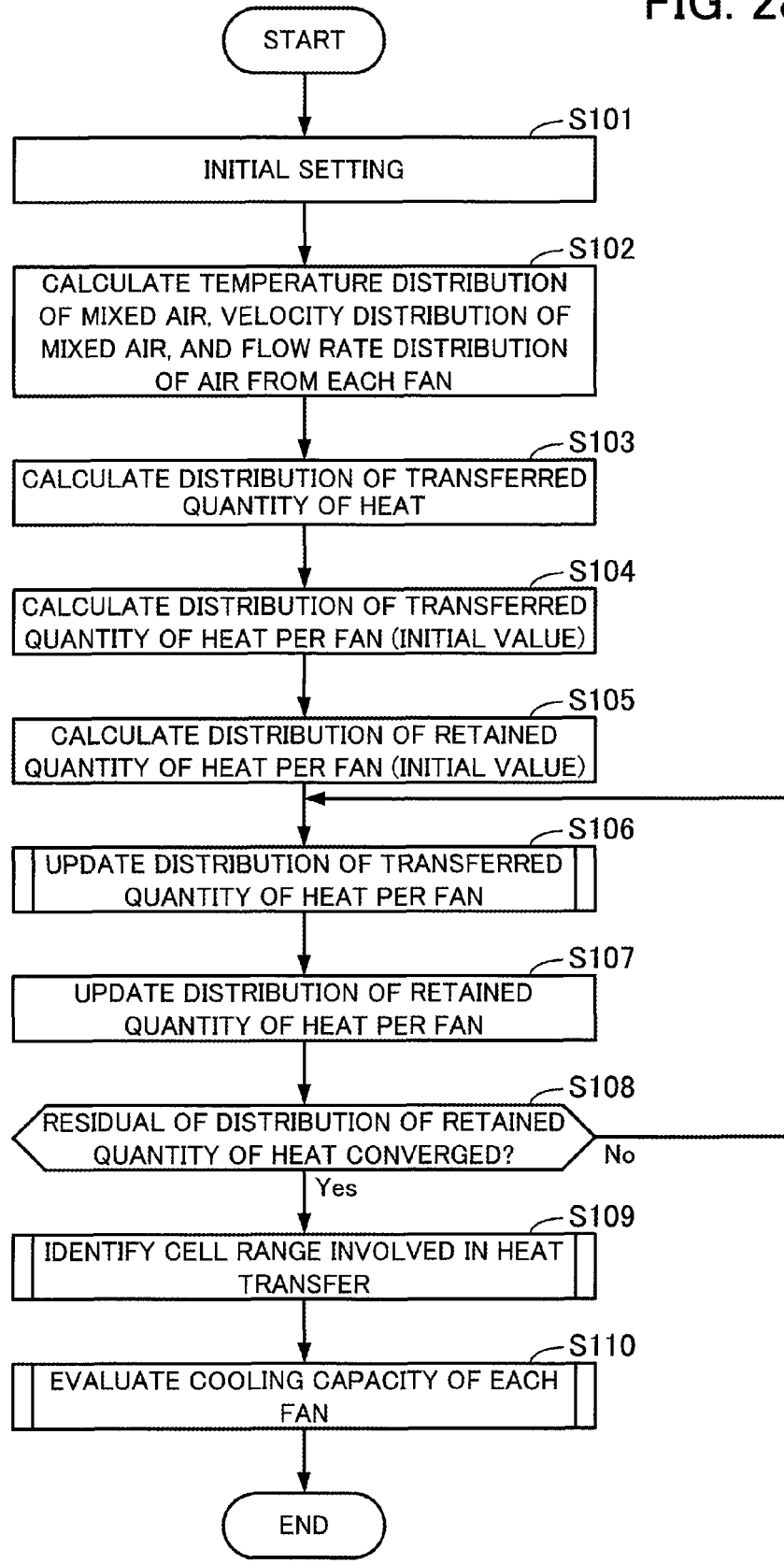
FIG. 28 is a flowchart illustrating exemplary processing of cooling evaluation.

FIG. 28 is a flowchart illustrating an exemplary processing of cooling evaluation. In the following, the procedure illustrated in FIG. 28 will be described along with step numbers.

(S101) The cooling contribution calculation unit 120 performs initial setting for thermo-fluid analysis, referring to the definition information 111 stored in the storage unit 110. Specifically, the cooling contribution calculation unit 120 reads, from the definition information 111, information about placement of the fans F1, F2 and F3, and the heating elements H1 and H2 in the housing 200, together with attribute values (including the quantity of heat generation by the heating elements H1 and H2).

(S102) The cooling contribution calculation unit 120 calculates, using the technique of CFD, the steady-state temperature distribution (T(x)) of the mixed air in the housing 200, the velocity distribution (vector V(x)) of the mixed air, and the flow rate distribution ($q_n(x)$) of air from each fan. Here, the vector x, being a variable of each distribution, is a position vector x=(x, y, z) indicating the position in the space within the housing 200 (however, distribution on the x-y plane is considered, assuming that z is constant). Here, the x-axis is an axis overlapping with the X-axis, and the y-axis is an axis overlapping with the Y-axis. The z-axis is an axis perpendicular to the x-axis and the y-axis. It is assumed that the degree of discretization (delimitation of coordinates) is the same. In addition, n indicates any of the fan F1, the fan F2, and the fan F3. Here, each fan is denoted in the formula, as follows: the fan F1 is denoted by n=fan1, the fan F2 is denoted by n=fan2, and the fan F3 is denoted by n=fan3. The unit of T is Kelvin (K). The unit of vector V is meter per second (m/s).

(S103) The cooling contribution calculation unit 120 calculates the distribution $h_0(x)$ of transferred quantity of heat for the mixed air. The unit of $h_0$ is watt (W). Here, an advection-diffusion equation may be described as formula (11). However, description of the position vector x is omitted (may also be omitted in the following description).

$$\frac{\partial}{\partial t}(\rho E) + \nabla \cdot \left(\vec{V}(\rho E + p)\right) = \nabla \cdot k \nabla T + S \qquad (11)$$

t is the time (s) and $\rho$ is the density of air (kg/m³). E is the velocity to the power of two (m²/s²). $\nabla$(nabla) is the vector differential operator for space. Vector V is the velocity distribution of mixed air. p is the pressure force (Pa) and k is thermal conductivity of air (W/(m·K)). T is the temperature distribution and S is the heat density (W/m³). The first term of the left side of formula (11) may be referred to as a non-steady state term. The second term of the left side may be referred to as an advective term. The first term of the right side may be referred to as a heat conduction term. The second term of the right side may be referred to as a heat generation term (source term). Here, $\psi$ (energy density) is defined as in formula (12). The unit of $\psi$ is cubic meter per Joule (J/m³).

$$\psi(\vec{x}) = \rho E(\vec{x}) + p(\vec{x}) \qquad (12)$$

Formula (13) is then obtained by ignoring the non-steady term and the heat generation term in formula (11), considering that the state is steady and also there is no heat generation in each cell. A distribution $h_0$ of transferred quantity of heat is obtained (formula (14)) by substituting the temperature distribution T calculated at step S102 into formula (13).

$$\nabla \cdot (\vec{V}\psi) = \nabla \cdot k \nabla T \qquad (13)$$
$$= a^{-1} h_0 \qquad (14)$$

"a" is the volume per cell (m³). The volume of a cell may be estimated, considering its height in the z-axis direction (e.g., the volume of a rectangular parallelepiped whose area of the base is defined as the area of a cell of the lattice on the top of the substrate 201 may be considered to be the volume of the cell, with the height being the length from the top surface of the substrate 201 to the internal side of the cover 202 facing the substrate 201).

(S104) The cooling contribution calculation unit 120 calculates the initial value of a distribution $h_n(x)$ of transferred quantity of heat per fan, using formula (15). The unit of $h_n$ is watt (W).

$$h_n^{(0)}(\vec{x}) = h_0(\vec{x}) \cdot \frac{q_n(\vec{x})}{q(\vec{x})} \qquad (15)$$
$$= a S_n^{(0)}(\vec{x}) \qquad (16)$$

"$q_n$" is the flow rate distribution of air from each fan calculated at step S102. In addition, $q = \Sigma q_n$ holds ($\Sigma$ represents summation for n). The superscript enclosed in parentheses indicates the number of times i (i is an integer of 0 or more) the calculation is repeated, with i=0, i.e., "(0)" indicating the initial value. In the following description, notation of the superscript "(i)" may be omitted. "$h_n$" is converted into a density distribution $S_n$ of transferred quantity of heat according to formula (16), (formula (16) may be used for any value of i). Since discharge of heat may be regarded as heat generation, it may also be said that the density distribution $S_n$ of transferred quantity of heat indicates the heat generation density of air in each cell.

(S105) The cooling contribution calculation unit 120 calculates the initial value of a distribution $W_n(x)$ of retained quantity of heat per fan, using formulas (17) and (18). The unit of $W_n$ is watt (W).

$$\nabla \cdot (\vec{V}\psi_n^{(i)}) = S_n^{(i)} \qquad (17)$$

$$W_n^{(i)}(\vec{x}) = q_n(\vec{x}) \cdot \psi_n^{(i)}(\vec{x}) \qquad (18)$$

Since the calculation is performed for the initial value, i=0 holds. Formula (17) is an advection equation ignoring the non-steady term and the heat conduction terms in formula (11). This is because, considering the steady state, an energy density distribution $\psi_n$ providing discharge of heat (transfer of heat) in each cell illustrated in the density distribution $S_n$ of transferred quantity of heat is calculated for advection of air according to the velocity distribution V. The distribution $\psi_n$ may be regarded as a distribution of the energy density stored in each cell by each fluid from each fan.

(S106) The cooling contribution calculation unit 120 updates the distribution $h_n$ of transferred quantity of heat per fan. In other words, the cooling contribution calculation unit 120 calculates the (i+1)-th $h_n$ using the $h_n$ calculated in the i-th iteration. A specific calculation method will be described below. $h_n$ may be converted into the density distribution $S_n$ of transferred quantity of heat according to formula (16).

(S107) The cooling contribution calculation unit 120 updates the distribution $W_n(x)$ of retained quantity of heat per fan, using formulas (17) and (18). In other words, $W_n$ is updated using $S_n$ which has been updated at step S106.

(S108) The cooling contribution calculation unit 120 determines whether or not the residual of the distribution $W_n$ of retained quantity of heat per fan has converged. When the residual has not converged, the process flow proceeds to step S106. When the residual has converged, the process flow proceeds to step S109.

(S109) The cooling contribution calculation unit 120 identifies a cell range involved in heat transfer for each of the heating elements H1 and H2. Specifically, the cooling contribution calculation unit 120 extracts, from the space within the housing 200, a predetermined cell range around the heating element H1, based on a predetermined rule. Similarly, the cooling contribution calculation unit 120 extracts, from the space within the housing 200, a predetermined cell range around the heating element H2.

(S110) The cooling contribution calculation unit 120 evaluates the cooling capacity of the fans F1, F2 and F3 for each of the heating elements H1 and H2, using the distribution $h_n$ of transferred quantity of heat and the cell range extracted at step S109. The cooling contribution calculation unit 120 displays the evaluation result on the display 11.

In the aforementioned manner, the cooling contribution calculation unit 120 updates the distribution $h_n$ of transferred quantity of heat until the residual of the distribution $W_n$ of retained quantity of heat converges and, using the distribution $h_n$ of transferred quantity of heat which has been finally obtained, evaluates the cooling capacity of the fans F1, F2 and F3 for the heating elements H1 and H2, respectively.

Figure 29:
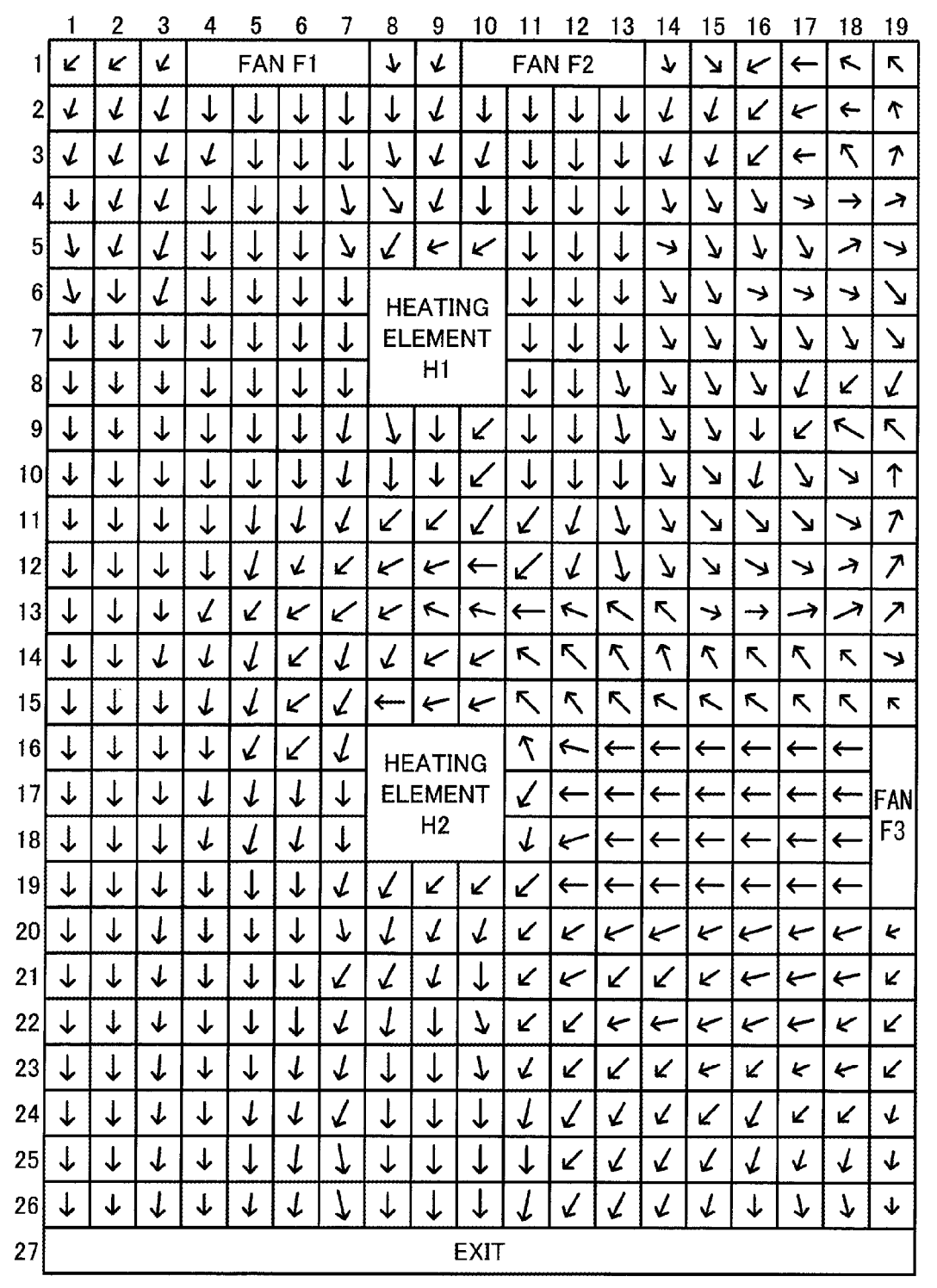

FIG. 29 illustrates a velocity distribution of mixed air. There is illustrated in FIG. 29 a velocity distribution V of mixed air in the steady state when all the fans F1, F2 and F3 are being operated. For example, air from the fans F1 and F2 flows from the top of the page toward the bottom to be mixed. Air from the fan F3 flows from the right side of the page toward the left side. On this occasion, the air from the fan F3 hits the heating element H2 and moves up and down. The moving air waves the flow of the air from the fans F1 and F2, resulting in a mixture of air from the fans F1, F2 and F3. The air from the fan F2 is more susceptible to the wave than the air from the fan F1.

Figure 30:
FIG. 30 illustrates an exemplary flow rate distribution (part 1)

FIG. 30 illustrates an exemplary flow rate distribution (part 1). There is illustrated in FIG. 30 a flow rate distribution $q_n$ (n=fan1) of air from the fan F1 when all the fans F1, F2 and F3 are being operated. The numerical value assigned to each cell is the flow rate ratio $q_n/q$ (n=fan1). The darker the color of a cell, the larger the flow rate is, and the lighter the color of a cell, the smaller the flow rate is (the same goes for other flow rate distributions illustrated below). In the flow rate distribution relating to the fan F1, regions with relatively large flow rates are distributed over a cell range of X=1 to 8.

FIG. 31 illustrates an exemplary flow rate distribution (part 2). There is illustrated in FIG. 31 a flow rate distribution $q_n$ (n=fan2) of air from the fan F2 when all the fans F1, F2 and F3 are being operated. The numerical value assigned to each cell is the flow rate ratio $q_n/q$ (n=fan2). In the flow rate distribution relating to the fan F2, regions with relatively large flow rates are distributed over a cell range of X=9 to 19 and Y=1 to 13.

Figure 32:
FIG. 32 illustrates an exemplary flow rate distribution (part 3)
Figure 32:

FIG. 32 illustrates an exemplary flow rate distribution (part 3). There is illustrated in FIG. 32 a flow rate distribution $q_n$ (n=fan3) of air from the fan F3 when all the fans F1, F2 and F3 are being operated. The numerical value assigned to each cell is the flow rate ratio $q_n/q$ (n=fan3). In the flow rate distribution relating to the fan F3, regions with relatively large flow rates are distributed over a cell range of X=11 to 19 and Y=14 to 26.

Figure 33:
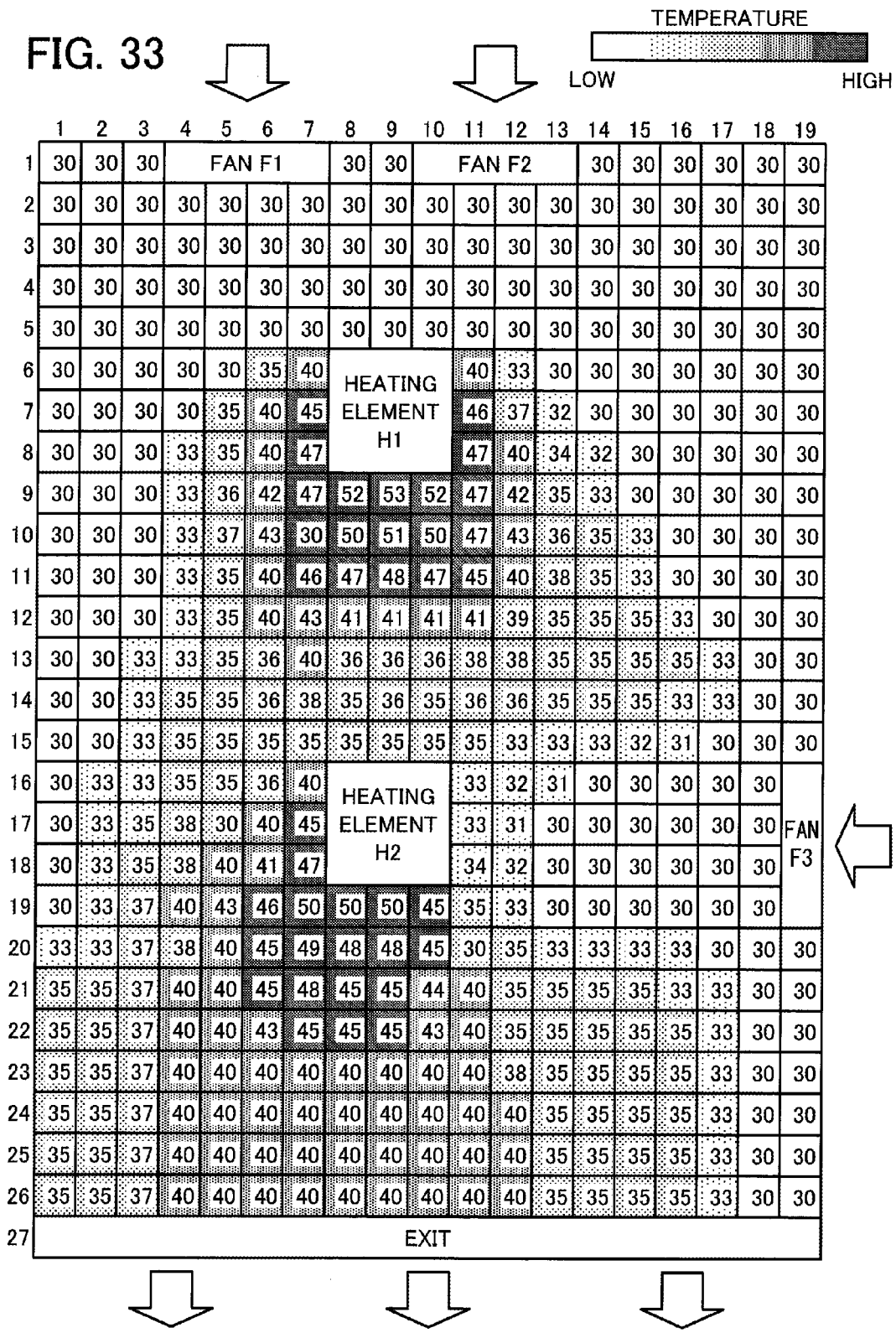
FIG. 33 illustrates an exemplary temperature distribution of mixed air.

FIG. 33 illustrates an exemplary temperature distribution of mixed air. FIG. 33 illustrates a temperature distribution T in the steady-state when all the fans F1, F2 and F3 are being operated. The numerical value assigned to each cell is the temperature (T−273.15) (in ° C.). The darker the color of a cell, the higher the temperature is, and the lighter the color of a cell, the lower the temperature is. According to the temperature distribution T, for example, it may be seen that the temperature on the windward side of the heating elements H1 and H2 is relatively low, and the temperature on the leeward side is relatively high. The cooling contribution calculation unit 120 calculates the distributions illustrated in FIGS. 29 to 33 by performing the process of step S102 (thermo-fluid analysis using CFD) illustrated in FIG. 28.

Figure 34:
FIG. 34 illustrates an exemplary distribution of the transferred quantity of heat.

FIG. 34 illustrates an exemplary distribution of transferred quantity of heat. FIG. 34 illustrates a distribution $h_0$ of transferred quantity of heat for the temperature distribution T. As described at step S103 of FIG. 28, the cooling contribution calculation unit 120 obtains the distribution $h_0$ of transferred quantity of heat by substituting the temperature distribution T into formula (13). According to the distribution $h_0$ of transferred quantity of heat, for example, it may be seen that the transferred quantity of heat is large on the windward side of the heating elements H1 and H2, and the transferred quantity of heat is small on the leeward side.

FIG. 35 illustrates an exemplary distribution of transferred quantity of heat per fan (initial value), (part 1). There are illustrated in FIG. 35 initial values of the distribution $h_n$ of transferred quantity of heat (n=fan1) for the fan F1. The initial values result from multiplying the distribution $h_0$ of transferred quantity of heat illustrated in FIG. 34 by the flow rate ratio ($q_n/q$), (n=fan1) of the air from the fan F1. For example, multiplying the value of $h_0$ of a cell by the value of $q_n/q$ (n=fan1) in the cell results in a value of $h_n$ (n=fan1) of the cell (the same goes for the following).

FIG. 36 illustrates an exemplary distribution of transferred quantity of heat per fan (initial value), (part 2). There are illustrated in FIG. 36 initial values of the distribution $h_n$ of transferred quantity of heat (n=fan2) for the fan F2. The initial values results from multiplying the distribution $h_n$ of transferred quantity of heat illustrated in FIG. 34 by the flow rate ratio ($q_n/q$), (n=fan2) of the air from the fan F2.

FIG. 37 illustrates an exemplary distribution of transferred quantity of heat per fan (initial value), (part 3). There are illustrated in FIG. 37 initial values of the distribution $h_n$ of transferred quantity of heat (n=fan3) for the fan F3. The initial values results from multiplying the distribution $h_0$ of transferred quantity of heat illustrated in FIG. 34 by the flow rate ratio ($q_n/q$), (n=fan3) of the air from the fan F3. The cooling contribution calculation unit 120 calculates the distributions $h_n$ illustrated in FIGS. 35 to 37 by performing the process of step S104 described in FIG. 28.

Figure 38:
FIG. 38 illustrates an exemplary distribution of the retained quantity of heat per fan (initial value), (part 1)

FIG. 38 illustrates an exemplary distribution of retained quantity of heat per fan (initial value), (part 1). There are illustrated in FIG. 38 initial values of the distribution $W_n$ of retained quantity of heat (n=fan1) for the fan F1. The initial values result from calculating the distribution $W_n$ of retained quantity of heat (n=fan1) from formulas (17) and (18), using the distribution $h_n$ of transferred quantity of heat (n=fan1) illustrated in FIG. 35.

FIG. 39 illustrates an exemplary distribution of retained quantity of heat per fan (initial value), (part 2). There are illustrated in FIG. 39 initial values of the distribution $W_n$ of retained quantity of heat (n=fan2) for the fan F2. The initial values result from calculating the distribution $W_n$ of retained quantity of heat (n=fan2) from formulas (17) and (18), using the distribution $h_n$ of transferred quantity of heat (n=fan2) illustrated in FIG. 36.

FIG. 40 illustrates an exemplary distribution of retained quantity of heat per fan (initial value), (part 3). There are illustrated in FIG. 40 initial values of the distribution $W_n$ of retained quantity of heat (n=fan3) for the fan F3. The initial values result from calculating he distribution $W_n$ of retained quantity of heat (n=fan3) from formulas (17) and (18), using the distribution $h_n$ of transferred quantity of heat (n=fan3) illustrated in FIG. 37. The cooling contribution calculation unit 120 calculates the distributions $W_n$ illustrated in FIGS. 38 to 40 by performing the process of step S105 illustrated in FIG. 28. Next, a procedure of updating the distribution of transferred quantity of heat per fan at step S106 of FIG. 28 will be described.

Figure 41:
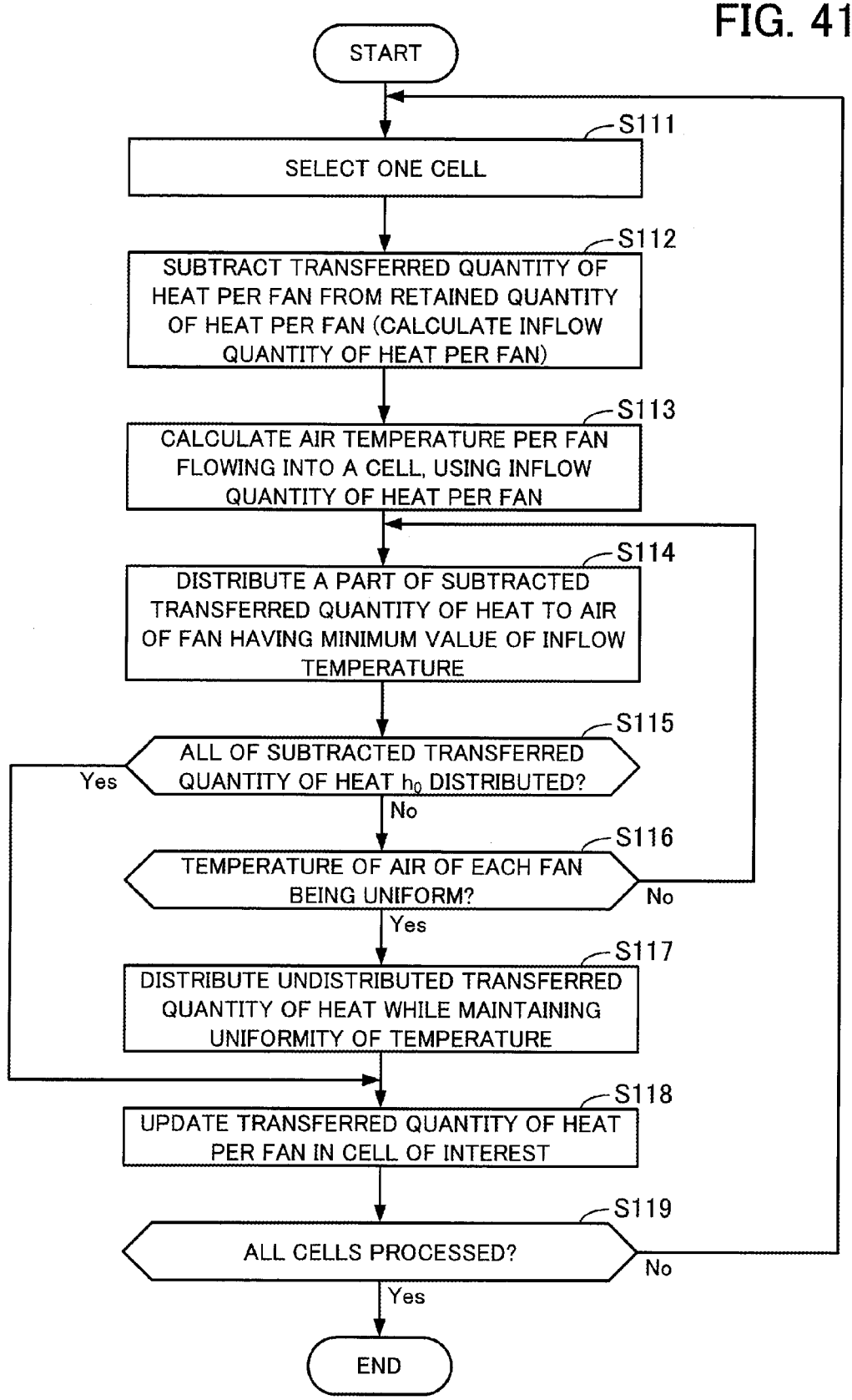
FIG. 41 is a flowchart illustrating an exemplary updating process of distribution of the transferred quantity of heat per fan.

FIG. 41 is a flowchart illustrating an exemplary updating process of the distribution of transferred quantity of heat per fan. The procedure illustrated in FIG. 41 will be described along with step numbers.

(S111) The cooling contribution calculation unit 120 selects one cell from unprocessed cells.

(S112) The cooling contribution calculation unit 120 calculates the inflow quality of heat per fan ($W_n - h_n$) by subtracting the transferred quality of heat per fan $h_n$ from the retained quality of heat per fan $W_n$. However, the values of $W_n$ and $h_n$ indicate the values in the cell selected at step S111 (the same goes for the following).

(S113) The cooling contribution calculation unit 120 calculates the temperature of air $\tau_n(x)$ flowing into a cell per fan, using formula (19).

$$\tau_n^{(i)}(\vec{x}) = \frac{W_n^{(i)}(\vec{x}) - h_n^{(i)}(\vec{x})}{C \cdot \rho \cdot q_n(\vec{x})} \quad (19)$$

C is the specific heat of air (J/(g·K)) and $\rho$ is the density of air. $q_n$ is the flow rate.

(S114) The cooling contribution calculation unit 120 distributes a part of $\Sigma h_n = h_0$ ($\Sigma$ represents summation for n) subtracted at step S112 to air of the fan having the minimum value of the temperature $T_n$, among the air of each fan. The value of $h_0$ indicates the value in the cell selected at step S111. The amount to be distributed at a time may be arbitrarily determined. For example, the amount to be distributed is preliminarily provided to the cooling contribution calculation unit 120 such as $h_0/100$ or $h_0/50$. The accumulated amount of distribution for each fan is equivalent to $h_n$ calculated at the (i+1)-th iteration. In the aforementioned manner, the (i+1)-th $h_n$ is calculated for $h_n$ calculated at the i-th iteration. Here, the relation between $T_n$ and $\tau_n$ is given by formula (20).

$$T_n^{(i+1)}(\vec{x}) = \tau_n^{(i)}(\vec{x}) + \frac{h_n^{(i+1)}(\vec{x})}{C \cdot \rho \cdot q_n(\vec{x})} \quad (20)$$

(S115) The cooling contribution calculation unit 120 determines whether or not all of the subtracted transferred quantity of heat $h_0$ has been distributed to the air of each fan. When all the amount has been distributed, the process flow proceeds to step S118. When not all the amount has been distributed, the process flow proceeds to step S116. For example, step S114 is repeatedly performed and it is determined that the amount has all been distributed when the accumulated amount of distribution is equal to $h_0$. When the accumulated amount of distribution is smaller than $h_0$, it is determined that the amount has not all been distributed.

(S116) The cooling contribution calculation unit 120 determines whether or not the temperature $T_n$ of the air of each fan is uniform. When the temperature $T_n$ is uniform, the process flow proceeds to step S117. When the temperature $T_n$ not uniform, the process flow proceeds to step S114.

(S117) The cooling contribution calculation unit 120 distributes the undistributed transferred quantity of heat to the air of each fan while maintaining the uniformity of temperature of air of each fan. The processes of steps S114 to S117 may be regarded as a process of calculating the (i+1)-th $h_n$ under the condition indicated by formula (20) and formulas (21), (22) and (23) described below.

$$\sum_n h_n^{(i+1)} = \sum_n h_n^{(i)} \quad (21)$$

$$= h_0 \quad (22)$$

$$T_{fan1}^{(i+1)} \approx T_{fan2}^{(i+1)} \approx T_{fan3}^{(i+1)} \quad (23)$$

(S118) The cooling contribution calculation unit 120 updates the transferred quantity of heat per fan in the cell selected at step S111 to the (i+1)-th value of $h_n$ which has been finally obtained by performing the processes of steps S114 to S117.

(S119) The cooling contribution calculation unit 120 determines whether or not all the cells in the space within the housing 200 have been processed. When all the cells have been processed, the process is terminated. When not all the cells have been processed, in other words, when there exist unprocessed cells, the process flow proceeds to step S111.

In the aforementioned manner, the cooling contribution calculation unit 120 updates the distribution $h_n$ of transferred quantity of heat per fan.

Figure 42A:
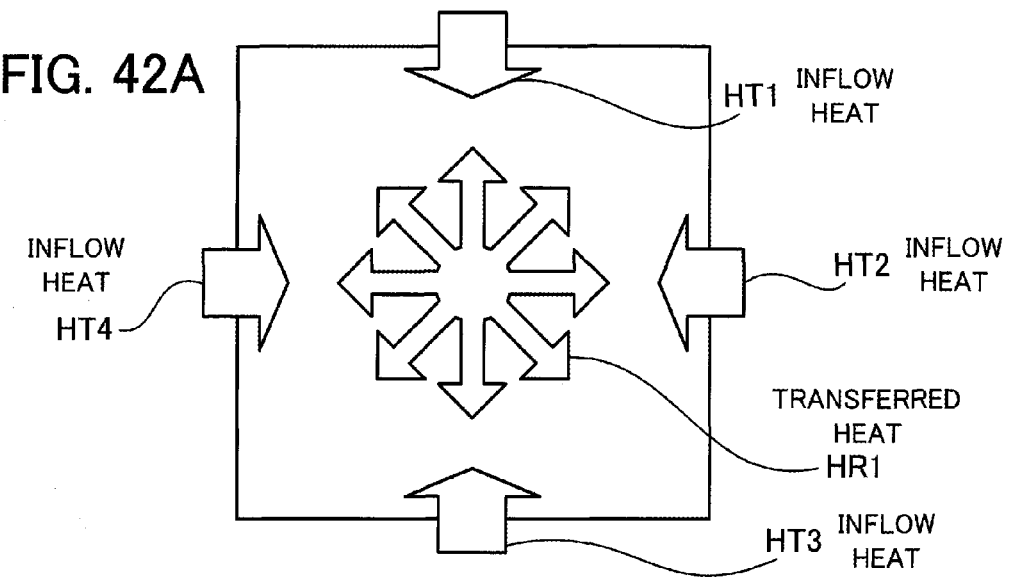
FIGS. 42A, 42B and 42C illustrate transferred heat and inflow heat in a cell.
Figure 42B:
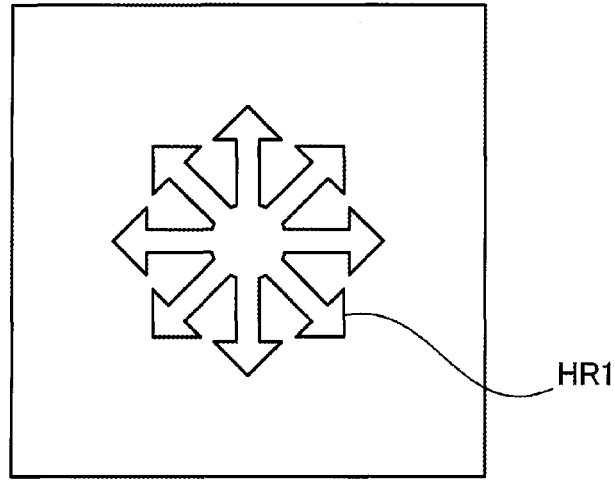
Figure 42C:
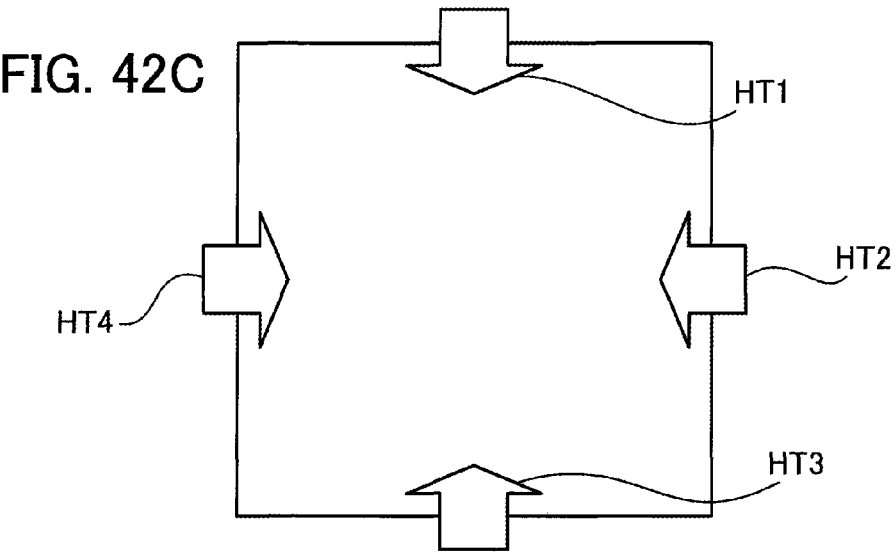

FIGS. 42A, 42B and 42C illustrate transferred heat and inflow heat in a cell. FIG. 42A illustrates the types of heat retained in a single cell. FIG. 42B illustrates transferred heat HR1. FIG. 42C illustrates inflow heat HT1, HT2, HT3 and HT4.

Focusing on a single cell, heat retained by air from each fan in the cell may be regarded as the sum of the heat robbed by air at the cell position (transferred heat HR1) and the heat that flows in from adjacent cells (inflow heat HT1, HT2, HT3 and HT4). Therefore, the amount of inflow heat equivalent to the inflow heat HT1, HT2, HT3 and HT4 may be obtained by subtracting the transferred quantity of heat $h_n$ equivalent to the transferred heat HR1 from the retained quantity of heat $W_n$. The temperature of the air flowing in from the inflow quantity of heat may be evaluated thereby. The transferred quantity of heat $h_n$ of the air of each fan is adjusted so that the temperature becomes uniform, for the air from each fan. Even when the temperature of the air is different for each fan when flowing into the cell, the flows of air from respective fans are mixed in the cell. Accordingly, it is conceivable that the air of each fan is at the same temperature when flowing out of the cell.

Figure 43A:
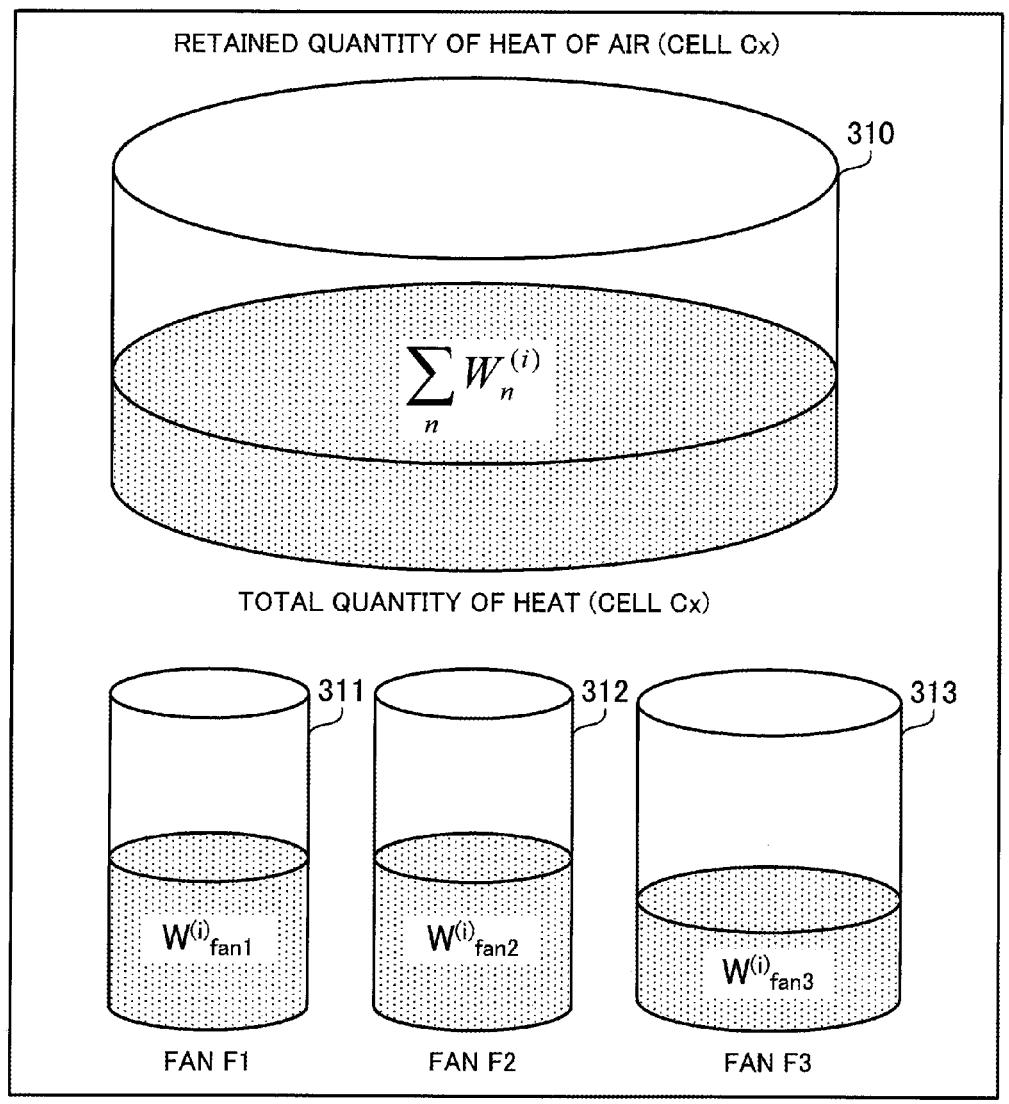
FIGS. 43A and 43B illustrate an exemplary retained quantity of heat and transferred quantity of heat in a cell.
Figure 43B:
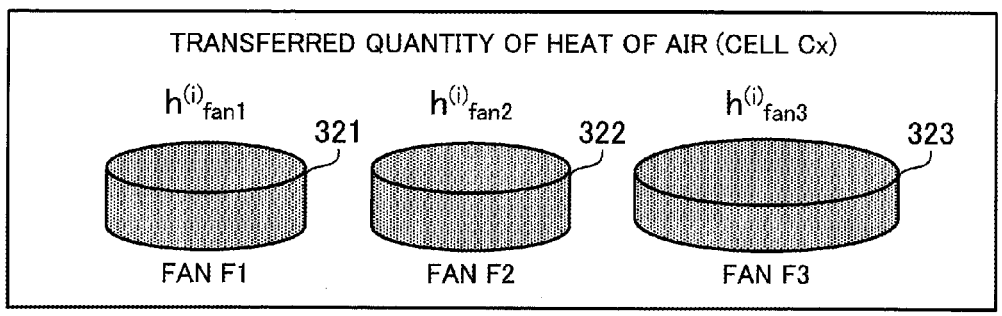

FIGS. 43A and 43B illustrate an exemplary retained quantity of heat and transferred quantity of heat in a cell. FIG. 43A illustrates the retained quantity of heat $W_n$ of air in a cell Cx (i-th iteration). For example, the retained quantity of heat in the air of each fan is represented by cylinders 311, 312 and 313. The cross-section area of each cylinder corresponds to $C\rho$ ($q_n$), (product of specific heat, density and flow rate). The cylinder 311 indicates the retained quantity of heat $W_n$ (n=fan1) of the fan F1. The cylinder 312 represents the retained quantity of heat $W_n$ (n=fan2) of the fan F2. The cylinder 313 represents the retained quantity of heat $W_n$ (n=fan3) of the fan F3. $\Sigma W_n$ ($\Sigma$ represents summation for n) is the total retained quantity of heat in the cell Cx.

FIG. 43B illustrates the transferred quantity of heat $h_n$ of air in the cell Cx (i-th iteration). The transferred quantity of heat of the air of each fan is represented by cylinders 321, 322 and 323. The cross-section area of each cylinder represents $C\rho$ ($q_n$) similarly to FIG. 43A. The cylinder 321 represents the transferred quantity of heat $h_n$ (n=fan1) of the fan F1. The cylinder 322 represents the transferred quantity of heat $h_n$ (n=fan2) of the fan F2. The cylinder 323 represents the transferred quantity of heat $h_n$ (n=fan3) of the fan F3.

Figure 44:
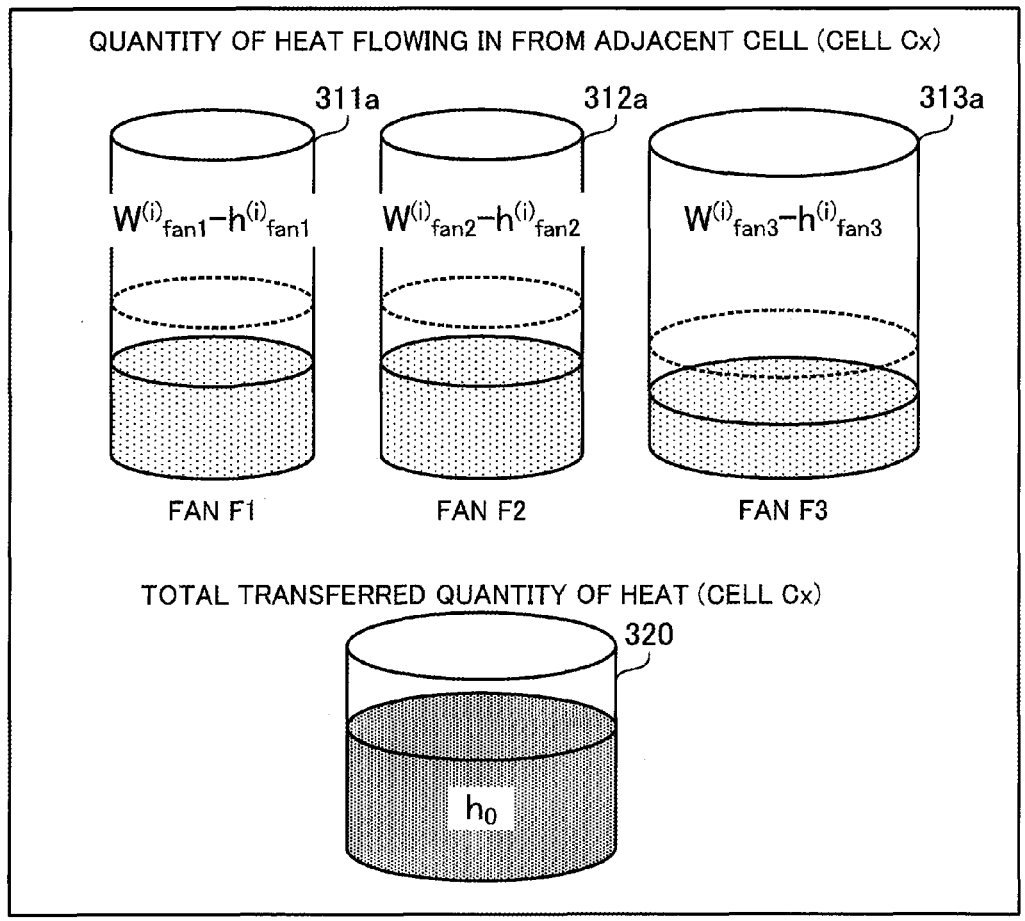
FIG. 44 illustrates an exemplary inflow quantity of heat and a retained quantity of heat after update in a cell.
Figure 44:
Figure 44:
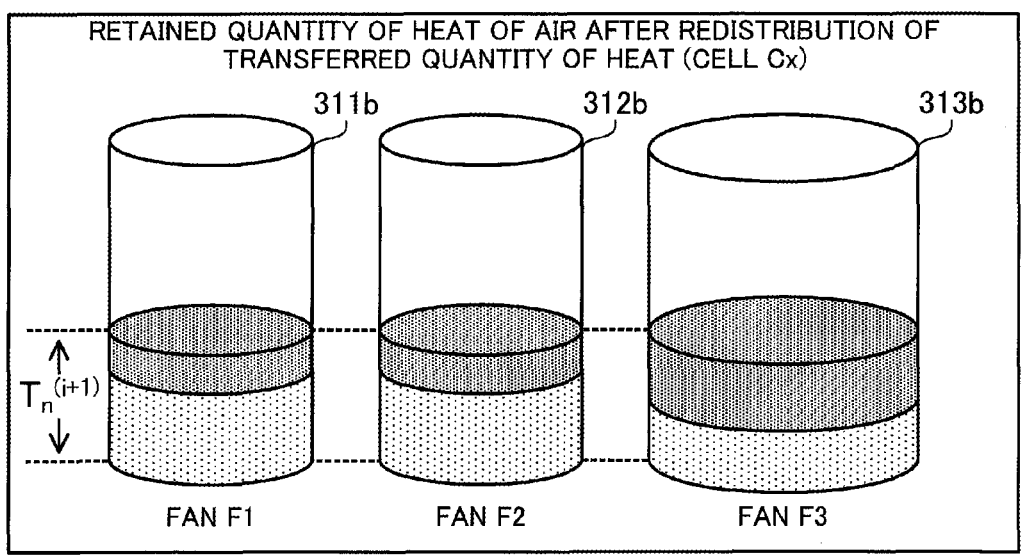

FIG. 44 illustrates an exemplary amount of inflow heat and an updated retained quantity of heat in a cell. The cylinders 311a, 312a and 313a illustrate the amount of inflow heat (i-th iteration) in relation to the retained quantity of heat $W_n$ and the transferred quantity of heat $h_n$ illustrated in FIGS. 43A and 43B. The cylinder 311a is the inflow quantity of heat ($W_n - h_n$), (n=fan1) relating to the fan F1. The cylinder 312a is the inflow quantity of heat ($W_n - h_n$), (n=fan2) relating to the fan F2. The cylinder 313a is the inflow quantity of heat ($W_n - h_n$), (n=fan3) relating to the fan F3. The cylinder 320 represents the total of the transferred quantity of heat $h_n$, i.e., $\Sigma h_n = h_0$ ($\Sigma$ represents summation for n).

Subsequently, the total transferred quantity of heat $h_0$ of cylinder 320 is redistributed to each of the cylinders 311a, 312a and 313a. On this occasion, the temperature $T_n$ of the air of each fan (equivalent to the height of the cylinder) is adjusted to be approximately uniform. The cylinders 311b, 312b and 313b illustrate the state after the transferred quantity of heat $h_0$ of the cylinder 320 is redistributed in the aforementioned manner. The cylinder 311b illustrates the state after the transferred quantity of heat is redistributed to the cylinder 311a. The cylinder 312b illustrates the state after the transferred quantity of heat is redistributed to the cylinder 312a. The cylinder 313b illustrates the state after the transferred quantity of heat is redistributed to the cylinder 313a.

Figure 45:
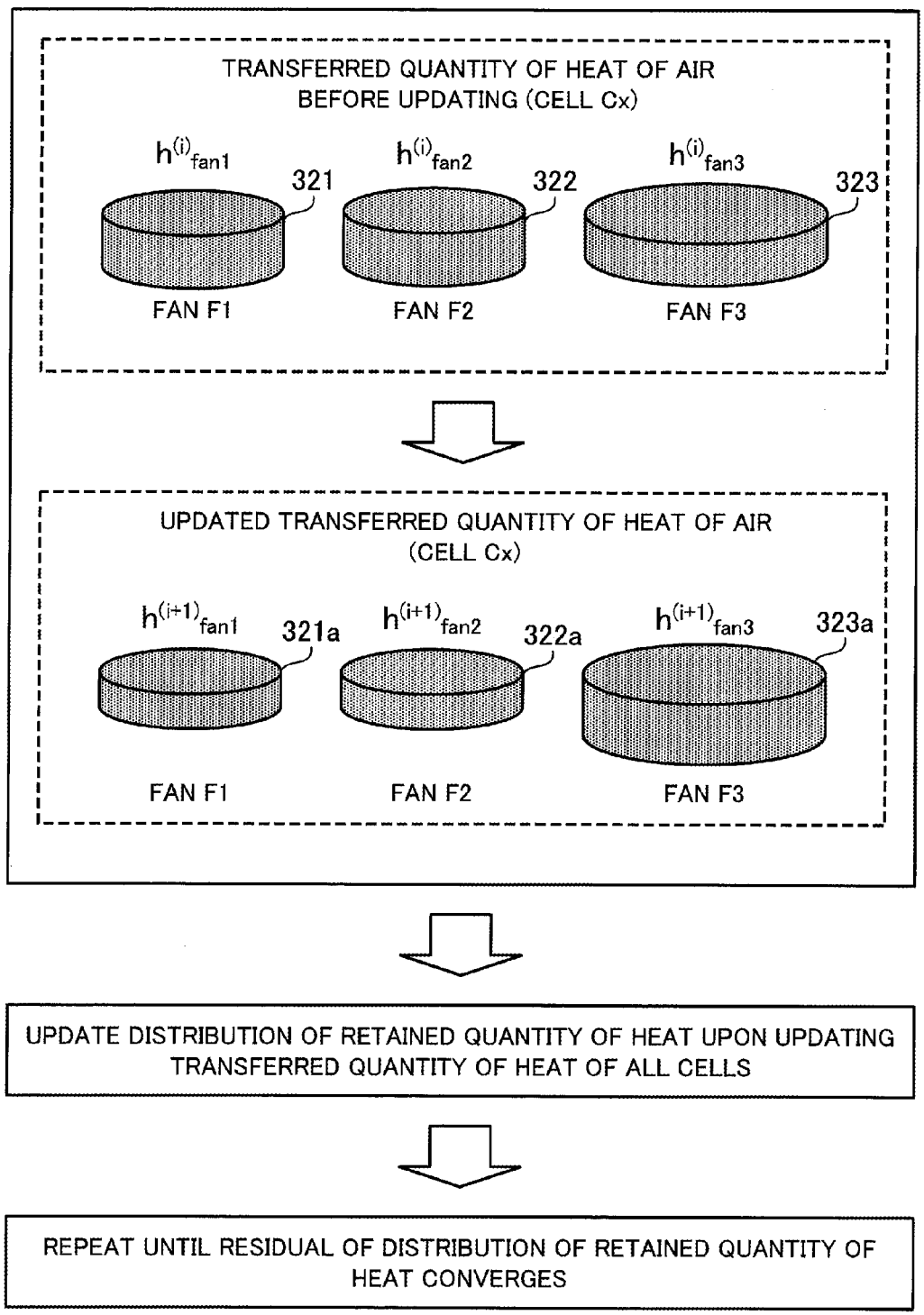
FIG. 45 illustrates an exemplary updating of the transferred quantity of heat in a cell.

FIG. 45 illustrates an exemplary updating of the transferred quantity of heat in a cell. The cylinders 321a, 322a and 323a represent the updated cylinders 321, 322 and 323 ((i+1)-th iteration). In other words, the cylinder 321a is the updated transferred quantity of heat $h_n$ (n=fan1) of the air from the fan F1 in the cell Cx. The cylinder 322a is the updated transferred quantity of heat $h_n$ (n=fan2) of the air from the fan F2 in the cell Cx. The cylinder 323a is the updated transferred quantity of heat $h_n$ (n=fan3) of the air from the fan F3 in the cell Cx.

The cooling contribution calculation unit 120 performs on all the cells a similar processing to the processing of the cell Cx, and updates the distribution of transferred quantity of heat $h_n$ for each fan. The cooling contribution calculation unit 120 then repeatedly updates the distribution of transferred quantity of heat $h_n$, using formulas (17), (18), (19), (20), (21), (22) and (23).

The cooling contribution calculation unit 120 performs the adjustment in a repetitive manner until, for example, the residual for the value of the distribution $W_n$ of retained quantity of heat in each cell converges to $\epsilon$ ($\epsilon$ is a positive real number), as indicated in formula (24). The value $\epsilon$ has been preliminarily provided to the cooling contribution calculation unit 120.

$$|W_n^{(i+1)} - W_n^{(i)}| \leq \epsilon \quad (24)$$

In the aforementioned manner, the final transferred quantity of heat $h_n$ is determined. The cooling contribution calculation unit 120 may terminate the adjustment of the transferred quantity of heat $h_n$ when the residual of the energy density distribution $\psi_n$ or the temperature distribution $\psi_n$ has converged.

FIG. 46 illustrates an exemplary distribution of the transferred quantity of heat per fan (after convergence), (part 1). There is illustrated in FIG. 46 the distribution $h_n$ of transferred quantity of heat (n=fan1) finally calculated for the fan F1. In comparison with FIG. 35, the transferred quantity of heat of each cell included in a cell range Ra has been adjusted more significantly than cells in other cell ranges. The cell range Ra is a cell range of X=7 to 11 and Y=15 to 19. This may be regarded as a region around the heating element H2, in which the influence of the wave due to the air from the fans F1 and F2 is larger than the wave due to the air from the fan F3, in comparison with other regions.

FIG. 47 illustrates an exemplary distribution of transferred quantity of heat per fan (after convergence), (part 2). There is illustrated in FIG. 47 the distribution $h_n$ of transferred quantity of heat (n=fan2) finally calculated for the fan F2. In comparison with FIG. 36, the transferred quantity of heat of each cell included in a cell range Rb is adjusted more significantly than cells in other regions, as with FIG. 46. Here, the cell range Rb is a cell range indicated by the same (X, Y) coordinate range as the cell range Ra.

FIG. 48 illustrates an exemplary distribution of transferred quantity of heat per fan (after convergence), (part 3). There is illustrated in FIG. 48 the distribution $h_n$ of transferred quantity of heat (n=fan3) finally calculated for the fan F3. In comparison with FIG. 37, the transferred quantity of heat of each cell included in a cell range Rc is adjusted more significantly than cells in other regions, as with FIG. 46. Here, the cell range Rc is a cell range indicated by the same (X, Y) coordinate range as the cell range Ra.

As thus described above, in the cell ranges Ra, Rb and Rc in which the influence of the wave is relatively large, the distribution $h_n$ of transferred quantity of heat is adjusted notably more significantly than other regions, using the procedure of FIG. 41. In other words, even when there is influence of the wave, the influence may be appropriately reflected in the distribution $h_n$ of transferred quantity of heat.

The cooling contribution calculation unit 120 allows the user to select one of the distribution $h_n$ of transferred quantity of heat (n=fan1, fan2, fan3) illustrated in FIGS. 46 to 48. The cooling contribution calculation unit 120 displays an image (such as those illustrated in FIGS. 46 to 48) representing the selected distribution $h_n$ of transferred quantity of heat on the display 11. In addition, the cooling contribution calculation unit 120 also allows the user to select one of the distributions $W_n$ of retained quantity of heat (n=fan1, fan2, fan3) corresponding to the distribution $h_n$ of transferred quantity of heat. The cooling contribution calculation unit 120 displays an image representing the selected distribution $W_n$ of retained quantity of heat on the display 11.

For example, the cooling contribution calculation unit 120 displays, using the display 11, an image (e.g., numerical value, color, thickness of color, etc.) according to the value in each cell indicated by the user-selected distribution on a part corresponding to each cell in the image representing the internal space of the housing 200. The user may easily grasp the cooling effect of each fan on each heating element by browsing the image representing the distribution $h_n$ of transferred quantity of heat and the distribution $W_n$ of retained quantity of heat.

Next, a procedure of the identification process of a cell range involved in heat transfer at step S109 of FIG. 28 will be described.

Figure 49:
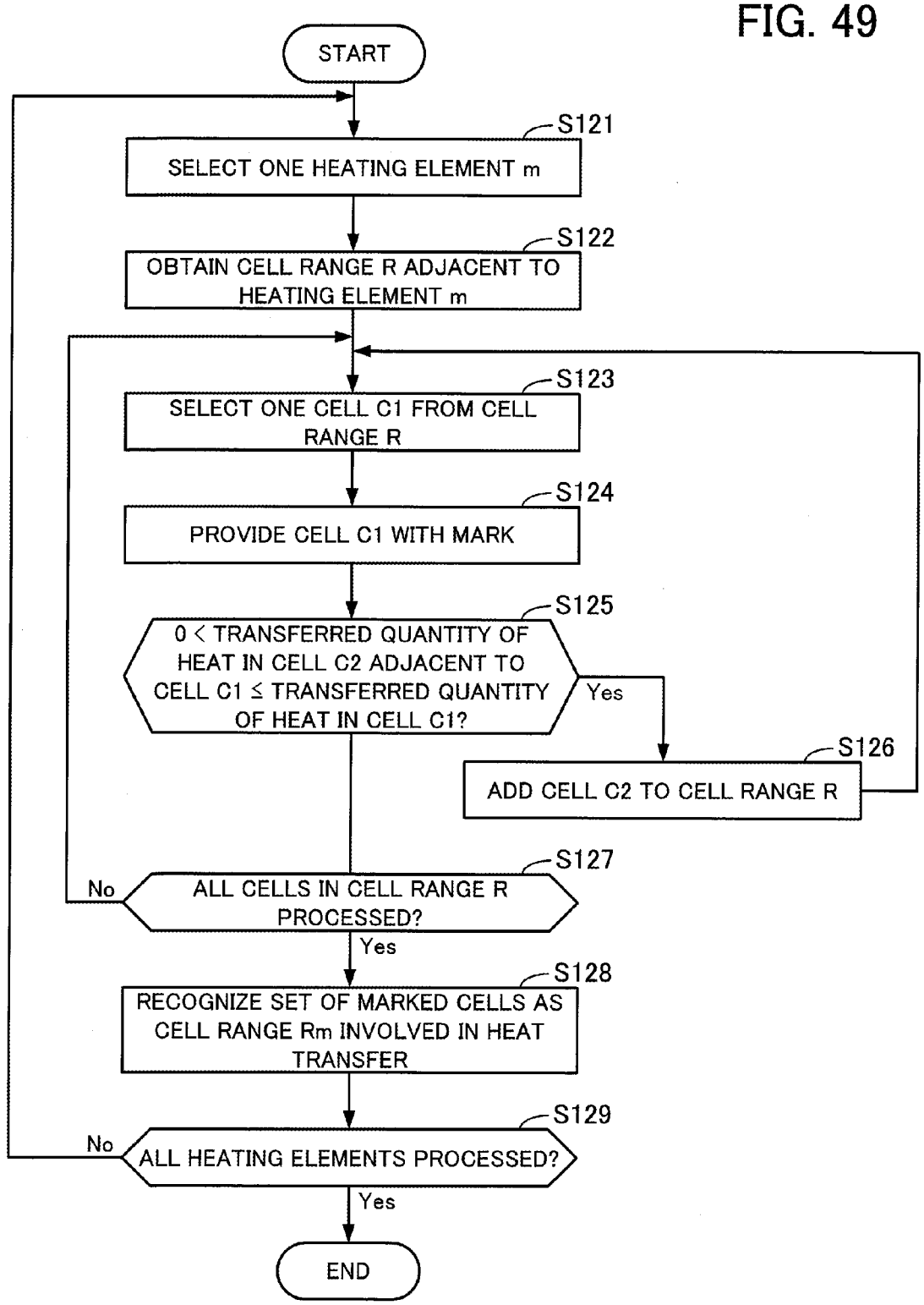
FIG. 49 is a flowchart illustrating an exemplary identification process of a cell range involved in heat transfer.

FIG. 49 is a flowchart illustrating an exemplary identification process of a cell range involved in heat exchange. In the following, the procedure illustrated in FIG. 49 will be described along with step numbers.

(S121) The cooling contribution calculation unit 120 selects one of the heating elements included in the analysis object model. The selected heating element is referred to as a heating element m.

(S122) The cooling contribution calculation unit 120 obtains a cell range R adjacent to the heating element m. For example, the adjacent cell range R to the heating element H1 is: (X, Y)={(8,5), (9,5), (10,5), (7,6), (11,6), (7,7), (11,7), (7,8), (11,8), (8,9), (9,9), (10,9)}.

(S123) The cooling contribution calculation unit 120 selects one cell C1 from the cell range R.

(S124) The cooling contribution calculation unit 120 provides the cell C1 with a mark. For example, the cell C1 is provided a mark indicating that it is a cell included in a cell range Rm involved in heat transfer of the heating element m (e.g., a flag "true" for coordinates indicating the cell C1).

(S125) The cooling contribution calculation unit 120 obtains a cell C2 adjacent to the cell C1. When there is a plurality of adjacent cells, it turns out that a plurality of adjacent cells C2 is obtained. The cooling contribution calculation unit 120 determines whether or not the transferred quantity of heat in the adjacent cell C2 satisfies the relation "0< transferred quantity of heat in adjacent cell C2≤ transferred quantity of heat in cell C1". When the relation is satisfied, the process flow proceeds to step S126. When the relation is not satisfied, the process flow proceeds to step S127. When a plurality of adjacent cells C2 have been obtained, the process flow may proceed to step S126 provided that at least a single adjacent cell C2 satisfies the relation.

(S126) The cooling contribution calculation unit 120 adds the cell C2 to the cell range R. When there are a plurality of cells C2 satisfying the relation of step S125, the plurality of cells C2 are added to the cell range R. However, a cell already existing in the cell range R need not be added in a duplicate manner. The process flow then proceeds to step S123.

(S127) The cooling contribution calculation unit 120 determines whether or not all the cells in the cell range R have been processed. When all the cells in the cell range R have been processed, the process flow proceeds to step S128. When not all the cells in the cell range R have been processed, the process flow proceeds to step S123.

(S128) The cooling contribution calculation unit 120 recognizes the set of marked cells as the cell range Rm involved in heat transfer of the heating element m.

(S129) The cooling contribution calculation unit 120 determines whether or not all the heating elements included in the analysis object model have been processed (i.e., whether or not the cell range Rm has been obtained for all the heating elements). When all the heating elements have been processed, the process is terminated. When not all the heating elements have been processed, the process flow proceeds to step S121.

FIG. 50 illustrates an exemplary cell range involved in heat exchange. For example, the cooling contribution calculation unit 120 obtains the cell range R10 for the heating element H1, according to the procedure of FIG. 49. In addition, the cooling contribution calculation unit 120 obtains the cell range R20 for the heating element H2, according to the procedure of FIG. 49. Next, a procedure of evaluating the cooling capacity per fan at step S110 of FIG. 28 will be described.

Figure 51:
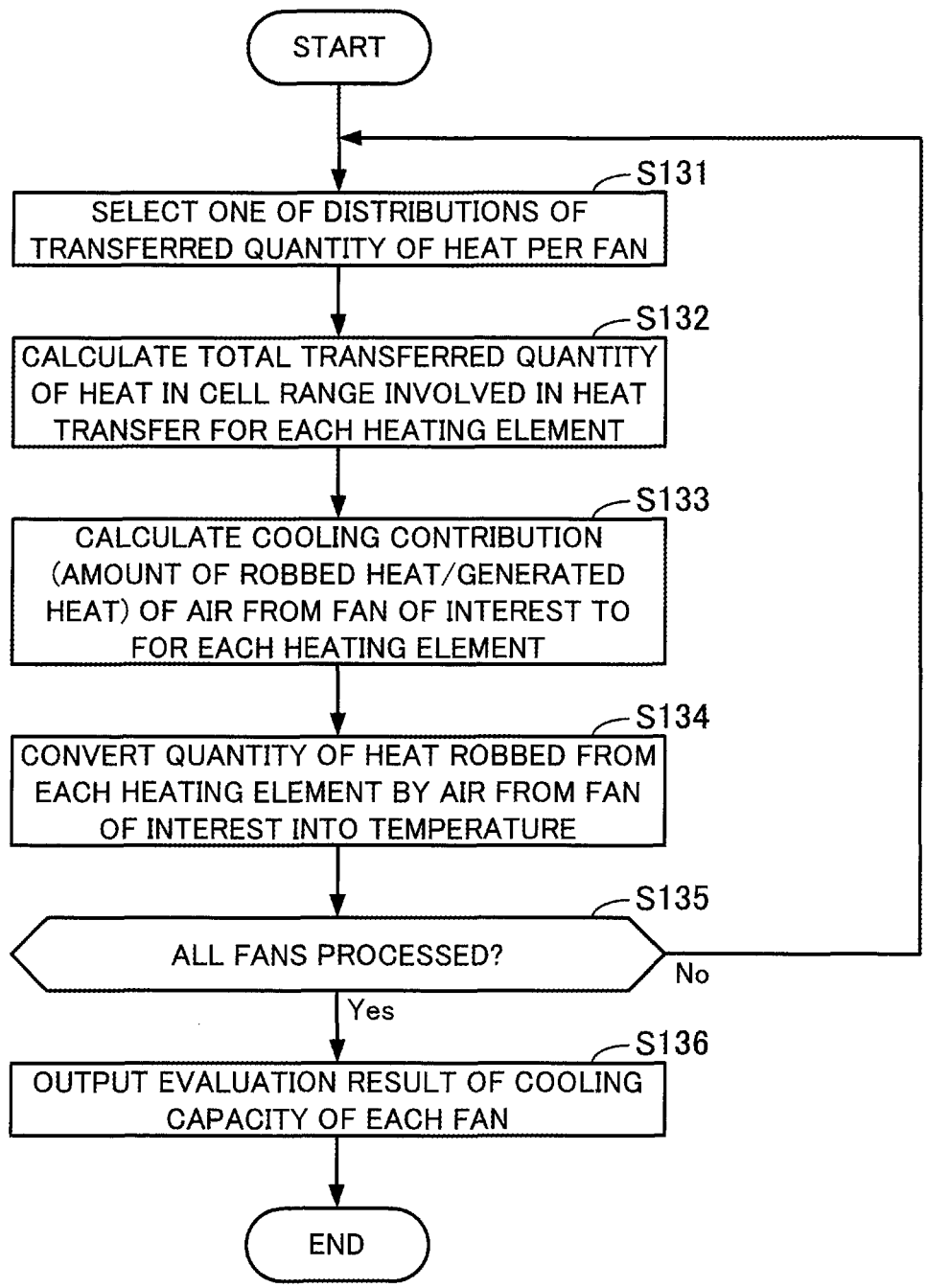
FIG. 51 is a flowchart illustrating an exemplary evaluation process of a cooling capacity per fan.

FIG. 51 is a flowchart illustrating an exemplary evaluation process of the cooling capacity per fan. In the following, the procedure illustrated in FIG. 51 will be described along with step numbers.

(S131) The cooling contribution calculation unit 120 selects one of the distribution $h_n$ of transferred quantity of heat per fan.

(S132) The cooling contribution calculation unit 120 calculates the total transferred quantity of heat $Z_{m,n}$ in the cell range involved in heat transfer for each heating element m, using formula (25).

$$Z_{m,n} = \sum_{\vec{x} \in R_m} h_n(\vec{x}) \qquad (25)$$

$Z_{m,n}$ corresponds to the quantity of heat robbed by the air from the fan n in relation to the quantity of heat generation of the heating element m (may also be referred to as quantity of heat robbed per unit time).

(S133) The cooling contribution calculation unit 120 calculates the cooling contribution of air from the fan selected at step S131 for each heating element m. For example, it is assumed that cooling contribution=$Z_{m,n}$/(quantity of heat generation of heating element m). The cooling contribution calculation unit 120 normalizes the cooling contributions of respective fans to a single heating element so that the sum of cooling contributions of respective fans to the heating element becomes 1. The cooling contribution calculation unit 120 registers the cooling contribution of each fan to each heating element in the cooling contribution table 112.

(S134) The cooling contribution calculation unit 120 converts the quantity of heat robbed from a heating element by the air from the fan selected at step S131 into the temperature for each heating element m. For example, it is assumed that the temperature=$Z_{m,n}$/(mass-of-heating element-m×specific-heat-of-heating element-m).

(S135) The cooling contribution calculation unit 120 determines whether or not the processes of steps S131 to S134 have been performed for all the fans. When the processes have been performed on all the fans, the process flow proceeds to step S136. When the processes have not been performed on all the fans, the process flow proceeds to step S131.

(S136) The cooling contribution calculation unit 120 outputs the evaluation result of the cooling capacity of each fan on the display 11, and displays an image representing the evaluation result.

As thus described, the cooling contribution calculation unit 120 calculates the cooling contribution. In addition, the cooling contribution calculation unit 120 may evaluate the cooling capacity of each fan, with the quantity of heat, cooling contribution, temperature or the like being an index.

FIG. 52 illustrates an exemplary evaluation of the cooling capacity per fan (part 1). There is illustrated by FIG. 52 an evaluation method of the cooling capacity based on the final distribution $h_n$ of transferred quantity of heat (n=fan1) of the fan F1. The cell range R11 is a cell range corresponding to the cell range R10, and the cells included in the cell ranges R10 and R11 are the same. The cooling contribution calculation unit 120 calculates the quantity of heat robbed from the heating element H1 by the air from the fan F1 by taking the sum of the distribution $h_n$ of transferred quantity of heat (n=fan1) for each cell in the cell range R11.

The cell range R21 is a cell range corresponding to the cell range R20, and the cells included in the cell ranges R20 and R21 are the same. The cooling contribution calculation unit 120 calculates the quantity of heat robbed from the heating element H2 by the air from the fan F1 by taking the sum of the distribution $h_n$ of transferred quantity of heat (n=fan1) for each cell in the cell range R21.

FIG. 53 illustrates an exemplary evaluation of the cooling capacity per fan (part 2). There is illustrated by FIG. 53 an evaluation method of the cooling capacity based on the final distribution $h_n$ of transferred quantity of heat (n=fan2) of the fan F2. The cell range R12 is a cell range corresponding to the cell range R10, and the cells included in the cell ranges R10 and R12 are the same. The cooling contribution calculation unit 120 calculates the quantity of heat robbed from the heating element H1 by the air from the fan F2 by taking the sum of the distribution $h_n$ of transferred quantity of heat (n=fan2) for each cell in the cell range R12.

The cell range R22 is a cell range corresponding to the cell range R20, and the cells included in the cell ranges R20 and R22 are the same. The cooling contribution calculation unit 120 calculates the quantity of heat robbed from the heating element H2 by the air from the fan F2 by taking the sum of the distribution $h_n$ of transferred quantity of heat (n=fan2) for each cell in the cell range R22.

FIG. 54 illustrates an exemplary evaluation of the cooling capacity per fan (part 3). There is illustrated by FIG. 54 an evaluation method of cooling capacity based on the final distribution $h_n$ of transferred quantity of heat (n=fan3) of the fan F3. The cell range R13 is a cell range corresponding to the cell range R10, and the cells included in the cell ranges R10 and R13 are the same. The cooling contribution calculation unit 120 calculates the quantity of heat robbed from the heating element H1 by the air from the fan F3 by taking the sum of the distribution $h_n$ of transferred quantity of heat (n=fan3) for each cell in the cell range R13.

The cell range R23 is a cell range corresponding to the cell range R20, and the cells included in the cell ranges R20 and R23 are the same. The cooling contribution calculation unit 120 calculates the quantity of heat robbed from the heating element H2 by the air from the fan F3 by taking the sum of distribution of transferred quantity of heat $h_n$ (n=fan3) for each cell in the cell range R23.

The cooling contribution calculation unit 120 calculates the cooling contribution of each fan to each heating element, using the quantity of heat removed from each heating element by each of the fans calculated in the aforementioned manner (step S133 of FIG. 51). The cooling contribution calculation unit 120 registers the calculated cooling contribution in the cooling contribution table 112. The air volume calculation unit 130 then may determine the air volume and rotation speed of each fan, based on the cooling contribution registered in the cooling contribution table 112, as illustrated in the second to fifth embodiments.

As has been described above, information processing of the first embodiment may be realized by causing the operation unit 1b to execute a program. In addition, information processing of the second to sixth embodiments may be realized by causing the processor 101 to execute a program. The program may be stored in a computer-readable storage medium (e.g., optical disk 13, external storage apparatus 14, memory card 16, etc.).

When distributing a program, a portable storage medium having stored the program thereon is provided, for example. In addition, the program may be stored in a storage apparatus of another computer and the program may be distributed via a network. The computer, for example, stores, in a storage device, a program stored in the portable storage medium or a program received from another computer, reads the program from the storage device and executes it. However, the program read from the portable storage medium may also be directly executed, or the program received from another computer via a network may be directly executed.

In one aspect, the air volume of each fan may be efficiently determined.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A non-transitory computer-readable storage medium storing an air volume calculation program that causes a computer to perform a procedure to calculate air volumes of a plurality of fans configured to cool a plurality of heat generating objects, the procedure comprising:

calculating, for each object, a ratio of an amount of temperature rise against a tolerance for temperature rise by using an amount of temperature rise from a predetermined temperature of each object when the plurality of fans is operated with a first air volume of each fan and a tolerance for temperature rise from the predetermined temperature of each of the plurality of objects;

calculating a second air volume of each fan, based on the ratio calculated for each object and cooling contribution of each fan to each object, the cooling contribution being a ratio of a quantity of heat removed from said each object by wind from said each fan to a total quantity of heat removed from said each object by wind from the plurality of fans; and controlling operations of each fan based on the calculated second air volume of each fan.

2. The computer-readable storage medium according to claim 1, wherein the calculating determines, for each object, a relational expression between a total sum of values obtained by weighting an parameter for each fan with the cooling contribution of each fan to a single object, and a ratio calculated for the object, with a ratio of the second air volume against the first air volume of each fan as the parameter for each fan; and finds the parameter for each fan satisfying each relational expression to calculate the second air volume of each fan.

3. The computer-readable storage medium according to claim 2, wherein, when the number of objects is larger than the number of fans, the calculating groups a part of the plurality of objects to thereby make sum of the number of objects which are not grouped and the number of groups coincide with the number of fans, and forms simultaneous equations from relational expressions for respective objects by regarding a single group as a single object.

4. The computer-readable storage medium according to claim 3, wherein the calculating performs the grouping based on cooling contribution of one of the fans to a plurality of objects.

5. The computer-readable storage medium according to claim 3, wherein the calculating performs the grouping based on a distance between objects.

6. The computer-readable storage medium according to claim 2, wherein, when the number of fans is larger than the number of objects, the calculating groups a part of the plurality of fans to thereby make sum of the number of fans which are not grouped and the number of groups coincide with the number of objects, and forms simultaneous equations from relational expressions for respective objects by regarding a single group as a single fan.

7. The computer-readable storage medium according to claim 6, wherein the calculating performs the grouping based on cooling contribution of each fan to one of the objects.

8. The computer-readable storage medium according to claim 6, wherein the calculating performs the grouping based on a distance between fans.

9. The computer-readable storage medium according to claim 1, wherein the calculating determines respective rotation speeds of the first and the second fans for the second air volume calculated for the first and the second fans respectively, and changes the rotation speed of the first or the second fan according to a rotation speed difference between the first and the second fans so that the rotation speed difference increases.

10. The computer-readable storage medium according to claim 1, wherein the calculating determines respective rotation speeds of the first and the second fans for the second air volume calculated for the first and the second fans respectively, and changes the rotation speed of the first or the second fan according to a noise difference according to respective rotation speeds of the first and the second fans so that the noise difference decreases.

11. An information processing apparatus which calculates air volumes of a plurality of fans configured to cool a plurality of heat generating objects, the apparatus comprising:
   a memory configured to store information about cooling contribution of each fan to each object, the cooling contribution being a ratio of a quantity of heat removed from said each object by wind from said each fan to a total quantity of heat removed from said each object by wind from the plurality of fans; and
   a processor configured to perform a procedure including:
   calculating, for each object, a ratio of an amount of temperature rise against a tolerance for temperature rise by using an amount of temperature rise from a predetermined temperature of each object when each fan is operated with a first air volume of each fan and a tolerance for temperature rise from the predetermined temperature of each object;
   calculating a second air volume of each fan, based on the ratio calculated for each object and the information; and
   controlling operations of each fan based on the calculated second air volume of each fan.

12. An air volume calculation method of calculating air volumes of a plurality of fans configured to cool a plurality of heat generating objects, the method comprising:
   calculating, by a processor, for each object, a ratio of an amount of temperature rise against a tolerance for temperature rise by using an amount of temperature rise from a predetermined temperature of each object when the plurality of fans is operated with a first air volume of each fan and a tolerance for temperature rise from the predetermined temperature of each of the plurality of objects;
   calculating, by the processor, a second air volume of each fan, based on the ratio calculated for each object and cooling contribution of each fan to each object, the cooling contribution being a ratio of a quantity of heat removed from said each object by wind from said each fan to a total quantity of heat removed from said each object by wind from the plurality of fans; and
   controlling operations of each fan based on the calculated second air volume of each fan.

* * * * *